US006949840B2

(12) United States Patent
Ricketts

(10) Patent No.: US 6,949,840 B2
(45) Date of Patent: Sep. 27, 2005

(54) APPARATUS FOR GENERATING POWER FROM PASSING VEHICULAR TRAFFIC

(76) Inventor: Tod A. Ricketts, 7221 Meriden La., El Paso, TX (US) 79912

( * ) Notice: Subject to any disclaimer, the term of this patent is extended or adjusted under 35 U.S.C. 154(b) by 0 days.

(21) Appl. No.: 10/843,714

(22) Filed: May 11, 2004

(65) Prior Publication Data

US 2005/0001430 A1 Jan. 6, 2005

Related U.S. Application Data

(63) Continuation-in-part of application No. 10/209,805, filed on Jul. 22, 2002, now Pat. No. 6,734,575, which is a continuation-in-part of application No. 10/047,596, filed on Jan. 15, 2002, now Pat. No. 6,756,694.

(51) Int. Cl.[7] .............................................. H02K 35/00
(52) U.S. Cl. ....................... 290/1 R; 290/1 A; 290/1 E; 290/53
(58) Field of Search .......................... 290/1 R, 45, 1 A, 290/1 E, 3, 53

(56) References Cited

U.S. PATENT DOCUMENTS

| | | | |
|---|---|---|---|
| 2,020,361 A | 11/1935 | Johnston | |
| 3,885,163 A | 5/1975 | Toberman | |
| 4,032,829 A | 6/1977 | Schenavar | |
| 4,081,224 A | 3/1978 | Krupp | |
| 4,173,431 A | 11/1979 | Smith | |
| 4,212,598 A | 7/1980 | Roche et al. | |
| 4,239,975 A | 12/1980 | Chiappetti | |
| 4,250,395 A | 2/1981 | Lundgren | |
| 4,339,920 A | 7/1982 | Le Van | |
| 4,405,872 A | 9/1983 | Thomas | |
| 4,409,489 A | 10/1983 | Hayes | |
| 4,418,542 A | 12/1983 | Ferrell | |
| 4,614,875 A | 9/1986 | McGee | |
| 4,700,540 A | 10/1987 | Byrum | |
| 4,739,179 A | 4/1988 | Stites | |
| 4,843,250 A | 6/1989 | Stupakis | |
| 4,980,572 A | 12/1990 | Sen | |
| 5,157,922 A | 10/1992 | Baruch | |
| 5,272,378 A | 12/1993 | Wither | |
| 5,355,674 A | 10/1994 | Rosenberg | |
| 5,634,774 A | 6/1997 | Angel et al. | |
| 6,091,159 A | 7/2000 | Galich | |
| 6,172,426 B1 | 1/2001 | Galich | |
| 6,204,568 B1 * | 3/2001 | Runner | 290/1 R |
| 6,376,925 B1 * | 4/2002 | Galich | 290/1 R |
| 6,734,575 B2 * | 5/2004 | Ricketts | 290/1 R |
| 6,756,694 B2 * | 6/2004 | Ricketts | 290/1 R |

* cited by examiner

*Primary Examiner*—Darren Schuberg
*Assistant Examiner*—Iraj A. Mohandesi
(74) *Attorney, Agent, or Firm*—Dorsey & Whitney LLP

(57) ABSTRACT

An apparatus for generating power from over the road vehicular traffic and moving trains are disclosed. The apparatus include on or more hydraulic actuators, each of which has a piston at least partially slidably mounted in a fluid cavity contained therein. When a passing vehicle or train car engages the actuator, the weight of the vehicle pushes the piston into the fluid cavity and causes fluid to flow from the fluid cavity toward a turbine or other power conversion means. The flow causes the turbine to rotate, thereby producing useable energy.

25 Claims, 24 Drawing Sheets

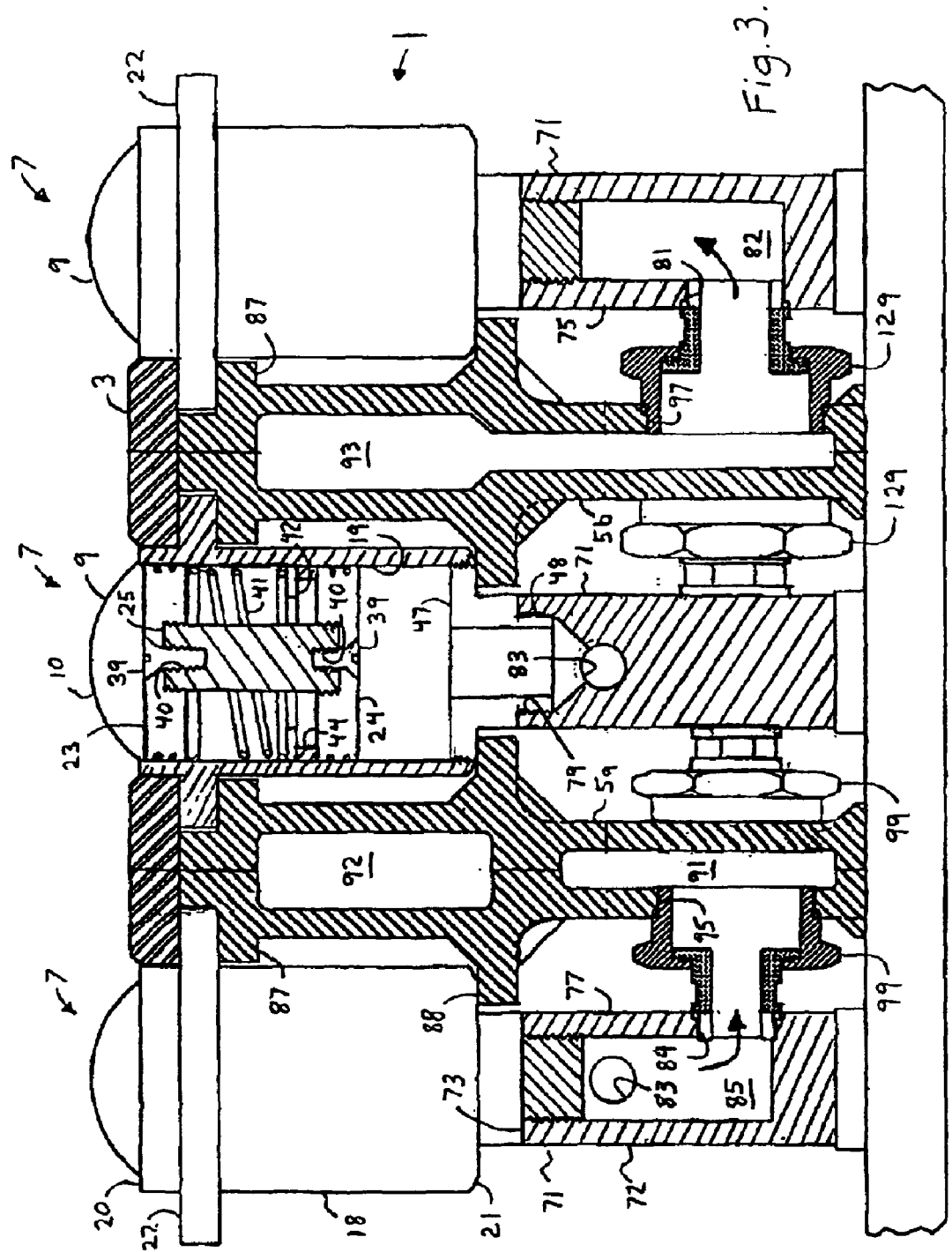

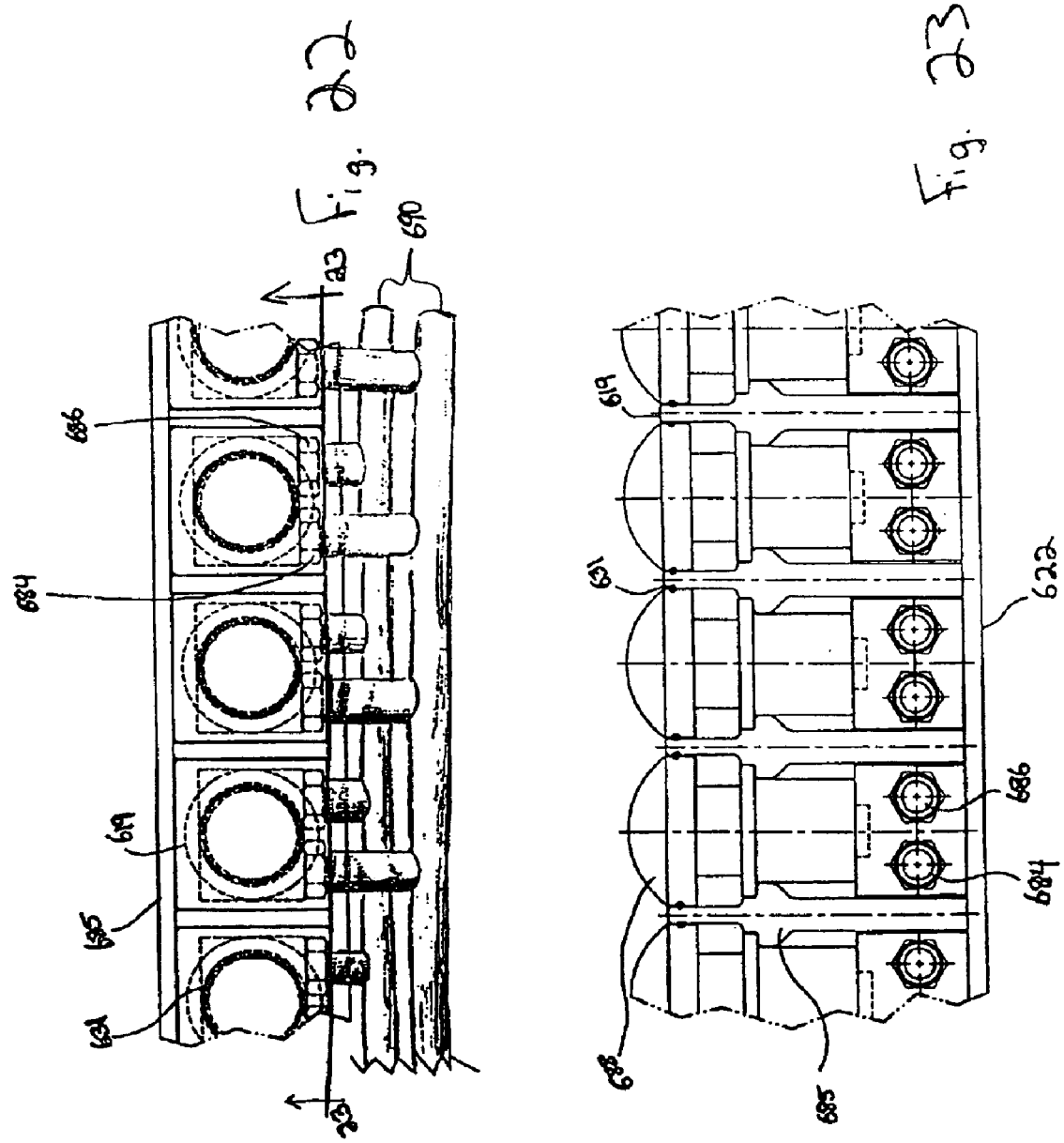

APPARATUS FOR GENERATING POWER FROM PASSING VEHICULAR TRAFFIC

CROSS-REFERENCE TO RELATED APPLICATIONS

This application is a Continuation-In-Part of U.S. patent application Ser. No. 10/209,805, filed on Jul. 22, 2002, which is a Continuation-In-Part of U.S. patent application Ser. No. 10/047,596, filed on Jan. 15, 2002, both of which are hereby incorporated by reference in its entirety as though fully set forth herein.

BACKGROUND OF THE INVENTION a. Field of the Invention

The present invention comprises an apparatus for placement on a roadway to generate power from the weight of passing vehicular traffic.

b. Background Art

Ever increasing demand for electric power requires that new sources of energy be located and utilized. One untapped resource exists in the form of potential energy stored by the millions of vehicles which travel the world's highways every day. Each moving vehicle has a weight which generally ranges from 2,000 pounds for a small passenger car to 80,000 pounds for a large tractor-trailer truck. If even a small percentage of the energy represented by this vast amount of moving weight could be harnessed and converted to useable form, then the resulting power output would be tremendous.

Prior attempts to harness the potential energy of moving vehicular traffic include Roche, et al., U.S. Pat. No. 4,212,598, which discloses placing a plurality of pneumatic cylinders or air bladders under respective pivoting actuating panels in a roadway or sidewalk. As vehicle or foot traffic passes over the actuating panels, air is forced out of the cylinders or bladders and circulated to a turbine which is rotated by the flow of air. The turbine is connected to a generator which produces electricity.

McGee, U.S. Pat. No. 4,614,875, discloses placing a plurality of small rotor and stator type electric generators under a roadway. Each generator is connected to a vertical spindle which is depressed when a vehicle passes thereover. The spindle has screw threads which rotate the rotor of the generator when the spindle is depressed, thereby generating electricity.

Galich, U.S. Pat. No. 6,172,426, discloses an energy producing platform having a fluid filled bladder positioned therebeneath such that the fluid is compressed by vehicles passing over the platform and forced out of the bladder. The fluid flowing from the bladder is circulated to an accumulator which releases the fluid when a preset pressure is reached. When released from the accumulator, the fluid flows to a generator where the flow is used to produce electricity. In an alternative embodiment of the invention, a moveably mounted platform has a lever arm connected to it such that downward movement of the platform caused by a vehicle passing thereover causes the lever arm to pivot. A hydraulic cylinder is connected to an outboard end of the lever arm such that fluid is forced from the cylinder upon actuation of the lever arm. Again, the fluid is channeled through an accumulator to a generator to produce electricity.

BRIEF SUMMARY OF THE INVENTION

The present invention comprises an apparatus for generating power from vehicular traffic. According to one preferred embodiment, the apparatus includes a plurality of actuators that have a cylindrical shape in the preferred embodiments, each of which has a piston slidably mounted therein and a fluid cavity beneath the piston. Each of the pistons has an upper face which is extendable above a road surface so as to be engageable by passing vehicles. When a passing vehicle engages a piston, the weight of the vehicle pushes the piston downwardly and causes fluid to flow from the respective fluid cavity toward a turbine or other power conversion means. The flow causes the turbine to rotate, thereby producing useable energy. As contemplated herein, the types of vehicular traffic can include automobiles and trucks, wherein the tires of the vehicle directly impact the actuators or trains wherein activators separate from the train's wheels are used to engage the actuators.

According to another preferred embodiment, the apparatus is configured for use in a roadway and includes a plurality of hydraulic actuators. Each actuator comprises a piston that is at least slidably mounted in a fluid cavity. The fluid cavity is in turn coupled to at least one fluid port through which fluid provided by a fluid source can flow to and from the fluid cavity as the actuator is activated. Further, a road surface is provided that includes the top surfaces of a plurality of actuator caps that are disposed on top of the hydraulic actuators. Operationally, when a passing vehicle of a predetermined weight engages the top surface of the actuator, an associated piston is urged to slide inwardly into the fluid cavity, displacing fluid contained therein and causing the fluid to flow out of the at least one port. In one variation of this embodiment, a power converter, such as but not limited to a hydraulic turbine coupled with an electric generator, is fluidly coupled with the at least one fluid port of each hydraulic actuator. In another variation, the actuator caps form a plurality of platform pads that have substantially flat top surfaces. Preferably, each top surface is coplanar with adjacent top surfaces and they are arranged in an array to substantially form the road surface over which a vehicle passes. Wiper seals may be provided to span any gaps between the platform pads hindering debris from infiltrating into the body of the actuators.

According to yet another preferred embodiment, an apparatus for capturing energy from vehicles as the vehicle's wheels pass over the apparatus comprises an array of pads having substantially flat, coplanar surfaces, wherein the wheel(s) of a vehicle only contacts the surfaces of one or more pads when traversing across the apparatus. Each pad is mounted to and over at least one hydraulic actuator. Each hydraulic actuator comprises a piston slidably mounted in a fluid cavity and at least one fluid port extending into the cavity. In a variation of this embodiment, a hydraulic turbine is fluidly coupled with the plurality of hydraulic actuators, and in another variation the hydraulic turbine is coupled to an electric generator.

In a fourth preferred embodiment, an apparatus for capturing energy from a train car comprises one or more hydraulic actuators. Each actuator is stationary and located proximate a set of train tracks and includes a fluid cavity with at least one fluid port, an impact area adapted for contact with at least a portion of the train car. As the train car passes proximate the hydraulic actuator, the weight of the train car acting through the impact area causes hydraulic fluid to flow out of the at least one fluid port. In a variation of this embodiment, a hydraulic actuator with an electric generator is fluidly coupled with the one or more hydraulic actuators. The electric generator may be coupled to an electric power grid.

In a fifth preferred embodiment, a system for capturing power from one or more train cars moving along a set of train tracks includes one or more power capture devices that are located near the tracks. The system further includes one or more power capture device activators that are adapted to impact the power capture device as the train car passes proximate the power capture device. A variation of this embodiment includes a hydraulic turbine with or without an electric generator that is fluidly coupled to the power capture device.

In a sixth preferred embodiment, a method for generating power from a train having one or more train cars is described. First, a train is propelled along a set of train tracks. Next, the piston of a hydraulic actuator is depressed by the weight of the train car causing fluid to flow from the hydraulic actuator. Finally, the hydraulic fluid is directed from the hydraulic actuator and through a hydraulic turbine. In one variation, electric energy is generated by an electric generator coupled with the turbine.

In another form of the present invention, a power generation apparatus for placement on a travel surface subject to vehicles passing thereover includes: a least one cylinder adapted to receive a piston and a fluid cavity, wherein the piston engages the fluid cavity; a fluid supply manifold in fluid communication with the at least one cylinder and supplying fluid to the fluid cavity; a fluid return manifold in fluid communication with the at least one cylinder; at least one platform adapted to engage the piston; and a power conversion means connected with the fluid return manifold. As a passing vehicle engages the at least one platform, the at least one platform and the piston are pushed downwardly, causing fluid to flow from the fluid cavity through the fluid return manifold and to the power conversion means.

In yet another form of the present invention, a power capturing apparatus for placement on a travel surface subject to vehicles passing thereover includes: a plurality of hydraulic actuators, each hydraulic actuator including a fluid cavity, a piston, an actuator cap and at least one fluid port, the piston being at least partially and slidably mounted in the fluid cavity and the at least one fluid port extending into the fluid cavity, and the actuator cap being disposed on top of the hydraulic actuator; a fluid source coupled with the at least one fluid port of each of the plurality of hydraulic actuators; and a plurality of platforms adapted to engage each actuator cap of the plurality of hydraulic actuators. As a passing vehicle engages at least one of the plurality of platforms, at least one associated piston of at least one associated hydraulic actuator slides inwardly relative to at least one associated fluid cavity and causes fluid contained in the at least one associated fluid cavity to flow through at least one associated at least one fluid port.

In sill another form of the present invention, an apparatus for capturing energy from a moving train car includes: at least one hydraulic actuator including a fluid cavity with at least one fluid port; and at least one manifold in fluid communication with the at least one fluid port; at least one platform connected with the at least one manifold and adapted for contact with at least a portion the train car. The at least one hydraulic actuator and the at least one manifold are adapted for placement proximate to a set of train tracks and the moving train car contacts the at least one platform causing hydraulic fluid to flow through the at least one fluid port.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 22 is a top view of several hydraulic actuators utilized with the side mounted activators taken along line 22—22 of FIG. 20.

FIG. 23 is a sectional side view of several hydraulic actuators utilized with the side mounted activators taken along line 23—23 of FIG. 22.

DETAILED DESCRIPTION OF THE INVENTION

Figure 1:
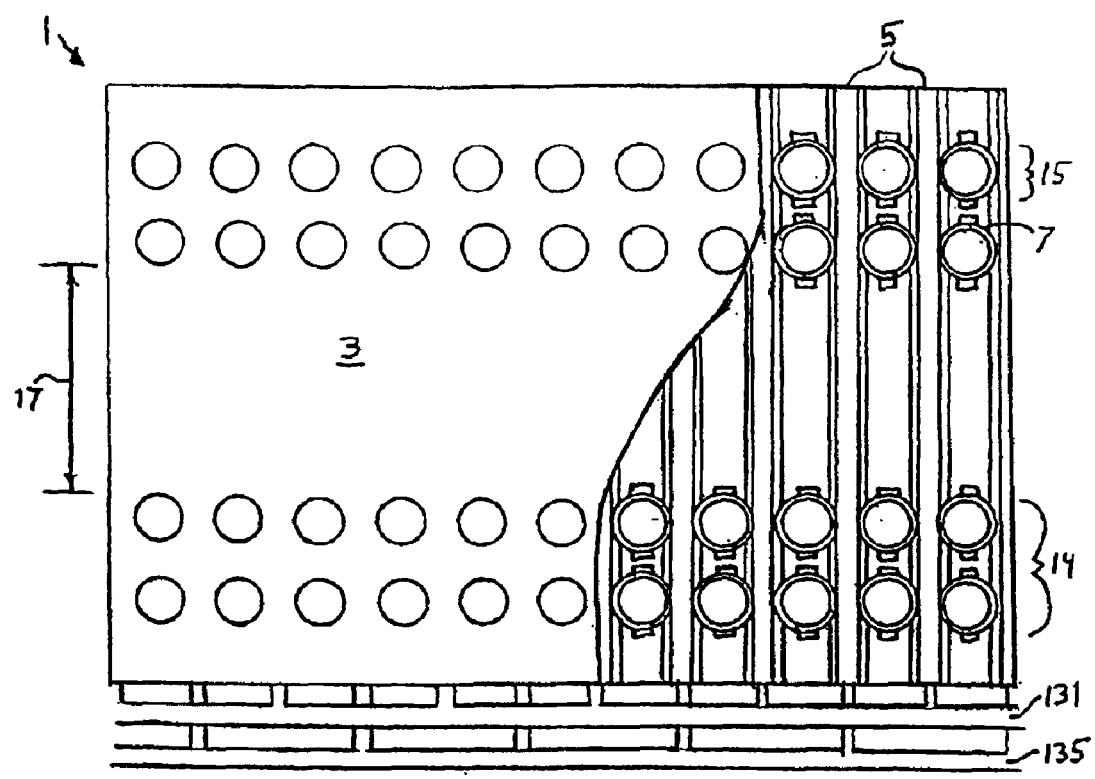
FIG. 1 is a plan view of one lane of a section of roadway incorporating a power generating apparatus according to the present invention. A portion of a mat covering the apparatus has been removed to disclose structure therebeneath.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
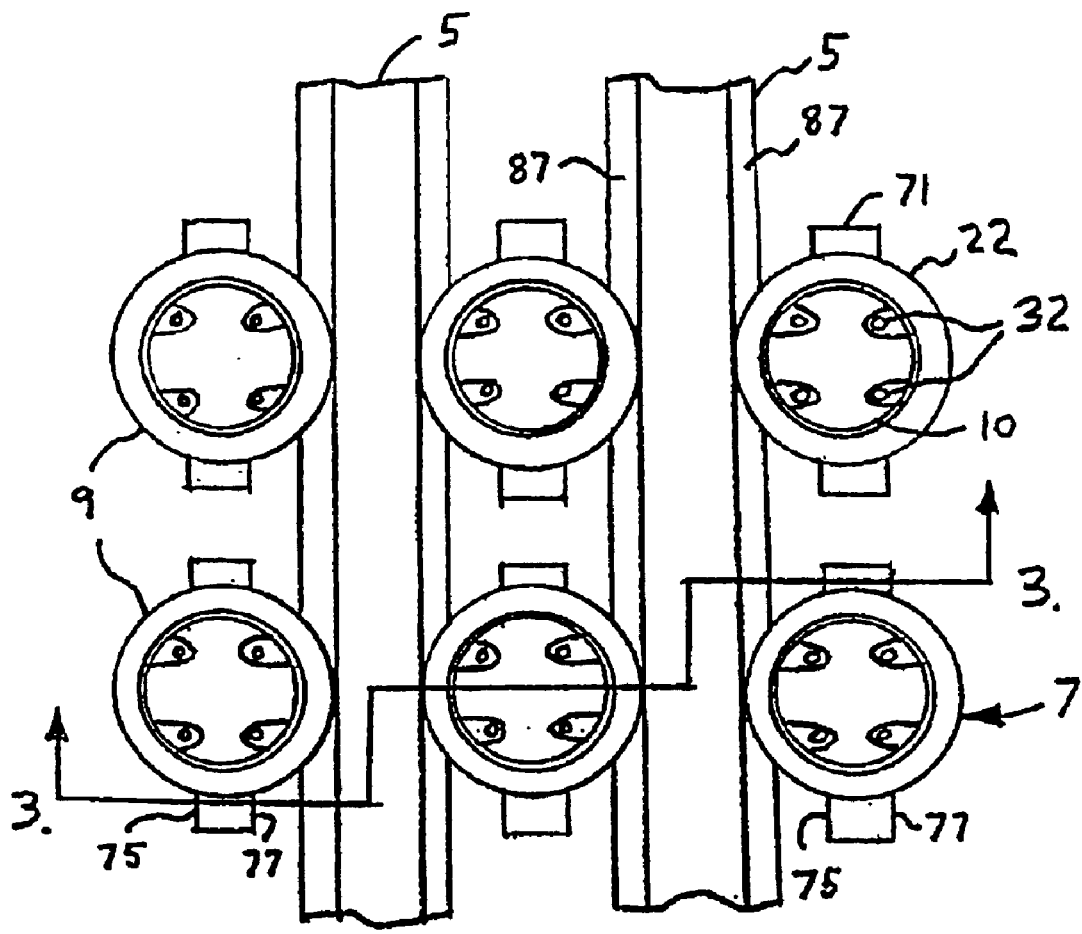
FIG. 2 is an enlarged fragmentary plan view of a portion of the apparatus of FIG. 1.
Figure 5:
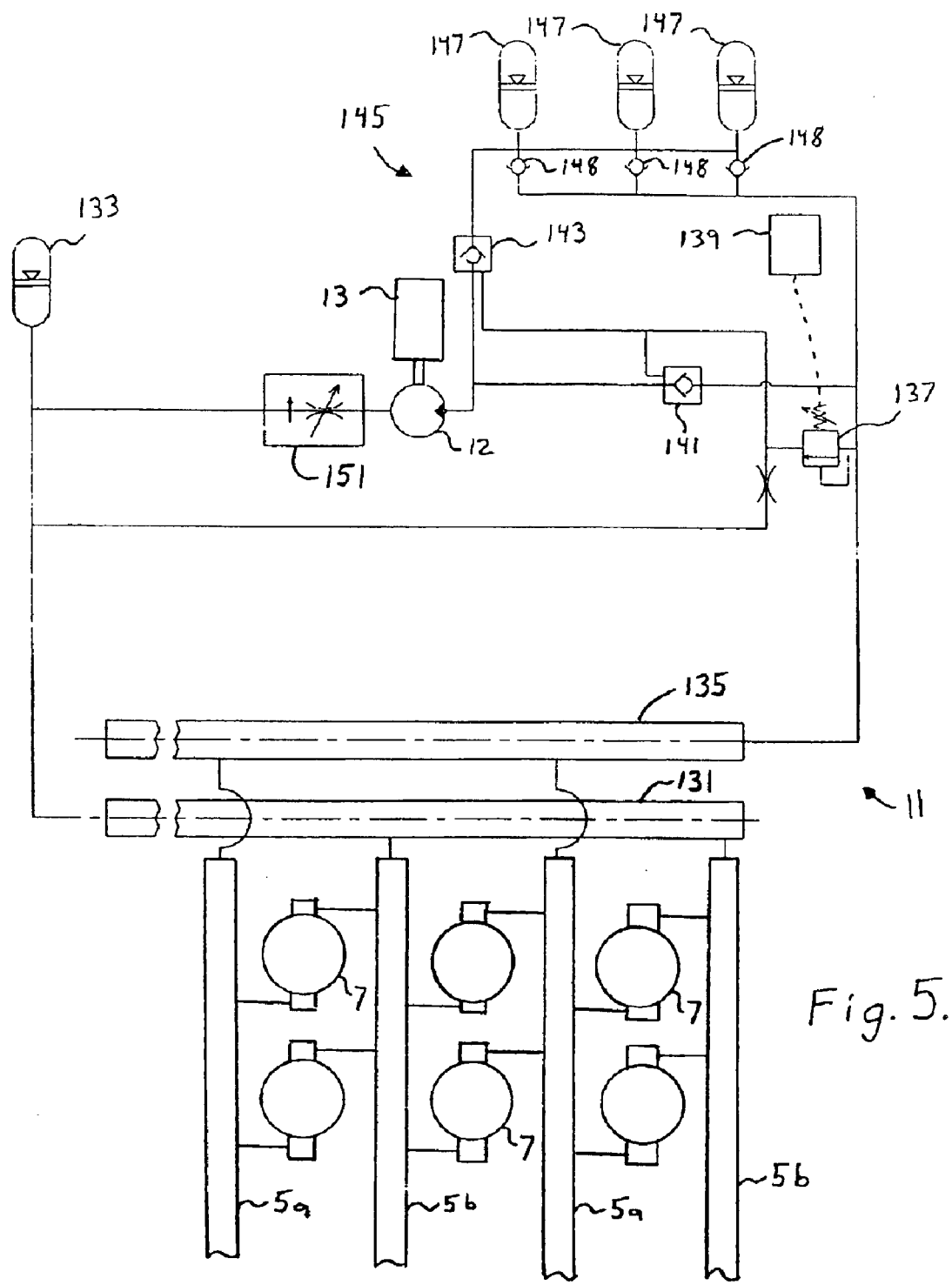
FIG. 5 is a schematic diagram showing the hydraulic circuit of the apparatus.

Referring to the drawings in more detail and in particular to FIGS. 1 and 2, the reference number 1 generally designates a power generation apparatus embodying the present invention. The apparatus 1 includes a mat 3 sized and shaped for placement on a roadway to cover at least one traffic lane thereof. Positioned beneath the mat 3 are a plurality of transverse parallel supports 5 between which are mounted a plurality of hydraulic cylinders 7. Each cylinder 7 includes a piston 9 having an upwardly convex plunger cap 10 which extends above the surface of the mat 3 so as to be engageable by the wheels of passing motor vehicles. When engaged by a vehicle, the cylinders 7 act as pumps to create pressurized flow in a hydraulic fluid. As seen in FIG. 5, the flow created by the cylinders 7 is channeled through a hydraulic circuit 11 to spin a turbine 12 which is mechanically connected to an electric generator 13.

Referring again to FIG. 1, the cylinders 7 need not cover the entire traffic lane, but can instead be concentrated into a pair of tracks 14 which are spaced apart to correspond to the wheel tracks of the majority of vehicles. Each of the tracks 14 may include several rows 15 of the cylinders 7 (two rows 15 per track 14 are shown in FIG. 1). An open space 17 is left between the tracks 14 which allows for drivers of motorcycles and other light vehicles to avoid driving over the pistons 9 of the cylinders 7 if so desired.

Figure 4:
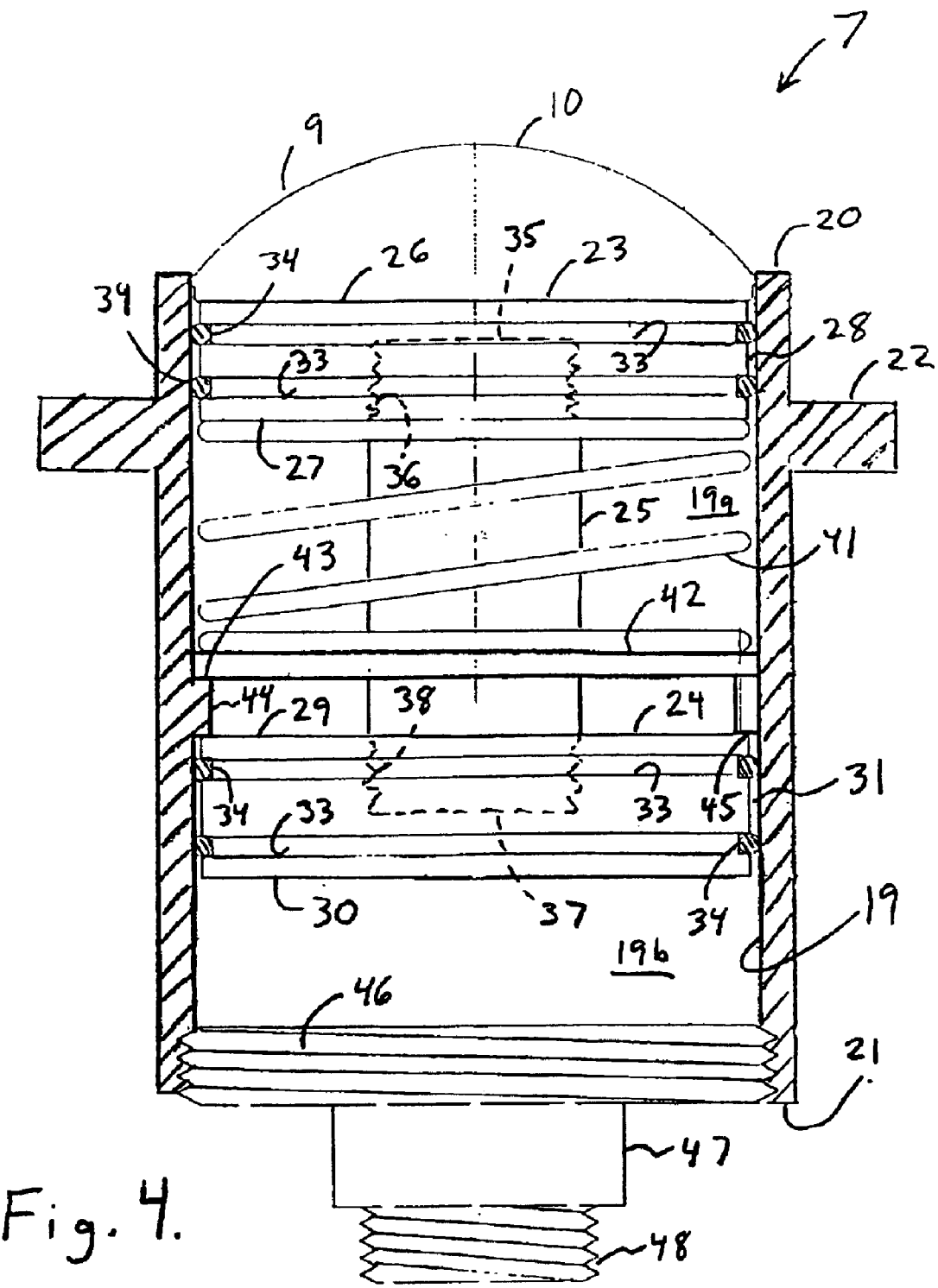
FIG. 4 is a side view of one of the cylinders of FIG. 3 with the cylinder body and O-rings shown in cross-section.
Figure 3:
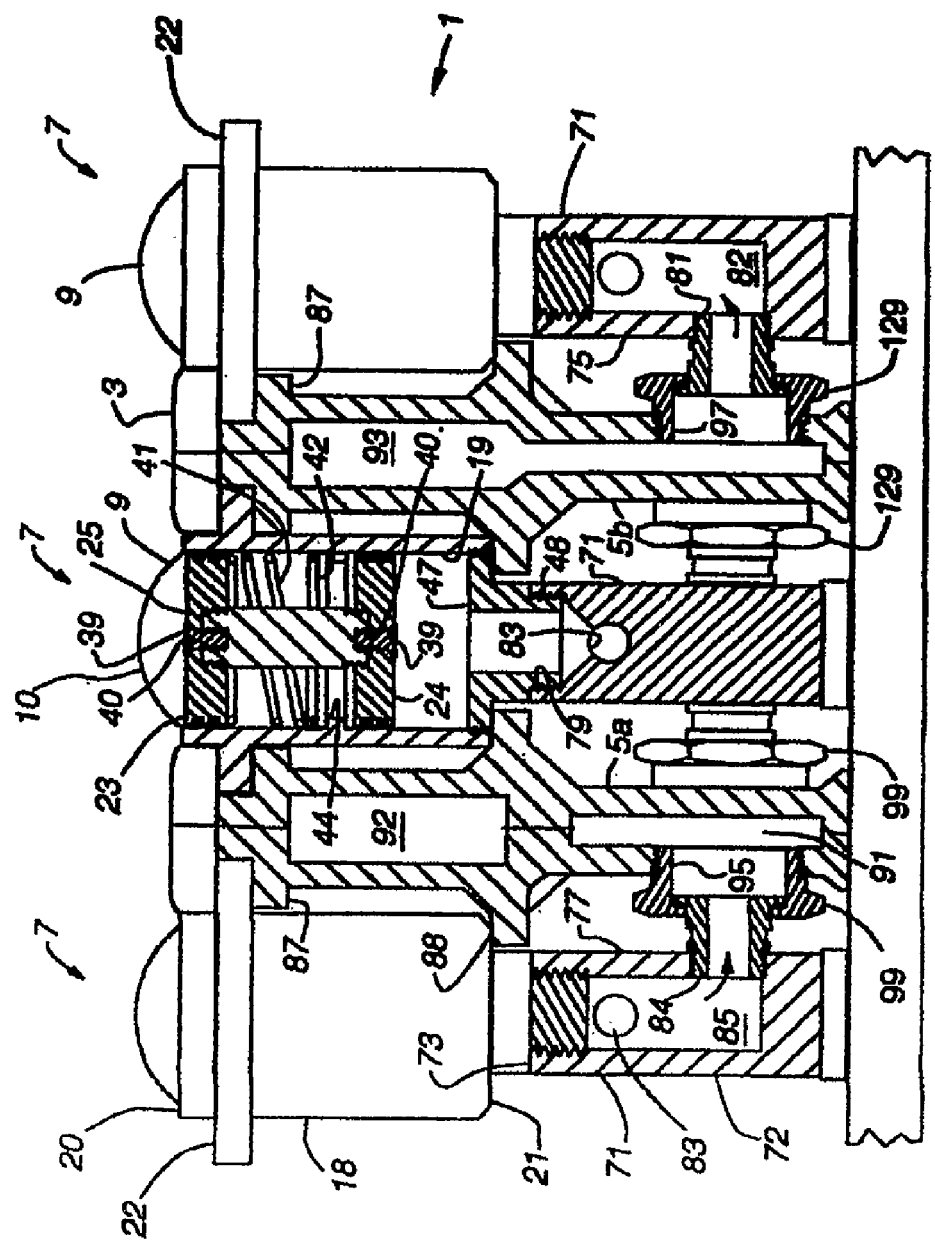
FIG. 3 is a cross-sectional view of the apparatus taken generally along line 3—3 in FIG. 2.
Figure 4:
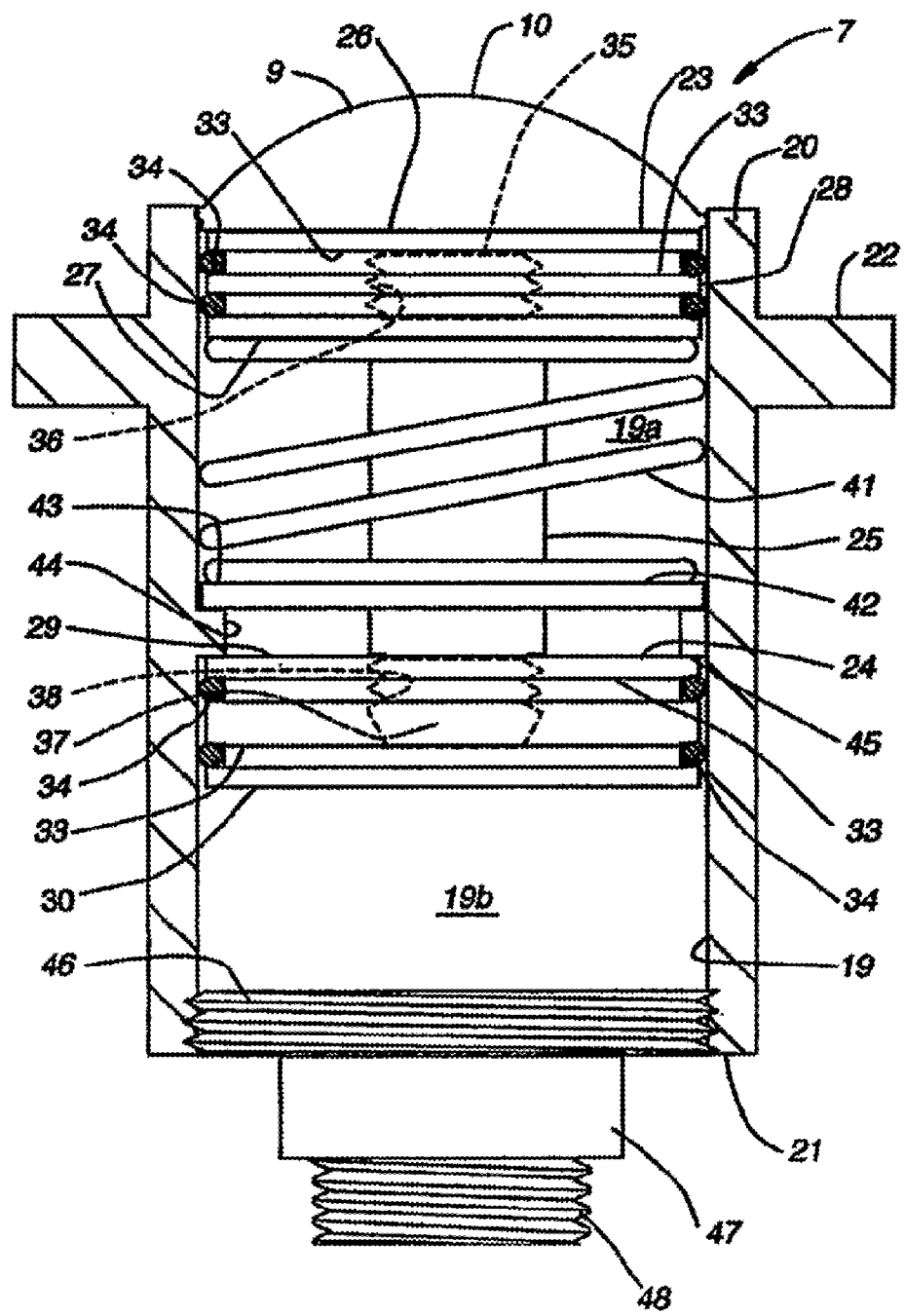
Figure 5:
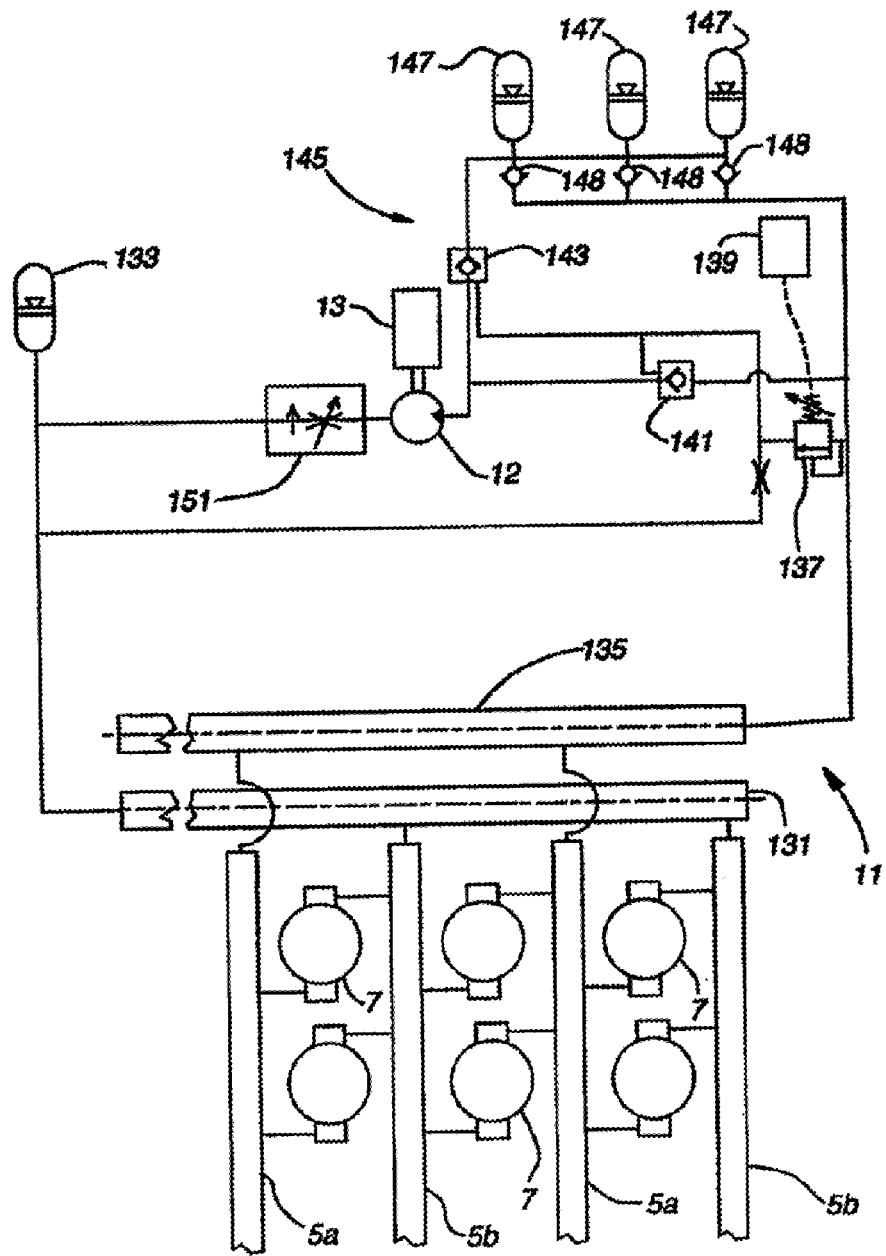
Figure 6:
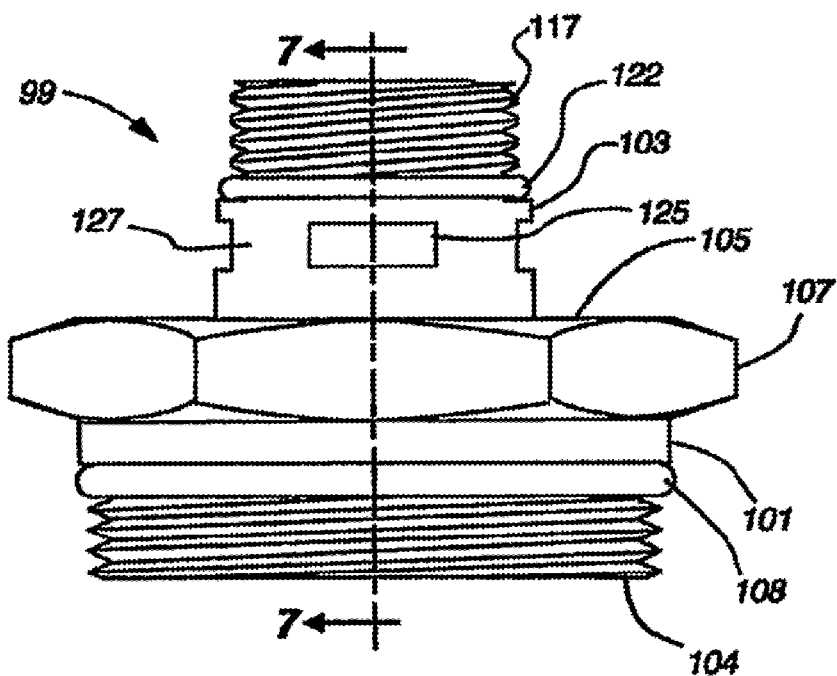
Figure 7:
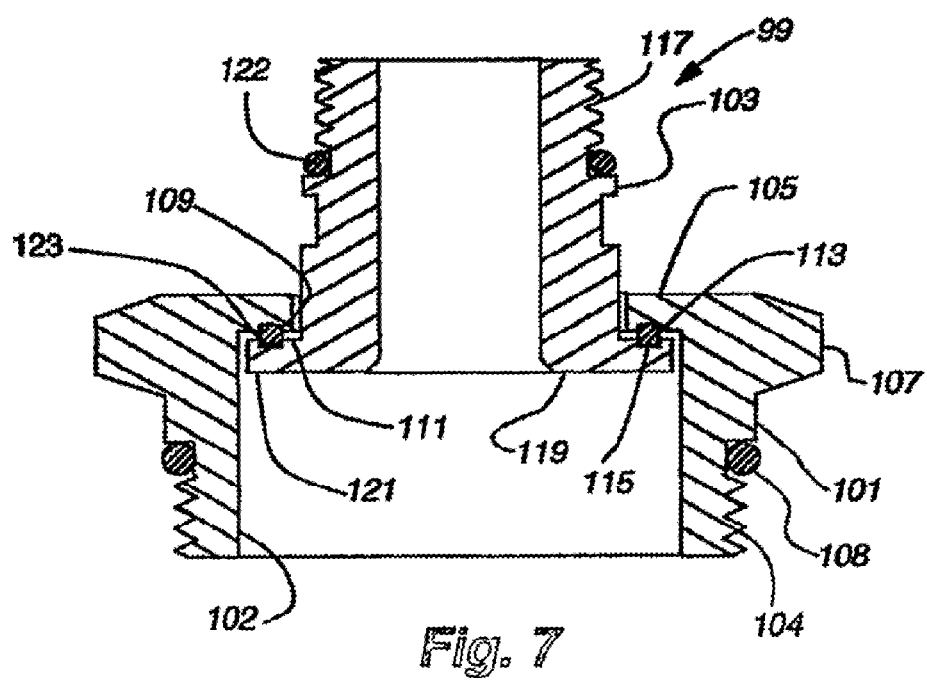
Figure 8:
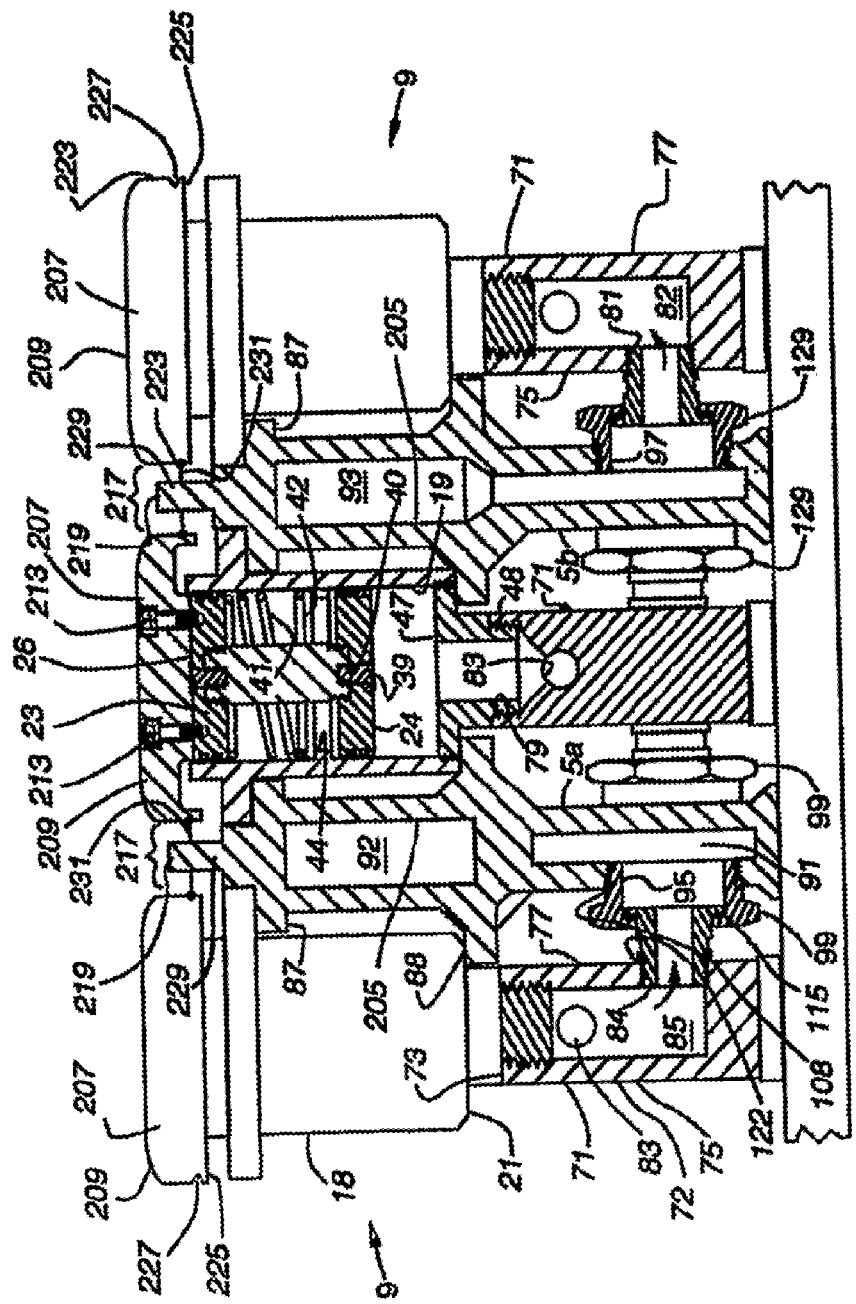
Figure 9:
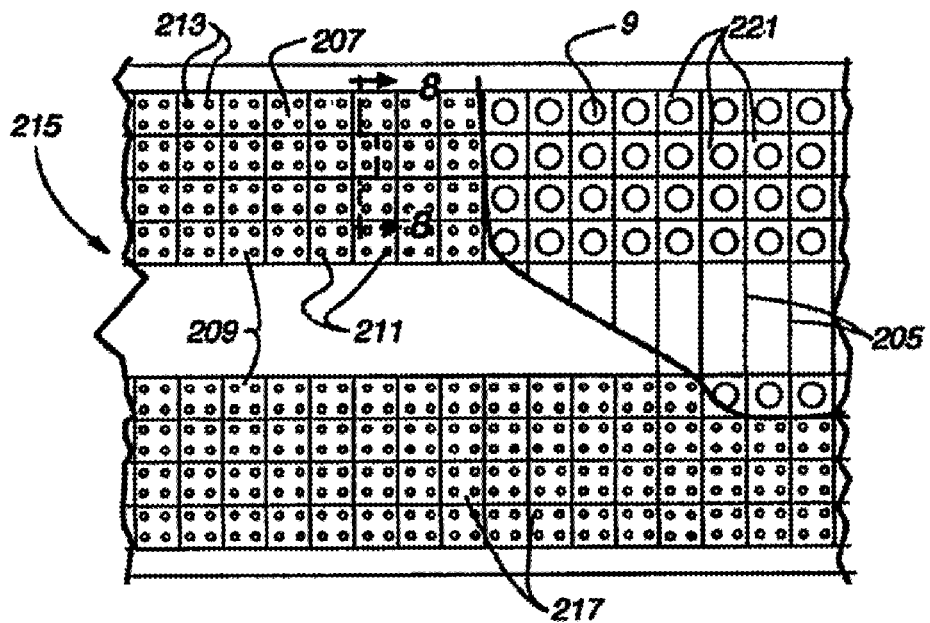
Figure 10:
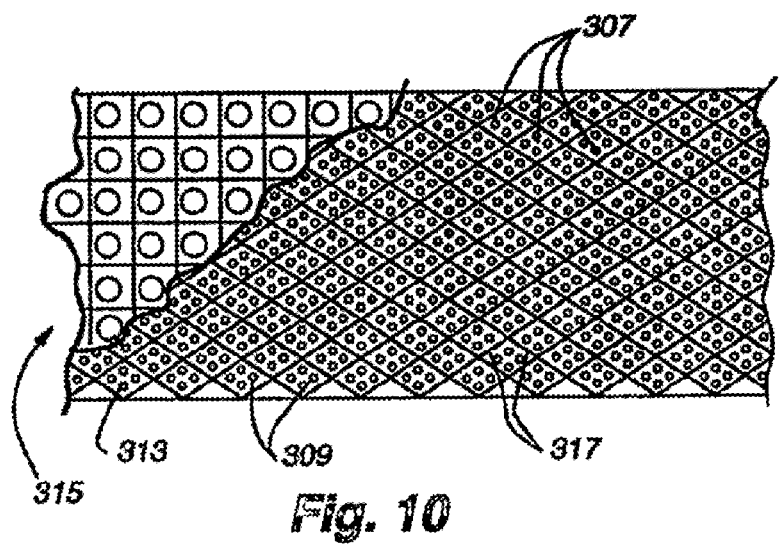
Figure 11:
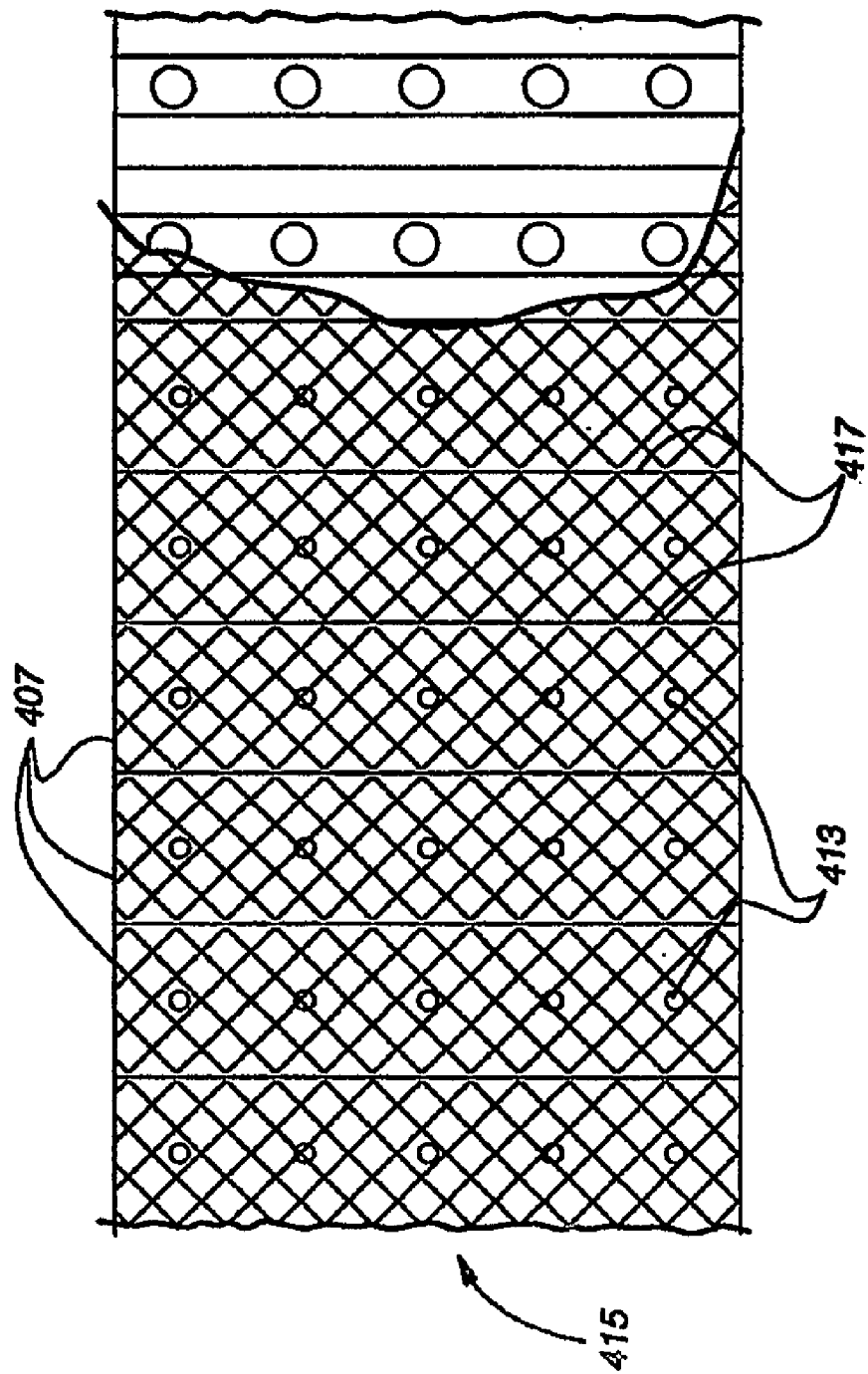
Figure 12:
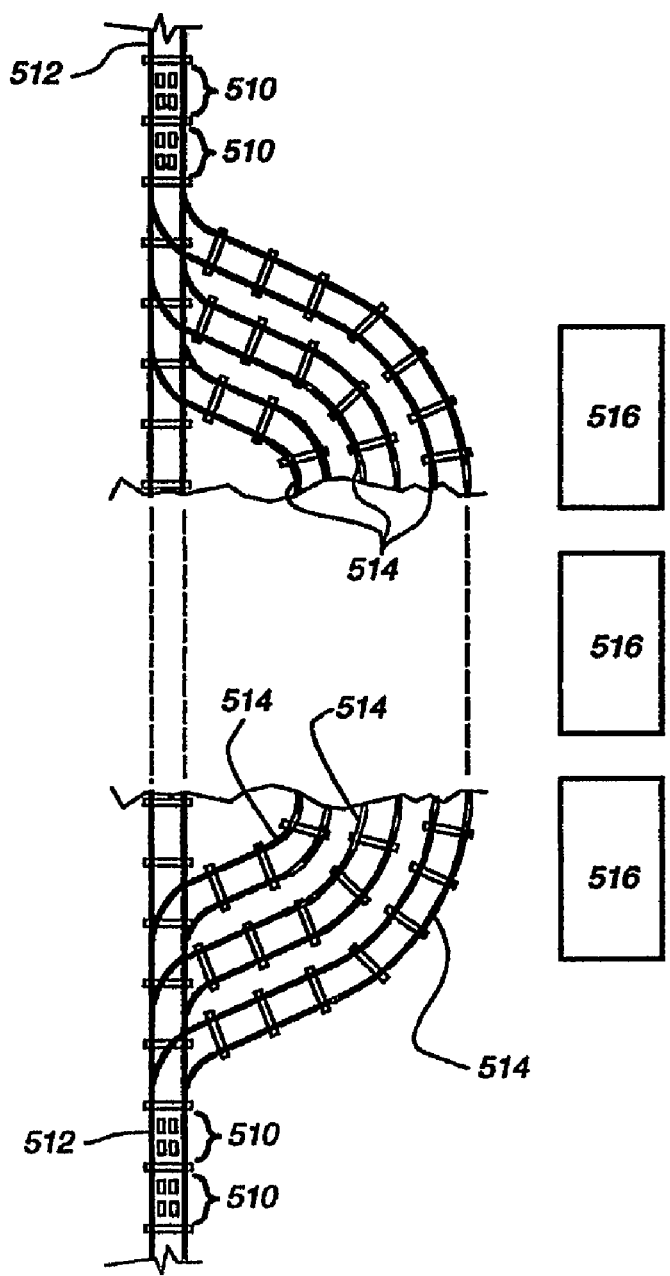
Figure 13:
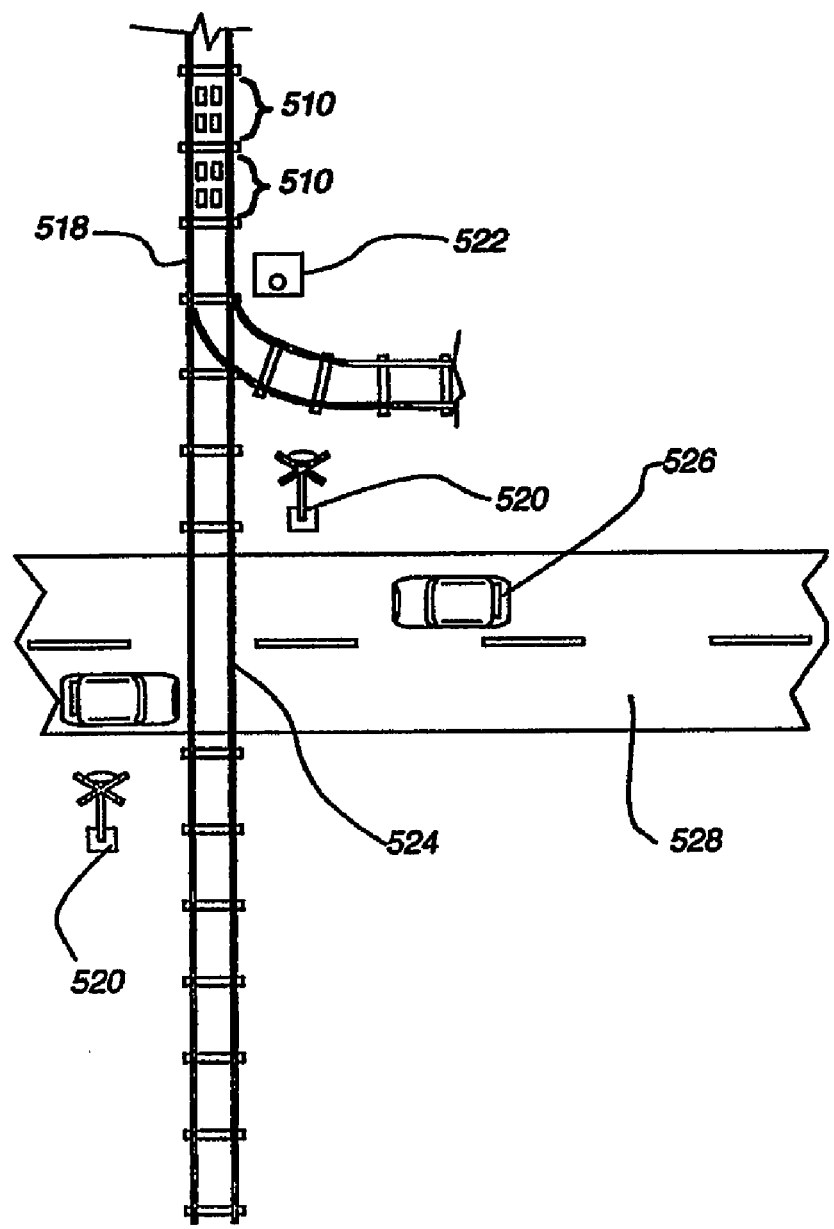
Figure 14:
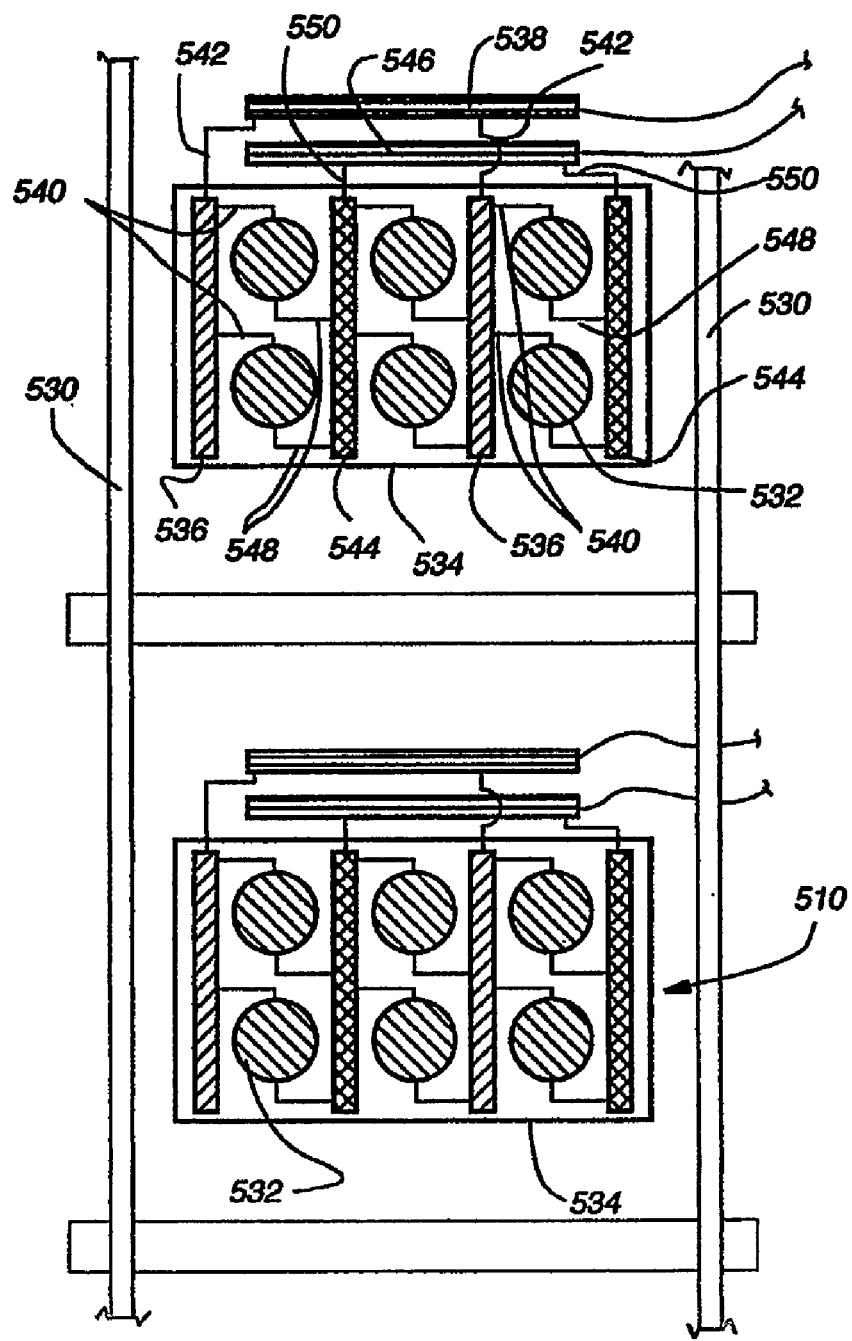
Figure 15:
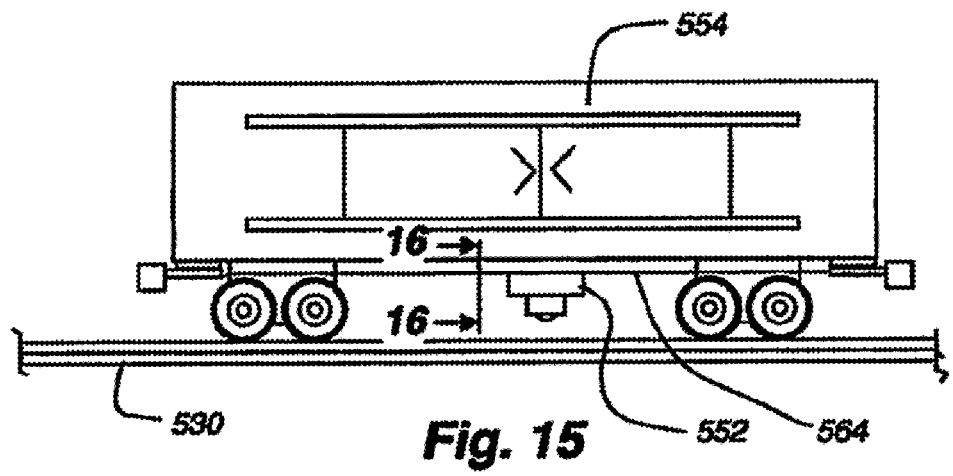
Figure 16:
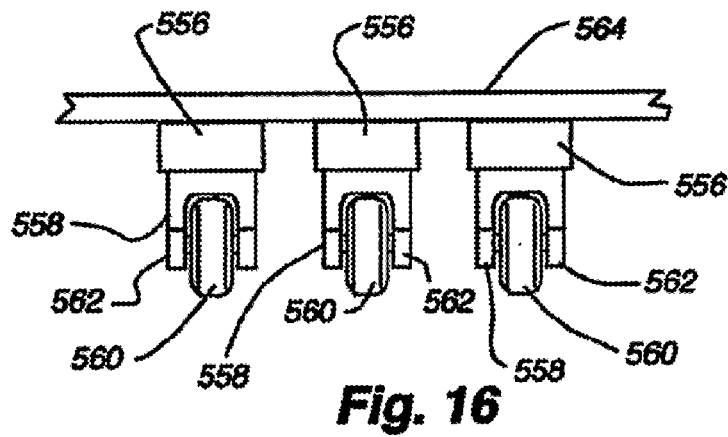
Figure 17:
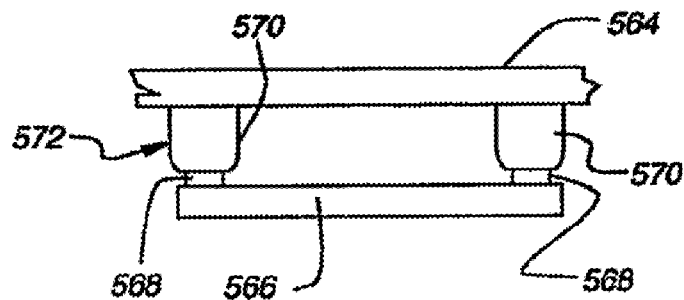
Figure 18:
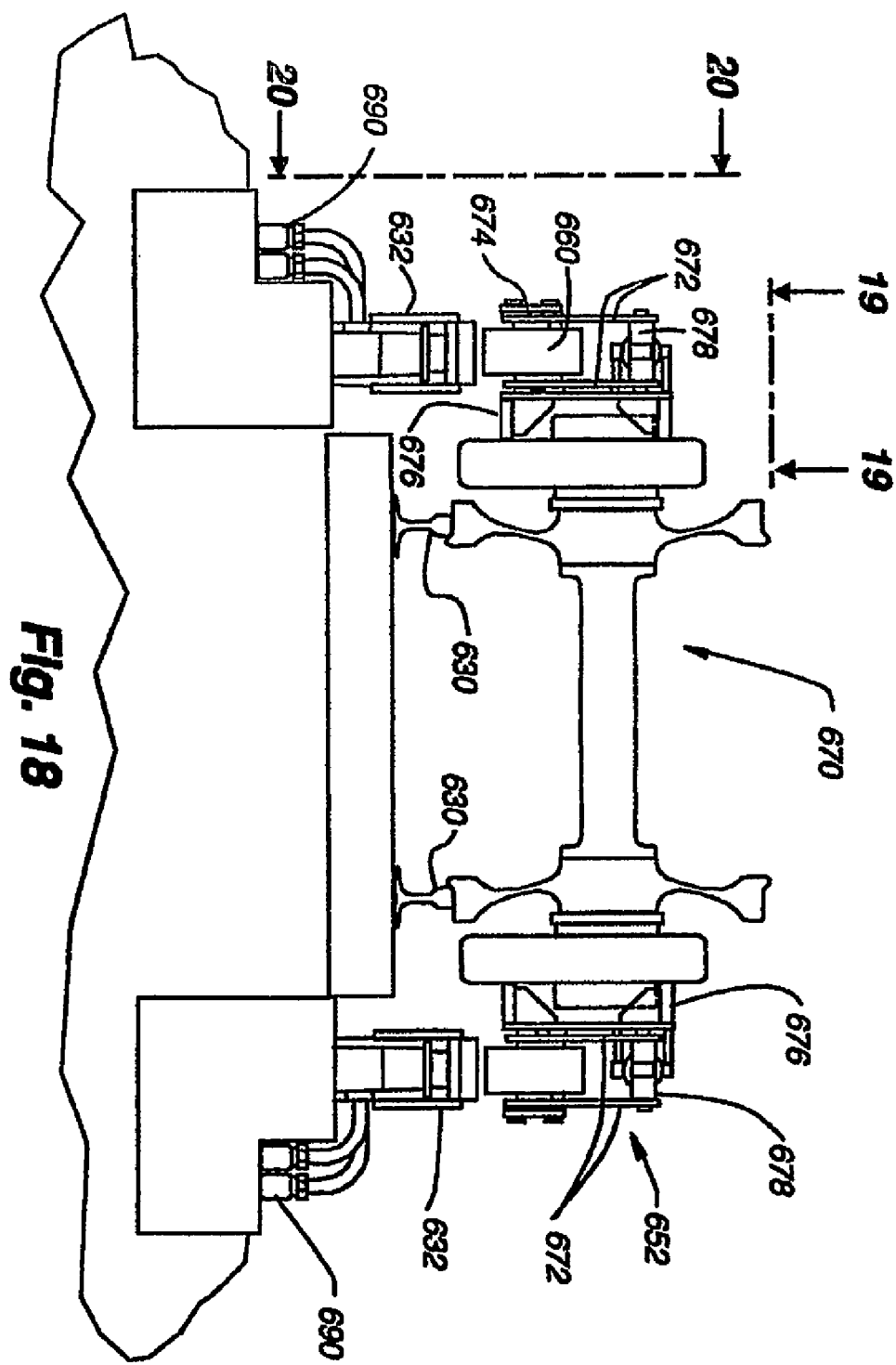
Figure 19:
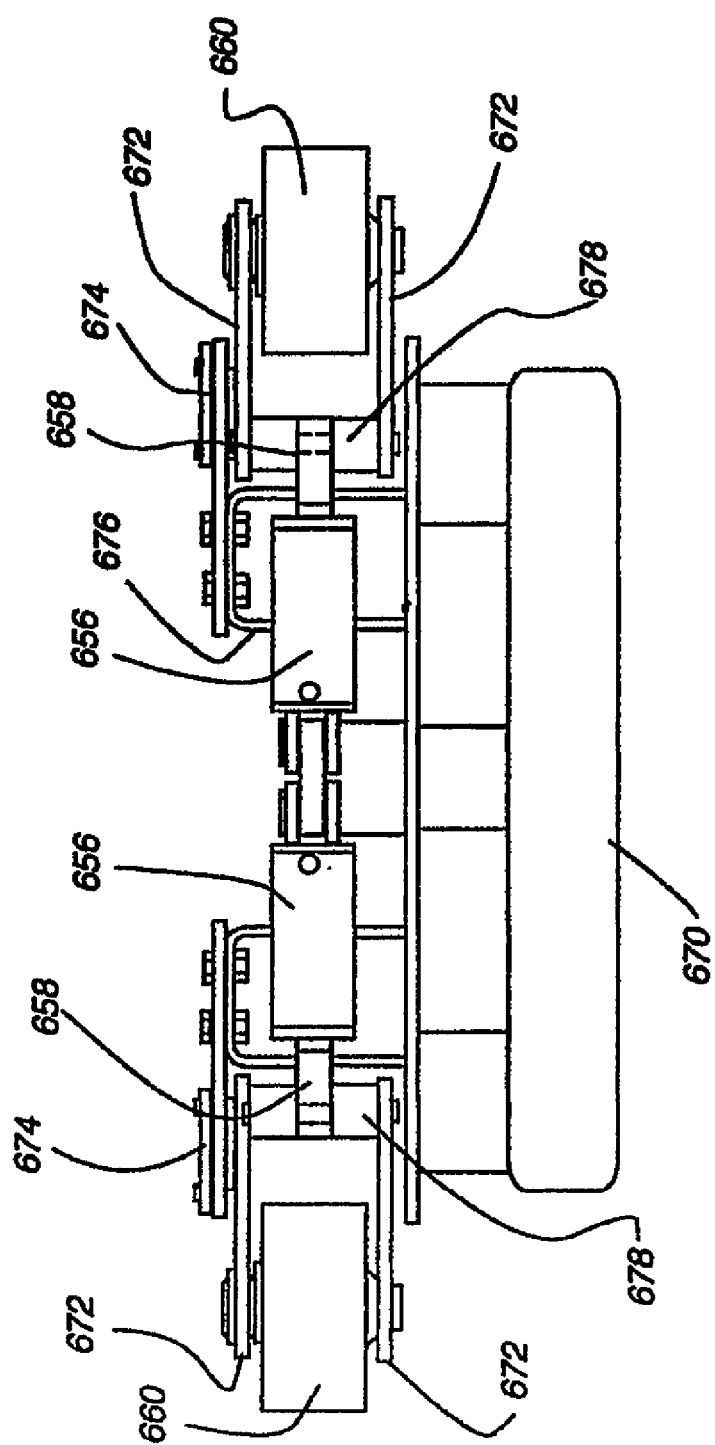
Figure 20:
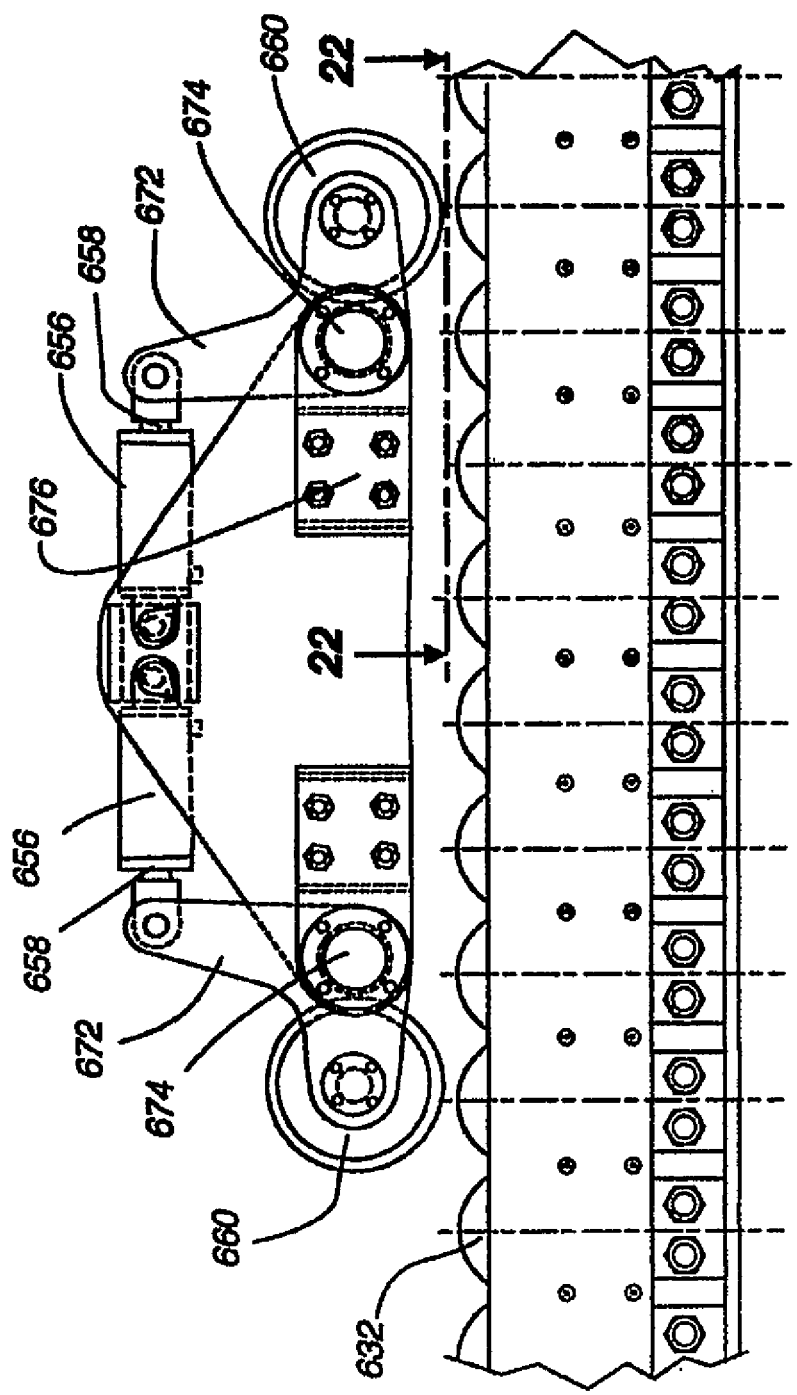

Referring to FIGS. 3 and 4, each cylinder 7 includes a tubular cylinder body 18 forming a cavity 19 in which the respective piston 9 is slidably mounted. The body and piston can be fabricated from any suitable materials including metals, plastics and composites, although in a preferred embodiment a body and piston that is injection molded out of polycarbonate is utilized. The cylinder body 18 has an upper end 20 and a lower end 21. An annular flange 22 extends outwardly from the cylinder body 18 in a location spaced downwardly from the upper end 20 a distance which is substantially equal to the thickness of the mat 3.

Each piston 9 includes an upper piston section 23 and a lower piston section 24 connected by an intermediate rod 25 such that the piston sections 23 and 24 move in tandem. The upper section 23 has an upper face 26, a lower face 27 and an outer edge 28. Similarly, the lower section 24 has an upper face 29, a lower face 30 and an outer edge 31. The plunger cap 10 of each cylinder 7 is connected to the upper face 26 of the respective upper piston section 23 by fasteners such as allen head machine screws 32. Annular grooves 33 formed on the respective outer edges 28 and 31 of the piston sections 23 and 24 receive respective sealing rings 34 which seal the gaps between the outer edges 28 and 31 and the cylinder body 18.

The intermediate rod 25 has an upper threaded end 35 which is received by a threaded axial receiver 36 formed in the lower face 27 of the upper piston section 23 and a lower threaded end 37 which is received by a threaded axial receiver 38 formed in the upper face 29 of the lower piston section 24. The intermediate rod 25 is further secured to each of the piston sections 23 and 24 by a respective flat head machine screw 39 which passes through the respective piston section 23 or 25 and engages a respective threaded receiver 40 in the rod 25.

The portion of the cylinder cavity 19 located between the upper piston section 23 and the lower piston section 24 comprises a dry cavity 19a which does not receive hydraulic fluid. The portion of the cavity 19 located below the lower piston section 24 comprises a fluid cavity 19b which is filled with hydraulic fluid during normal operation of the apparatus 1.

The piston 9 is biased upwardly by a compression spring 41 which is positioned within the dry cavity 19a. An upper end of the spring 41 bears against the lower face 27 of the upper piston section 23. A lower end of the spring 41 bears against a spacer 42 which in turn bears against an upper surface 43 of a shoulder 44 formed on the body 18, the shoulder 44 extending inwardly into the cylinder cavity 19. The shoulder 44 further includes a lower surface 45 which serves as a stop to limit upward movement of the piston 9. The lower surface 45 is engaged by the upper face 29 of the lower piston section 24 when the piston 9 is at the top of its stroke.

The positioning of the spring 41 above the lower piston section 24 allows the spring 41 to be serviced from the top of the apparatus 1 without opening the fluid cavity 19b. To access the spring 41, the plunger cap 10 is first removed by unscrewing the screws 32. With the cap 10 removed, the upper flat head machine screw 39 may be removed. The upper piston section 23 can then be rotated off of the intermediate rod 25 and removed through the upper end 20 of the cylinder cavity 19, providing access to the spring 41. While the upper piston section 23 is out of the cavity 19, the rings 34 on the upper section 23 may also be replaced.

Because each cylinders 7 needs to be serviced at intervals which are dependent upon the number of depressions of the cylinder, a proximity switch (not shown) may be included in each of the cylinders 7 so as to be actuated upon each depression of the piston 9. The proximity switch is connected to a counter (not shown) which keeps track of the number of depressions of the piston 9. The counter can then be read to determine when the respective cylinder 7 has undergone a predetermined number of depressions, thereby indicating that the cylinder 7 needs to be serviced.

The lower end 21 of the cylinder body 18 is internally threaded to receive an externally threaded upper end 46 of a reducer 47 having an externally threaded inlet/outlet port 48 extending downwardly therefrom. The components of the cylinder 7, including the body 18, piston sections 23 and 24, and reducer 47 are preferably made of marine grade stainless steel.

Referring again to FIG. 3, positioned below each cylinder 7 is a respective check valve 71 having a generally rectangular valve body 72 which includes an upper face 73, a first side face 75, and an opposed second side face 77. The upper face 73 has an axially aligned, internally threaded cylinder port 79 formed therethrough having a diameter enabling the port 79 to retainably receive the externally threaded inlet/outlet port 48 of the respective cylinder 7. It should be noted that the single inlet/outlet design of the cylinders 7 and check valves 71 allows the cylinders 7 to be directly connected to the check valves 71 with a minimum of plumbing. In addition, the design allows the cylinders 7 to be unscrewed out of the apparatus 1 from the top side for ease of maintenance.

A supply port 81 is formed in the valve body 72 through the first side face 75. The supply port 81 communicates with a supply cavity 82 formed within the valve body 72. The supply cavity 82, in turn, communicates with the cylinder port 79 through a passage 83. The supply cavity 82 receives a supply check valve cartridge (not shown) which allows fluid to flow from the supply port 81 through the passage 83 to the cylinder port 79, but prevents flow in the opposite direction.

Similarly, a pressure port 84 is formed through the second side face 77 of the valve body 72. The pressure port 84 communicates with a pressure cavity 85 formed within the valve body 72. The pressure cavity 85 also communicates with the cylinder port 79 through the passage 83. The pressure cavity 85 receives a pressure check valve cartridge (not shown) which allows fluid to flow from the cylinder port 79 through the passage 83 to the pressure port 84, but prevents flow in the opposite direction. Should an unexpected surge in the supply pressure occur, both check valve cartridges will open, allowing fluid to flow directly from the supply port 81 to the pressure port 84 through the passage 83.

Each cylinder 7 is positioned between a pair of adjacent supports 5. Each support 5 includes an opposed pair of support flanges 87, each of which supports the annular flange 22 of the adjacent cylinder 7. Each support 5 further includes a plurality of opposed pairs of support shelves 88 longitudinally spaced along the support 5 in alignment with the locations of the cylinders 7. Each shelf 88 serves to support the lower end 21 of the cylinder body 18 of the adjacent cylinder 7. The shelves 88 are each reinforced by a gusset 89.

Alternate ones of the supports 5, indicated by the reference numeral 5a in FIG. 3, serve as pressure manifolds and include a pressure passage 91. Each pressure manifold 5a may also include a temperature control passage 92 through which heated fluid may be circulated in cold weather to warm the apparatus 1 and prevent icing of the mat 3. The fluid may be heated by power generated by the apparatus 1. In hot weather, coolant may be circulated through the temperature control passage 92 to cool the apparatus 1. The remaining supports 5, indicated by the reference numeral 5b, serve as supply manifolds and each include a supply passage 93. Each cylinder 7 with its respective check valve 71 is thus positioned between a pressure manifold 5a and a supply manifold 5b. Each check valve 71 is oriented with its supply port 81 adjacent a respective supply manifold 5b and its pressure port 84 positioned adjacent a pressure manifold 5a. Threaded receivers 95 are formed in each pressure manifold 5a in alignment with the respective pressure ports 84 and in communication with the pressure passage 91. Similarly, threaded receivers 97 are formed in each supply manifold 5b in alignment with the respective supply ports 81 and in communication with the supply passage 93.

Figure 6:
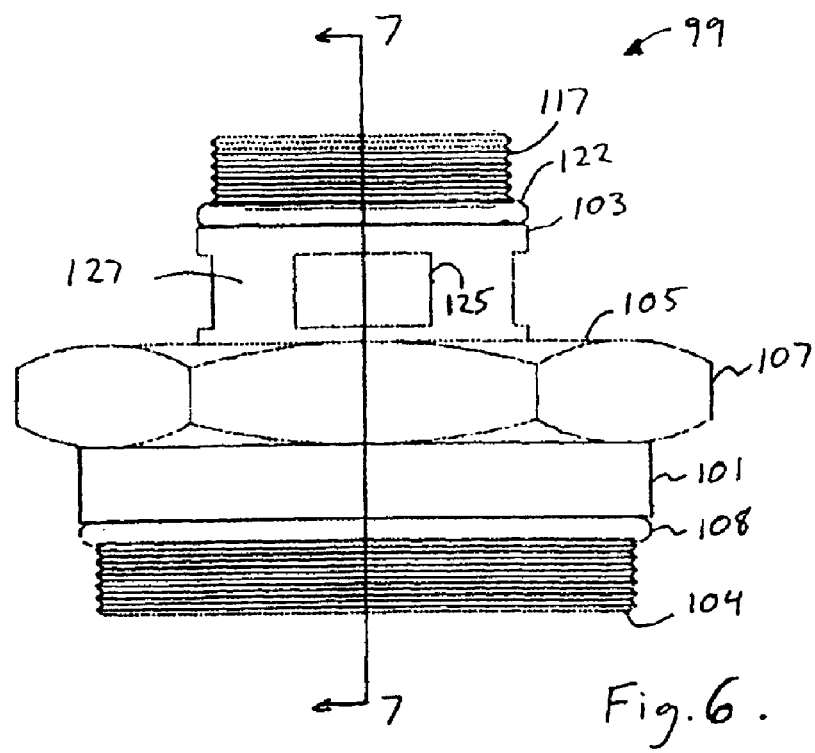
FIG. 6 is an enlarged plan view of a telescoping union fitting which is used in the apparatus.
Figure 7:
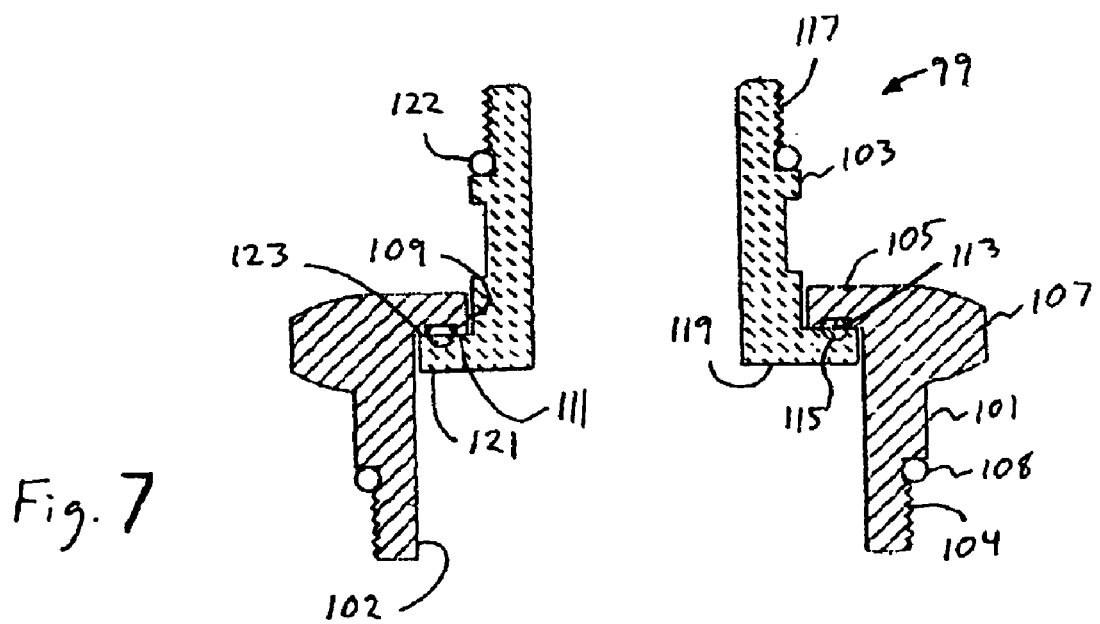
FIG. 7 is a cross-sectional view of the union fitting taken generally along line 7—7 in FIG. 6.

Each pressure port 84 is connected to the respective threaded receiver 95 by a telescoping union fitting 99. Each fitting 99, as shown in FIGS. 6 and 7, includes an outer section 101 with a central bore 102, and an inner section 103 slidably received within the bore 102. The outer section 101 has an externally threaded first end 104 sized to be retainably received by the respective threaded receiver 95, and an opposed second end 105 having a hexagonal flange 107 which allows the outer section 101 to be tightened into the receiver 95 with a wrench. An O-ring 108 is positioned proximate the first end 104 to seal against the pressure manifold 5a. The second end 105 further includes a central opening 109 sized to receive the inner section 103. An annular thrust surface 111 is formed around the opening 109 on an interior face of the second end 105. The thrust surface 111 preferably has an annular groove 113 formed therein for receiving an O-ring 115.

The inner section 103 of the fitting 99 has an externally threaded first end 117 sized to be retainably received by the respective pressure port 84, and an opposed second end 119 having an outwardly extending flange 121 sized to be received within the central bore 102 of the outer section 101. An O-ring 122 is positioned proximate the first end 117 to seal against the check valve body 72. The flange 121 includes an annular thrust surface 123 sized and shaped to bear against the thrust surface 111 of the outer section 101. A plurality of wrench flats 125 are formed on an external surface 127 of the inner section 103 such that the section 103 may be tightened into the pressure port 84 using a wrench.

When installed, the union fittings 99 are tensioned between the respective check valve 71 and the adjacent pressure manifold 5a. The first end 104 of the outer section 101 is screwed into the receiver 95 of the pressure manifold 5a until the O-ring 108 seals against the pressure manifold 5a. Similarly, the first end 117 of the inner section 103 is screwed into the pressure port 84 of the check valve 71 until the O-ring 122 seals against the valve body 72. This draws the thrust surface 111 against the mating thrust surface 123, compressing the O-ring 115 therebetween. With the union fittings 99 thus installed, the pressure ports 84 are each placed in communication with the pressure passage 91 within the adjacent pressure manifold 5a.

Each supply port 81 is connected to the respective threaded receiver 97 in the adjacent supply manifold 5b by a telescoping union fitting 129 which is substantially similar to the fitting 99 previously described, however the threaded ends of the inner and outer sections are sized to be retainably received by the supply port 81 and receiver 97, respectively. The union fittings 129 place the supply ports 81 in fluid communication with the supply passage 93 within the adjacent supply manifold 5b. The unique, telescoping design of the union fittings 99 and 129 allows the cylinders 7 to be spaced in closer proximity to one another than would be possible with standard plumbing fittings.

As a passing vehicle engages the plunger cap 10 of a cylinder 7, the piston 9 thereof is forced downwardly, building pressure in the fluid cavity 19b. When the pressure in the fluid cavity overcomes the set point of the pressure check valve cartridge, fluid flows out of the fluid cavity 19b, through the check valve 71, and into the pressure passage 91 of the adjacent pressure manifold 5a.

As the vehicle passes off of the plunger cap 10 of a cylinder 7, the piston 9 thereof is urged upwardly by the spring 41, creating a vacuum in the fluid cavity 19b. When the vacuum in the fluid cavity overcomes the set point of the supply check valve cartridge (which is set relatively low), the valve opens, allowing fluid to be drawn into the fluid cavity 19b through the check valve 71 from the supply passage 93 in the adjacent supply manifold 5b.

Referring to FIG. 5, the hydraulic circuit 11 includes a master supply manifold 131 which delivers fluid from a closed and pressurized reservoir 133 to the supply manifolds 5b along a section of roadway such that a positive pressure is maintained in the supply manifolds 5b. The pressure manifolds 5a are connected through a master pressure manifold 135 to a master pressure control valve 137 which allows for variation of the operating pressure maintained within the cylinders 7 and pressure manifolds 5a.

The amount of power which can be generated by the apparatus 1 is directly related to the operating pressure; thus, the higher the operating pressure, the more power may be produced. The operating pressure at which the apparatus 1 may be operated is, in turn, determined by the weight of the vehicles passing over the cylinders 7. For reasons of safety and comfort to the drivers of the vehicles, it is preferable that the operating pressure in the cylinders 7 be set low enough, via the master pressure control valve 137, that the pistons 9 will move downwardly under the weight of the lightest vehicles by which they are engaged. If it is desired for the operating pressure to be set at a higher level, the apparatus 1 may be placed only in traffic lanes which are dedicated to heavy commercial vehicle traffic. Alternatively, the apparatus 1 may include some sections which are placed in commercial vehicle lanes and are set to operate at higher pressures, as well as other sections which are placed in passenger vehicle lanes and are set to operate at lower pressures.

The master pressure control valve 137 may be adapted to be electronically controlled, allowing the operating pressure of the respective section of the apparatus 1 to be varied almost instantaneously. In such applications, the apparatus 1 could also include a sensor 139 which could read the type of vehicle approaching and signal the master pressure control valve 137 to vary the operating pressure to match the particular vehicle. The sensor 139 may comprise a strain gauge or similar weighing mechanism mounted in the road surface, an optical sensor used to determine the size or length of the vehicle, or a receiver which could pick up an identification signal from a transmitter (not shown) mounted on the vehicle.

In addition to being dependant on the operating pressure within the cylinders 7, power output of the apparatus 1 is also directly related to the number of pistons 9 which are depressed by each vehicle as it passes over the apparatus 1. In order to multiply the number of pistons 9 which are so actuated, commercial vehicles may be equipped with retractable rollers (not shown) mounted under their trailers which could be extended to engage the pistons 9 of the cylinders 7 when the vehicle is passing over the apparatus 1. This would provide for more cylinder actuations than could be accomplished by the wheels of the vehicle alone.

The master pressure control valve 137 also provides a pilot signal which operates a bypass valve 141 and a discharge valve 143 which control flow through an accumulator circuit 145. The circuit 145 includes a bank of accumulators 147 and respective check valves 148. Fluid is provided to the master pressure control valve 137 at adequate pressure for the pilot signal through an orifice 149. When traffic is light and the flow from the cylinders 7 is therefore intermittent, the bypass valve 141 is held closed and fluid flows to the accumulators 147 where it is accumulated to a preset discharge pressure before being released to the turbine 12 through the discharge valve 143, thereby powering the electric generator 13 mechanically coupled to the turbine 12. When traffic is heavier and the flow from the cylinders 7 is relatively constant, a pressure signal is sent from the master pressure control valve 137 which opens the bypass valve 141 and holds the accumulator discharge valve 143 closed. This allows the fluid to flow directly to the turbine 12, bypassing the accumulator circuit 145, and powering the generator 13.

The turbine 12 is provided with a turbine protect valve 151 which, if necessary, vents flow to prevent the turbine from over-revving. From the turbine 12, fluid flows back to the reservoir 133 to be re-circulated to the cylinders 7.

Figure 8:
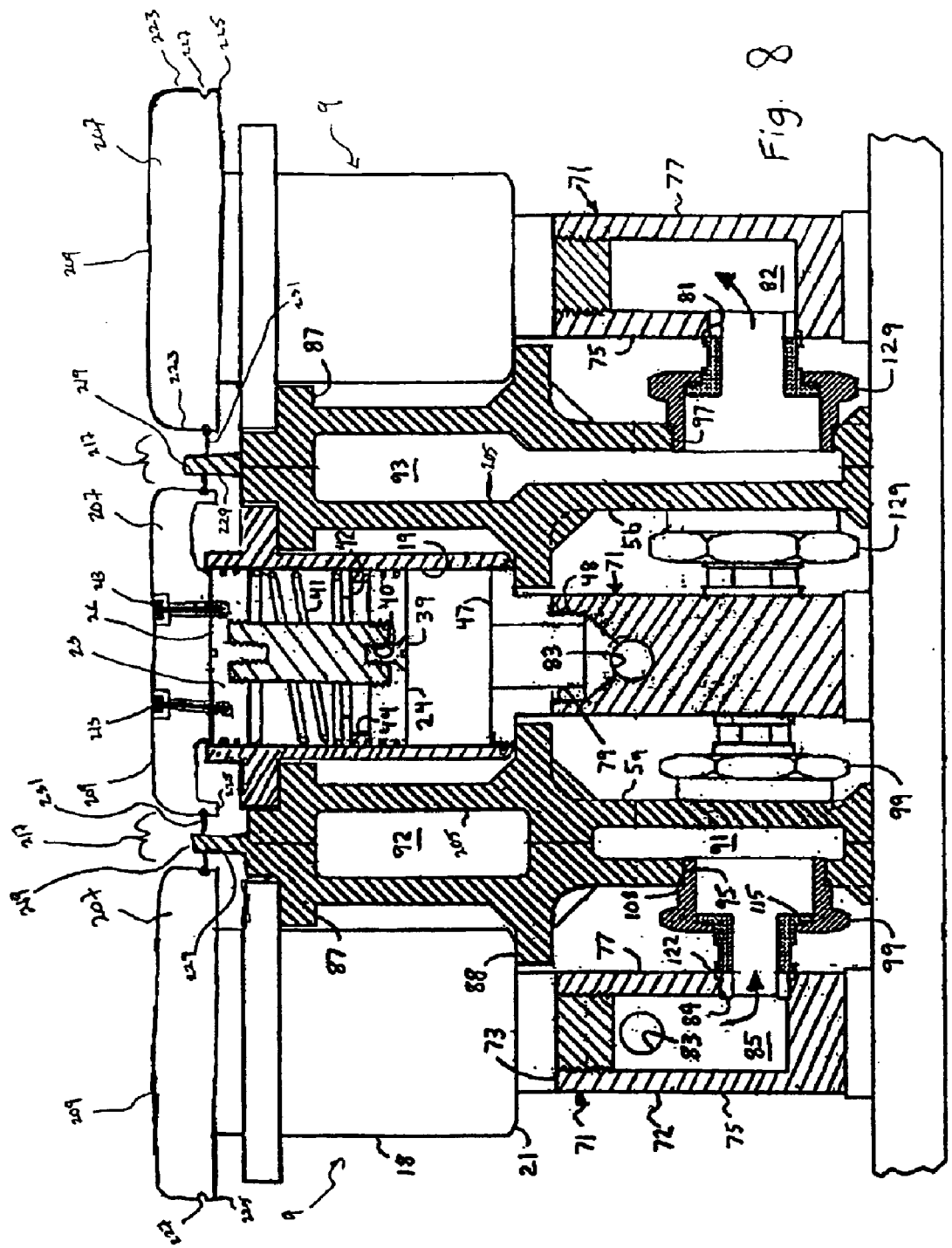
FIG. 8 is partial cross sectional view of an alternative embodiment apparatus taken generally along line 8—8 of FIG. 9.

An alternative embodiment of the power generating apparatus shall now be described in reference to FIGS. 8–11. A vertical cross section of the alternative embodiment is illustrated in FIG. 8. In general, the piston and piston array configurations are similar to those utilized in the preferred embodiment as described above and illustrated in FIGS. 3–5. However, in place of the mat 3, which forms a significant portion of the road surface of the preferred embodiment, and the plunger caps 10, which extend above the mat 3, the alternative embodiment utilizes a plurality of closely arranged platform pads 207 with substantially flat coplanar top surfaces 209 that are mounted to the upper sections 23 of the pistons 9 and collectively form a road surface.

Figure 9:
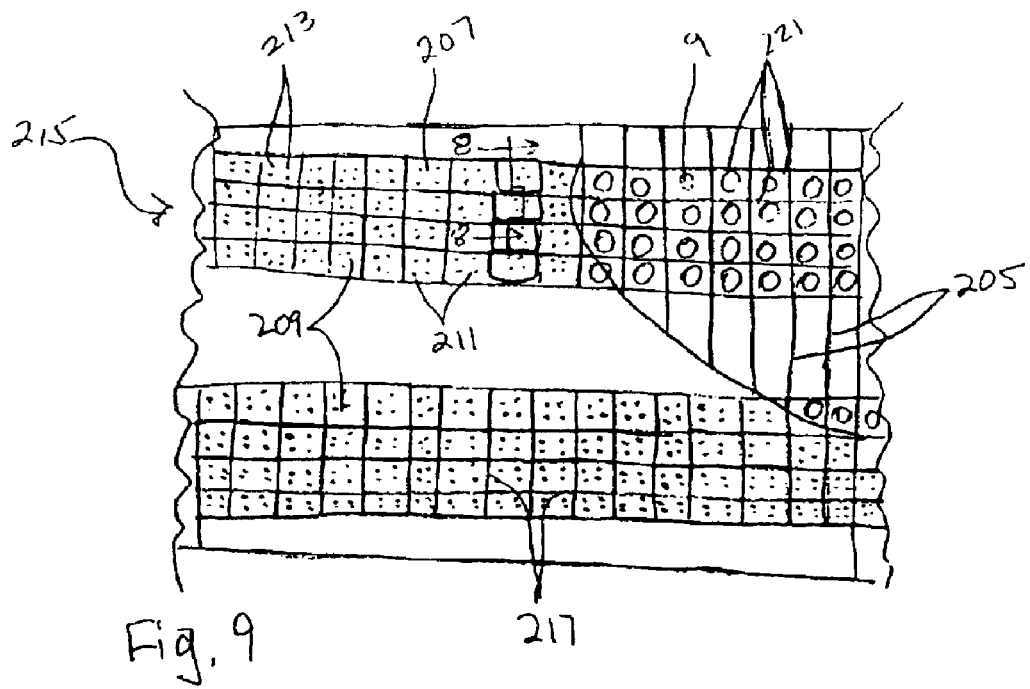
FIG. 9 is a top view of a section of a traffic lane incorporating one variation of the alternative embodiment apparatus with a section of platform pads removed to disclose the structure therebeneath.
Figure 10:
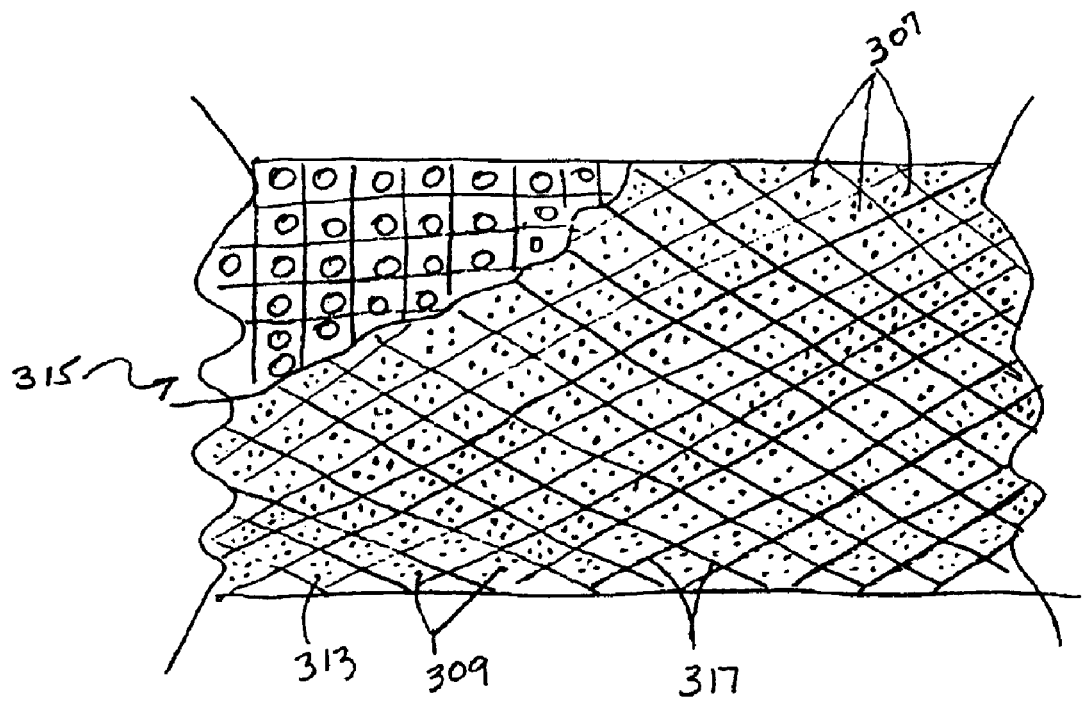
FIG. 10 is a top view of a section of a traffic lane incorporating another variation of the alternative embodiment apparatus wherein the platform pads are each diamond shaped.
Figure 11:
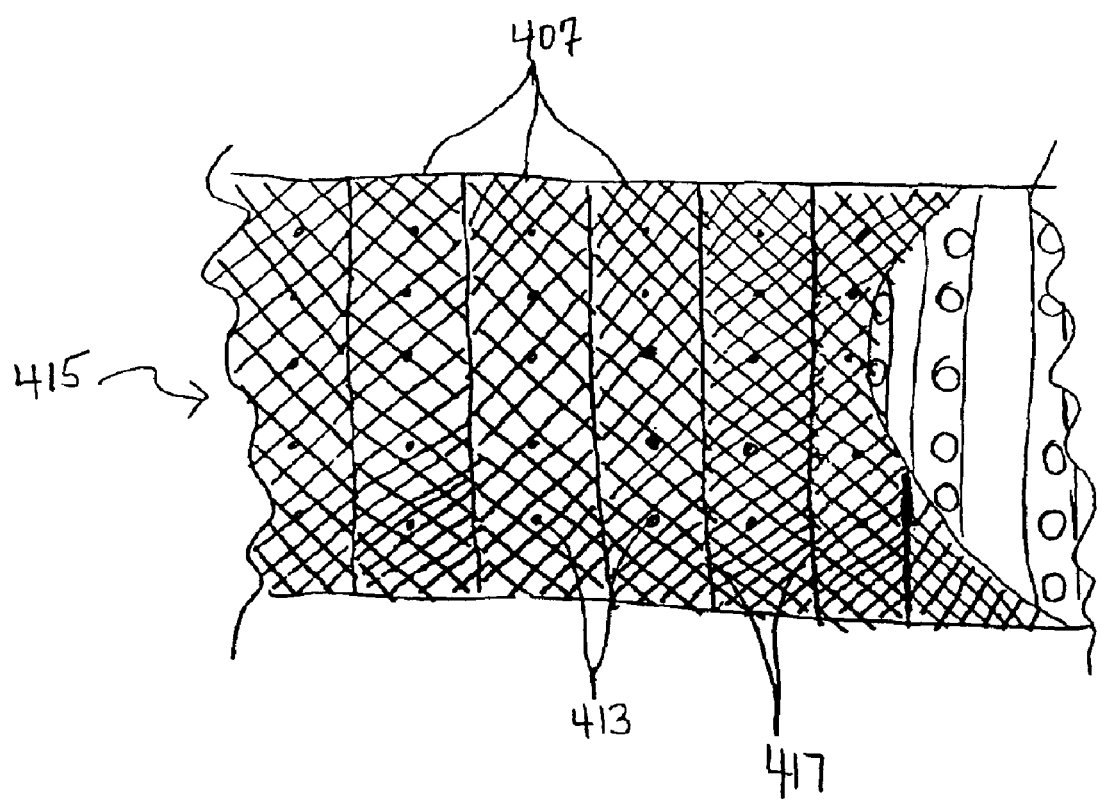
FIG. 11 is a top view of a section of a traffic lane incorporating yet another variation of the alternative embodiment apparatus with a section of the platform pads removed to disclose the structure therebeneath wherein the platform pads each span across and over several pistons.

FIGS. 9–11 illustrate top views of three variations of the alternative embodiment. In FIG. 9, the platform pads 207 have a generally square top surfaces 211 that are arrayed relative to each other to form the road surface. The size of the pads are at least partially dependant on the size of the pistons 9 utilized, but platform pads having a side length of around 8–10 inches are anticipated. Each platform pad 207 is typically centered over the piston and is individually connected to the upper face 26 of the upper piston section 23 by fasteners 213, such as machine screws or bolts, although other fastening means may be utilized as would be obvious to one of ordinary skill in the art having the benefit of this disclosure. As illustrated herein, the platform pads 207 need not extend over the entire width of a traffic lane 215 but rather can be positioned in the lane to correspond to the wheel tracks of most vehicles. It is to be appreciated that the top surface 209 of the platforms pads will be generally coplanar with the remaining surface of the traffic lane 215.

In a second variation as illustrated in FIG. 10, the platform pads 307 have diamond shaped top surfaces 309 with the long axis of the diamond platform surface extending in the direction of intended vehicle travel, thereby maximizing the time a vehicle's tire is in contact with platform to fully depress the associated piston 9. Each pad is secured to an associated piston with one or more fasteners 313 or by other suitable means. As illustrated, the platform pads 307 are arrayed to form substantially the entire surface of the traffic lane 315, although it can be appreciated that the platform pads 307 of this variation can also be utilized in a similar manner as the pads 207 illustrated in FIG. 9. Conversely, the pads 207 of FIG. 9 can be utilized in a similar manner as illustrated in FIG. 10, wherein they cover the entire road surface.

In a third variation as illustrated in FIG. 11, rigid elongated platform pads 407 are illustrated that extend in their respective longitudinal directions widthwise across the traffic lane 415. Each platform pad 407 rests on a plurality of pistons 9 arranged underneath the platform pad, whereby more than one piston is compressed as the tire or tires of a vehicle passes over the elongated platform. In certain variations, the elongated platform may be secured to each of the pistons with fasteners 413 as shown or in other variations the rigid elongated platforms may float on the upper faces of the associated pistons.

Other variations in size and shape of the platform pads are contemplated as would be obvious to one of ordinary skill in the art. In general, the top surfaces of the platforms should be coplanar with each other and arranged in such a manner to minimize the gaps 217, 317 or 417 between respective edges of two adjacent platforms to distances that will not deleteriously affect the drivability of vehicles over the lane with the platforms arranged thereon. For instance, if all vehicular traffic normally allowed on roads is allowed to travel on the portion of the road containing the power generating apparatus, then the gaps should be small enough so that the tire of a bicycle and/or small motorcycle would not get caught in the gaps or have its steerability negatively affected by the gaps. Gaps of less than 1 inch, preferably less than 0.5 inches and most preferably less than 0.25 inches are desirable, although larger gaps may be suitable in certain applications.

As described above for the preferred embodiment and illustrated in FIGS. 8 and 9, the pistons 9 of the alternative embodiment are preferably mounted between parallel, typically traversely-extending support members 205. Unlike in the preferred embodiment, however, the support members 205 of the alternative embodiment do not support a mat 3. Rather, the top surface 219 of each support member is located below the top surface 209 of the adjacent platform pads 207. When a piston 9 associated with a platform pad 207 is fully depressed, the top surface 209 of the platform is still typically located above or even with the top surface 219 of an adjacent support member 205, whereby the tire of a vehicle is substantially in contact only with the platform pads 207 and not the top surfaces 219 of the support members.

In one variation of the alternative embodiment as illustrated in FIGS. 8 and 9, a fin grid is formed by the support members 205 and additional fin members 221 that are aligned with the gaps between adjacent platform pads and span between support members 205 in a direction substantially perpendicular to the support members 205. Further, the platform pads 207 include generally vertical sides 223 that extend below the top surface 219 of the support members 205 and fin members 221 terminating at bottom edges 225. A continuous groove 227 is provided around the periphery of each platform pad on the vertical sides 223 proximate the bottom edges 225 and facing a side surface 229 of an associated fin member 221 or support member 205. One or more wiper seals 231 are housed in the continuous groove 227 of each platform pad and each seal contacts the surface 229 of the adjacent fin or support member to effectively seal the area underneath the array of platform pads 207 from moisture and road debris.

It can be appreciated that the region underneath the platforms can be sealed in a number of ways as would be obvious to one or ordinary skill in the art with the benefit of this disclosure. For instance, a resilient and or flexible membrane could be attached to the edges of adjacent platform pads spanning the gap therebetween to provide an effective seal. Further, in another variation, the entire surface of the platform pad array could be covered with a flexible or semi-rigid material, such as a coated fabric or a thin metallic or polymeric sheet that seals the region below the platform but does not hinder the vertical actuation of the platform pads and associated pistons. In yet another variation, no seal may be utilized with the pistons and other structure located under the platforms being constructed to be resistant to moisture and debris.

It is to be understood that while certain forms of the present invention have been illustrated and described herein, it is not to be limited to the specific forms or arrangement of parts described and shown. For example, while the apparatus 1 has been described herein as being hydraulically actuated, it is to be understood that pneumatics could be used instead. It is also to be understood that the turbine 12 and the electric generator 13 disclosed herein are only intended to be examples of how fluid flow created by the cylinders 7 can be converted into useful energy and that other power conversion means could be used. For example the turbine 12 could be mechanically coupled to another mechanical device, such as an irrigation pump, instead of an electric generator.

Furthermore, the present invention is not to be limited to use in connection with automobile and truck traffic, but is suitable for application to any situation where moving vehicles are passing over a land surface. For example, the apparatus 1 could easily be placed between the rails of a railroad track where the pistons 9 would be engaged by rollers or other structure mounted on the underside of passing trains. For this reason, the term "vehicle" should be interpreted to mean any land vehicle, including trains, and the terms "road" and "roadway" should be interpreted to include railroad tracks and right of ways.

Rail Implementation

As mentioned above, an embodiment of the power generation apparatus is adaptable for use with trains in general and freight trains in particular. Arrays of hydraulic cylinders generally similar to those specifically described above in reference to FIGS. 3 and 4 could be arranged between the parallel rails of a train track or along side the train track.

Figure 12:
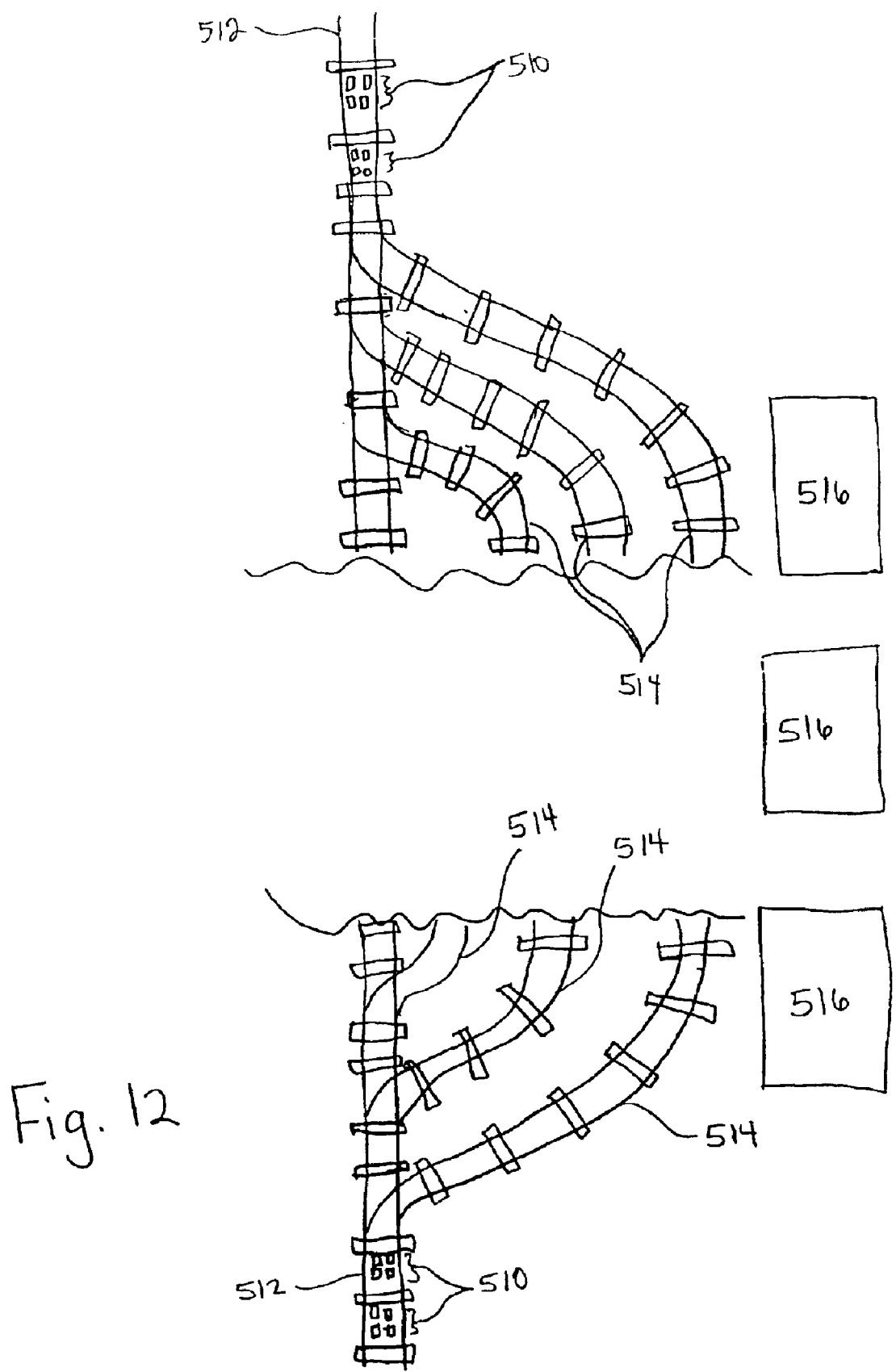
FIG. 12 is a generalized fragmentary top view of a rail yard incorporating the power generating apparatus according to one embodiment of the present invention.

In one embodiment as illustrated in FIG. 12, the power generating arrays 510 would be placed at high traffic sections of track, such as those main line tracks 512 just leaving or entering a rail yard with which all the spur tracks 514 merge and over which all trains and train cars being loaded, unloaded and otherwise serviced must travel. The power generated from the train traffic could be utilized exclusively to satisfy a significant portion of the electrical needs of the rail yard buildings 516 or alternatively the power generated could be dumped into the electrical grid for general use by power consumers.

Figure 13:
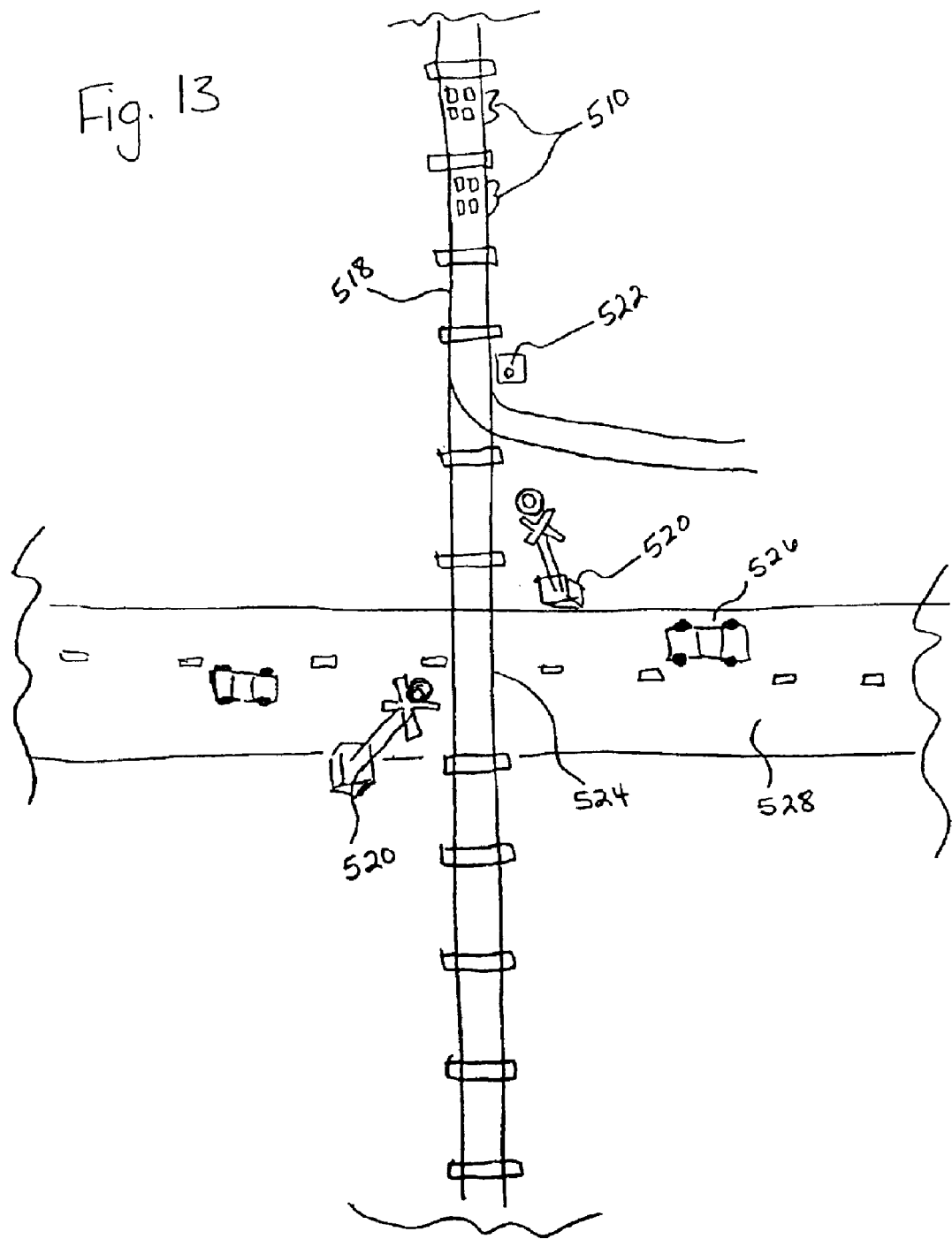
FIG. 13 is a generalized top view of a rail crossing incorporating the power generating apparatus according to one embodiment of the present invention.

According to another embodiment as illustrated in FIG. 13, power generating arrays 510 could be placed along relatively remote sections of track 518 where the power generated from the arrays 510 could be used to power signal lights 520 and/or switches 522, as well as any associated crossing gates. For example, a power generating array 510 could be placed a suitable distance from a remote road crossing 524 such that the power generated from the array powers the signal light 524 to notify any vehicular traffic 526 on the road 528 of the incoming train.

Figure 14:
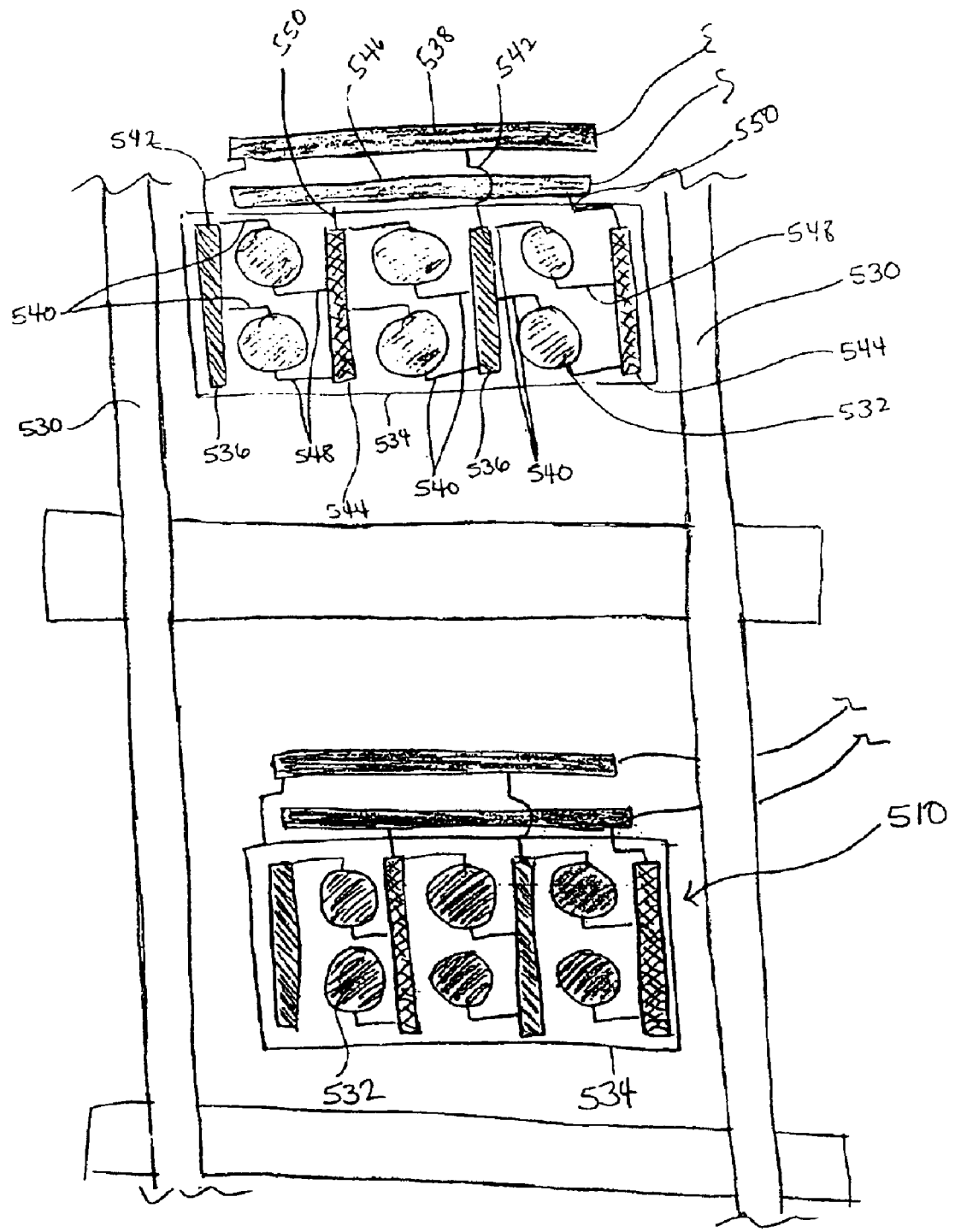
FIG. 14 is a schematical top view of one embodiment of the power generating array located in-between the rails of a train track.
Figure 15:
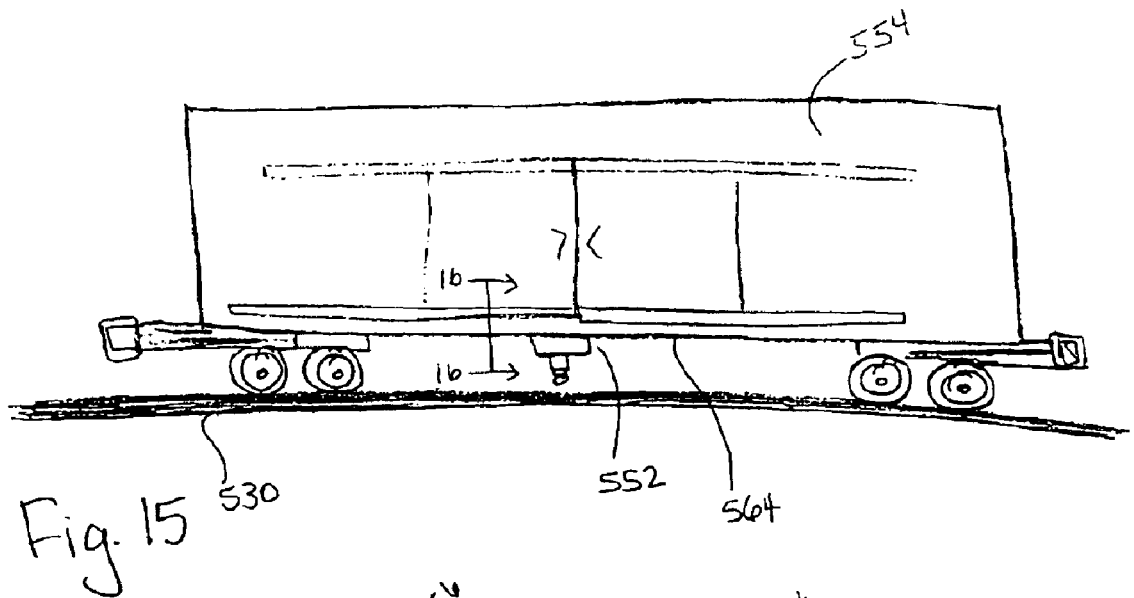
FIG. 15 is a side view of a train car incorporating an activator assembly.
Figure 16:
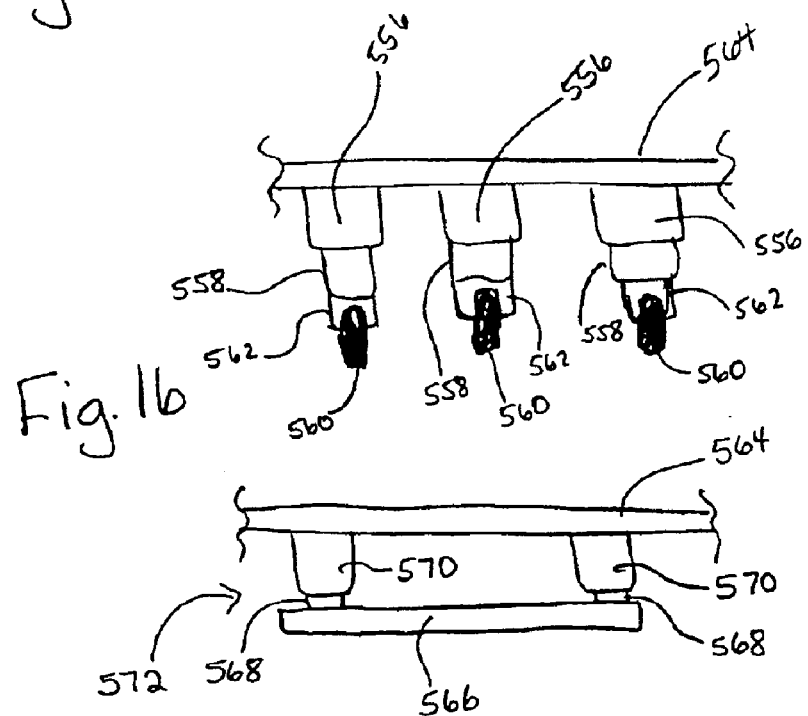
FIG. 16 is a front view of the activator assembly as taken along line 16—16 of FIG. 15.

Referring primarily to FIGS. 14–16, one embodiment of the rail implementation, wherein the power generating arrays are located in-between the rails and hydraulic or pneumatic activators are mounted to the bottom side of a rail car is described below. FIG. 14 is a partial top view and a schematic representation of a pair of 3.times.2 power generating arrays 510 spaced apart from each other between the rails 530 of a train track. The actual number of hydraulic cylinders (or actuators) 532 provided in each array is a matter of design and engineering choice based on a number of factors including, but not limited to, (i) the average speed of the trains passing over the arrays, (ii) the necessary recovery time of the cylinders, (iii) the spacing between arrays, and (iv) the energy generating capacity of the cylinders.

Although cylinders having rounded top pads are illustrated in this FIG. 14, other configurations of cylinders with different shaped top pads can be utilized. Further, the manner in which the hydraulic cylinders are coupled together and plumbed can be similar to the system illustrated in FIGS. 1–5 as discussed above or in an all together different manner of connecting and supporting the cylinders may be used. For instance, in the case of a power generating array for a rail system there is no concern over the ability of various types of traffic to pass over and be supported by the structure of the power generating array 510, therefore no support structure such as mat 3 of FIG. 3 is required. It is appreciated that the array 510 of the rail embodiment may simply comprise a plurality of self-supporting cylinders 532 that are affixed to a base 534 and are operatively interconnected by a plurality of hydraulic lines, hoses, valves and manifolds.

The hydraulic cylinders 510 of the rail embodiment may differ from the cylinders of the roadway embodiments in other ways as well. For instance, because of the nature of the roadway power generating array, the maximum possible deflection of the hydraulic cylinders utilized is typically less than 1.5". This maximum deflection is related in part because the roadway system is to be used by a wide variety of vehicles and greater deflections could have a deleterious effect on the operation of certain types of vehicles. Greater deflections in excess of 1.5" inches are possible with the rail embodiment as the maximum amount of deflection is not limited due to vehicle support concerns. Further, the cylinders are actuated by synergistically designed skids or rollers attached to the train rather than whatever type of wheel a vehicle is using in the case of the road embodiment.

Another manner in which the rail embodiment hydraulic actuators can differ from the roadway actuators is in their size and operating pressures. While automobiles that make up most of the vehicular traffic over roadways typically weigh 5,000 pounds or less, train cars can weight 75,000 to 100,000 pounds, therefore much more force is available to depress the hydraulic cylinders. Accordingly, larger cylinders that can move a greater volume of fluid at higher operating pressures can be utilized to maximize the amount of energy captured each time a cylinder is activated.

Figure 17:
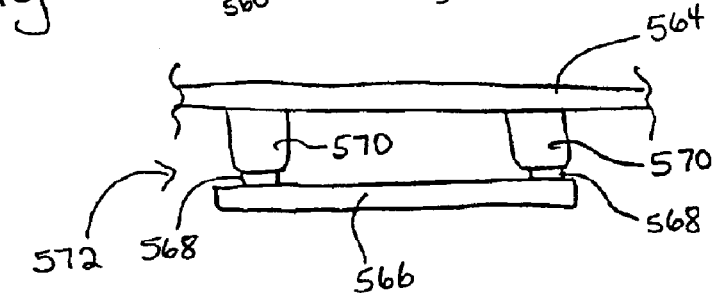
FIG. 17 is a front view of an alternative activator assembly.
Figure 18:
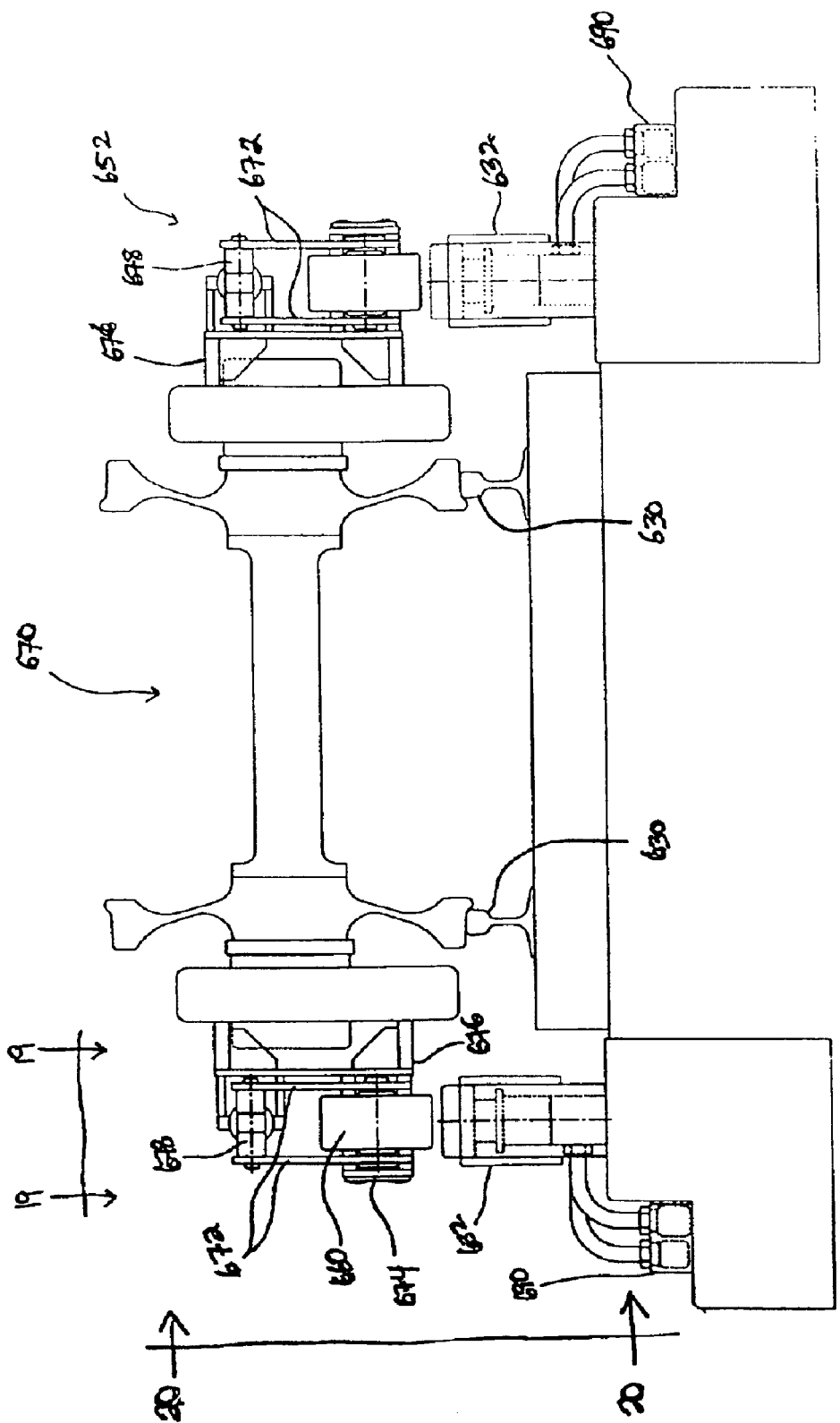
FIG. 18 is a front view of the wheel carriage of a train car having retractable outboard side activators mounted to the wheel carriage.
Figure 19:
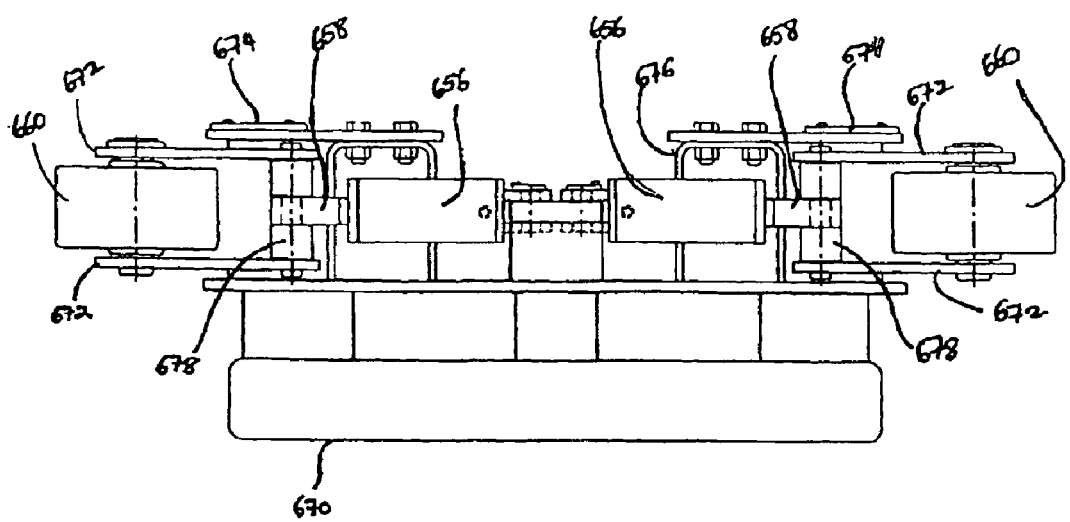
FIG. 19 is a top view taken along line 19—19 of FIG. 18.

Referring back to FIG. 14, each cylinder is fluidly coupled to a source of hydraulic fluid through manifolds 536 and 538 and supply lines 540 and 542. Additionally, each cylinder is coupled to a hydraulic power generation circuit 11 similar to the one illustrated in FIG. 5 through manifolds 544 and 546 and supply lines 548 and 550. Operationally, as a train car 554 passes over each array 510, an activator 552, as illustrated in FIGS. 15–17 and described in detail below, contacts the top pads of the cylinders 532, depressing the associated pistons and causing pressurized hydraulic fluid to flow into the hydraulic circuit to create electricity. After the activator has passed over and depressed at least one of the pistons in a cylinder of the array 510, that piston is encouraged back into its nominal position by a spring (see FIG. 3, spring 41) so that the cylinder can be filled with hydraulic fluid and actuated by the next activator mounted to the same or another train car.

Typically, adjacent power generating arrays 510 are spaced apart by 30–36". The minimum spacing between adjacent activator arrays 552 is dependant primarily on the recovery time of the cylinders 510 of the associated power generating arrays. After a cylinder is actuated, the piston of the cylinder must be returned to its nominal position. As the piston is encouraged upwardly by an associated spring, the hydraulic fluid refills the lower fluid cavity (19b in FIG. 4). It is to be appreciated that in order to generate the maximum amount of energy from each cylinder and each array, the cylinders must fully recover before being activated by the next activator array 552. In situations where the power generating arrays are located at a rail yard where the trains move at relatively slow speeds the activators 552 can be placed relatively close together. However, when the power generating arrays are located between a remote section of track that the trains travel over at relatively high speeds the activator arrays must typically be located further apart.

Two activator assembly embodiments are illustrated in FIGS. 15–17. Referring to FIG. 15, a typical train car is illustrated with a hydraulic or pneumatically actuated activator assembly attached to its bottom side 564. This activator assembly is illustrated in greater detail in FIG. 16 and comprises a plurality of vertically-orientated hydraulic or pneumatic cylinders 556 having moveable shafts 558 extending therefrom with rollers 560 rotatably mounted to devises 562 that are secured to the end of the shafts. The rollers 560 directly contact and push down the pistons of each cylinder of the power generating array 510. Accordingly, the number of hydraulic or pneumatic cylinders utilized with each activator assembly will generally depend on the configuration of the power generating array. For instance if the power generating array is three cylinders wide, the activator assembly will also be three cylinders wide.

The hydraulic or pneumatic cylinders 556 of the activator assembly 552 permit the rollers to be moved upwardly when the activator assembly is not being utilized to avoid impact with things that might be located between the rails of the track. It is also appreciated that a number of activator assemblies might be spaced relatively close together on a single train car 554 or on several adjacent train cars, wherein the number of the activator assemblies that are extended is dependant on the speed of the train and the spacing of the power generating arrays. For instance, when a train is moving very slowly in a train yard all the activator assemblies 552 may be extended to contact the hydraulic cylinders of the power generating arrays. Conversely, when the train is moving swiftly only one out of every several activator assemblies might be extended so as to give the cylinders of the power generating arrays time to recover fully before being impacted by the next activator assembly.

FIG. 17 shows an alternative embodiment activator assembly 572 wherein the plurality of rollers are replaced with a single skid pad 566 attached to the end of the shafts 568 of associated hydraulic or pneumatic cylinders 570. The skid pad typically has a width equal to or greater than the width of the associated power generating arrays such that the skid pad simultaneously actuates each row of cylinders 532 in the power generating array 510. In a manner similar to the roller embodiment activator assembly 552, the skid pad embodiment 572 can be raised and lowered as necessary. The front edge of the skid pad is typically angled upwardly in order to provide a more effective depression of the piston in the cylinder. Other configuration activator assemblies are contemplated including assemblies that are fixed and do not extend or retract.

In another embodiment of the rail implementation of the power generating apparatus, power generating arrays are located along side the rail tracks 530 instead of in-between the tracks and utilize side or outboard mounted activator assemblies as illustrated in FIGS. 18–23. In the illustrated outboard activator embodiment, the activator assemblies 652 are mounted on either side of the wheel carriages of the train cars. Other types of outboard activators are contemplated that utilize different deployment mechanisms and are mounted in different locations on the rail car. For instance, other alternative outboard activator assemblies could be mounted to the side of the train car on the car's frame instead of the wheel carriages. It is to be appreciated, however, that a wheel carriage mounted assembly is preferred for use when hydraulic power actuators 632 are mounted along curved tracks.

Referring primarily to FIGS. 18–21, the illustrated outboard activator assembly 652 typically comprises a contact wheel 660 that is attached and sandwiched between the ends of generally horizontal portions of two "L"-shaped arms 672. The "L"-shaped arms are in turn pivotally connected to a carriage wheel assembly 670 at their bends by a bearing assembly 674 and associated bracketry 676. The other ends of the generally vertical portions of the arms are pivotally coupled through a bushing member 678 to the end of a shaft 658 of a generally horizontally orientated hydraulic cylinder 656. The other end of the hydraulic cylinder 656 is secured to the wheel carriage assembly by the bracketry 676.

Figure 20:
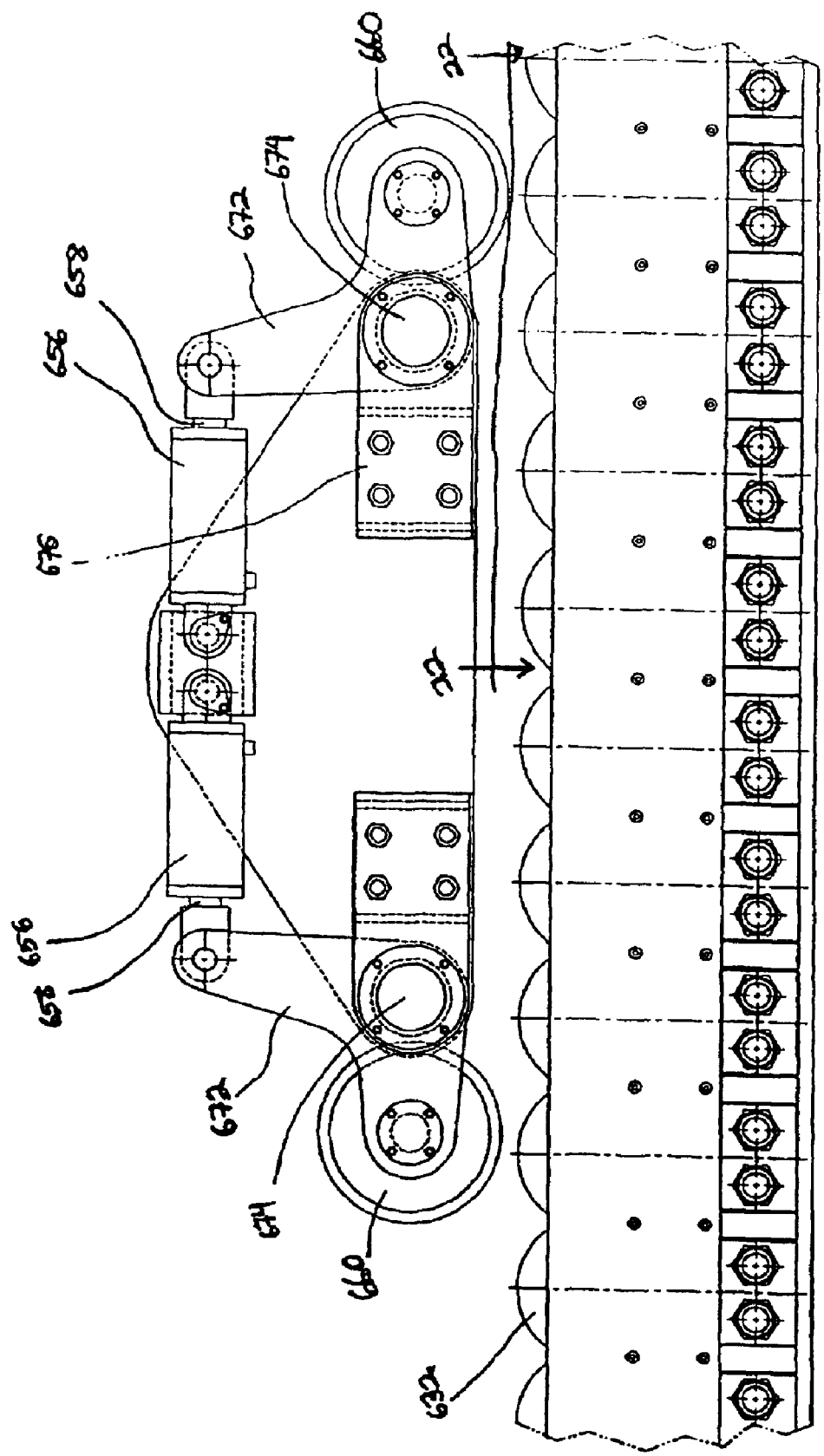
FIG. 20 is a side view taken along line 20—20 of FIG. 18 illustrating the side activators in their retracted or up positions.
Figure 21:
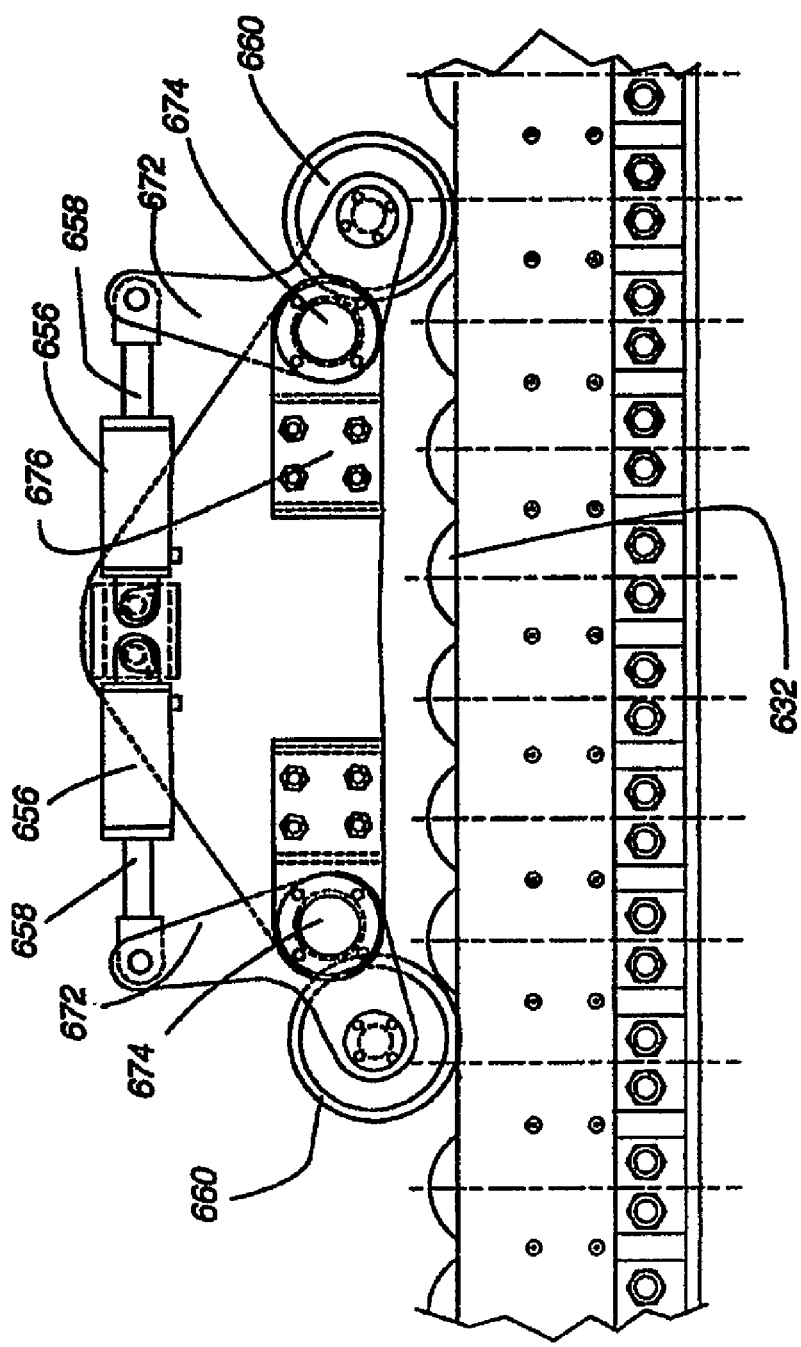
FIG. 21 is a side view taken along line 20—20 of FIG. 18 illustrating the side activators in deployed positions.
Figure 24:
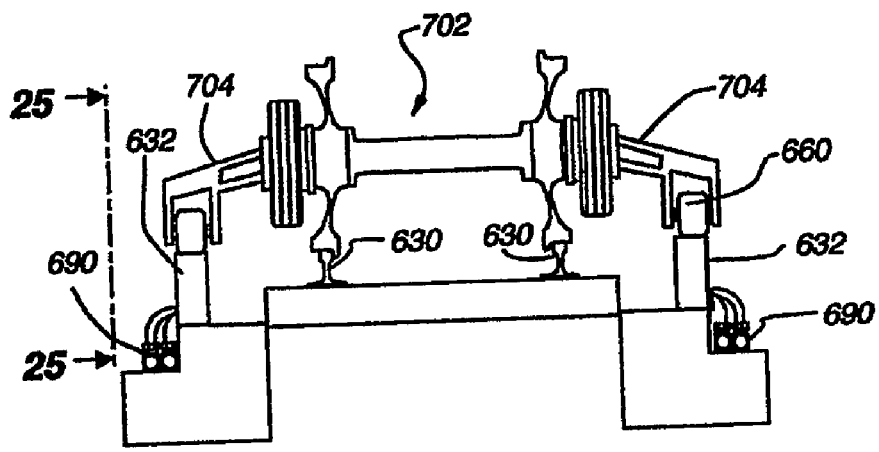
Figure 25:
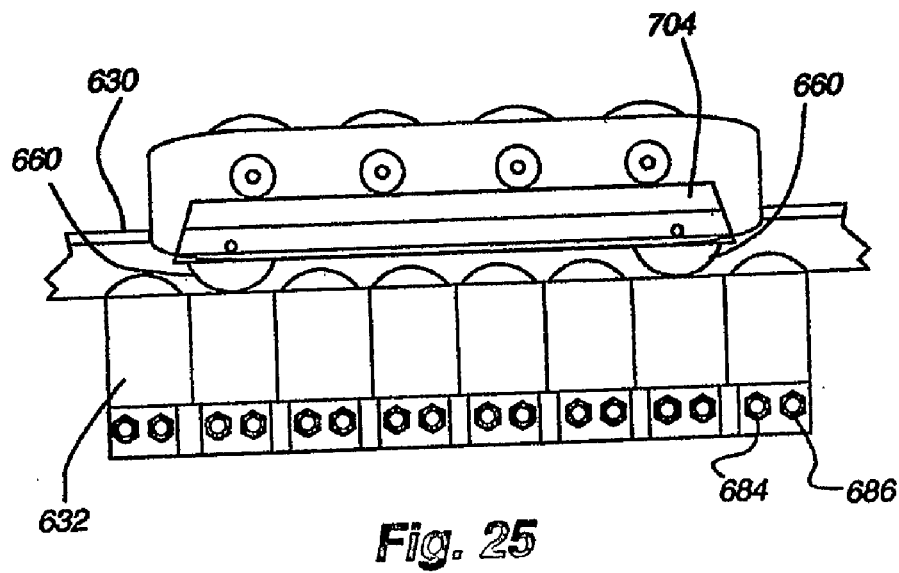
Figure 26:
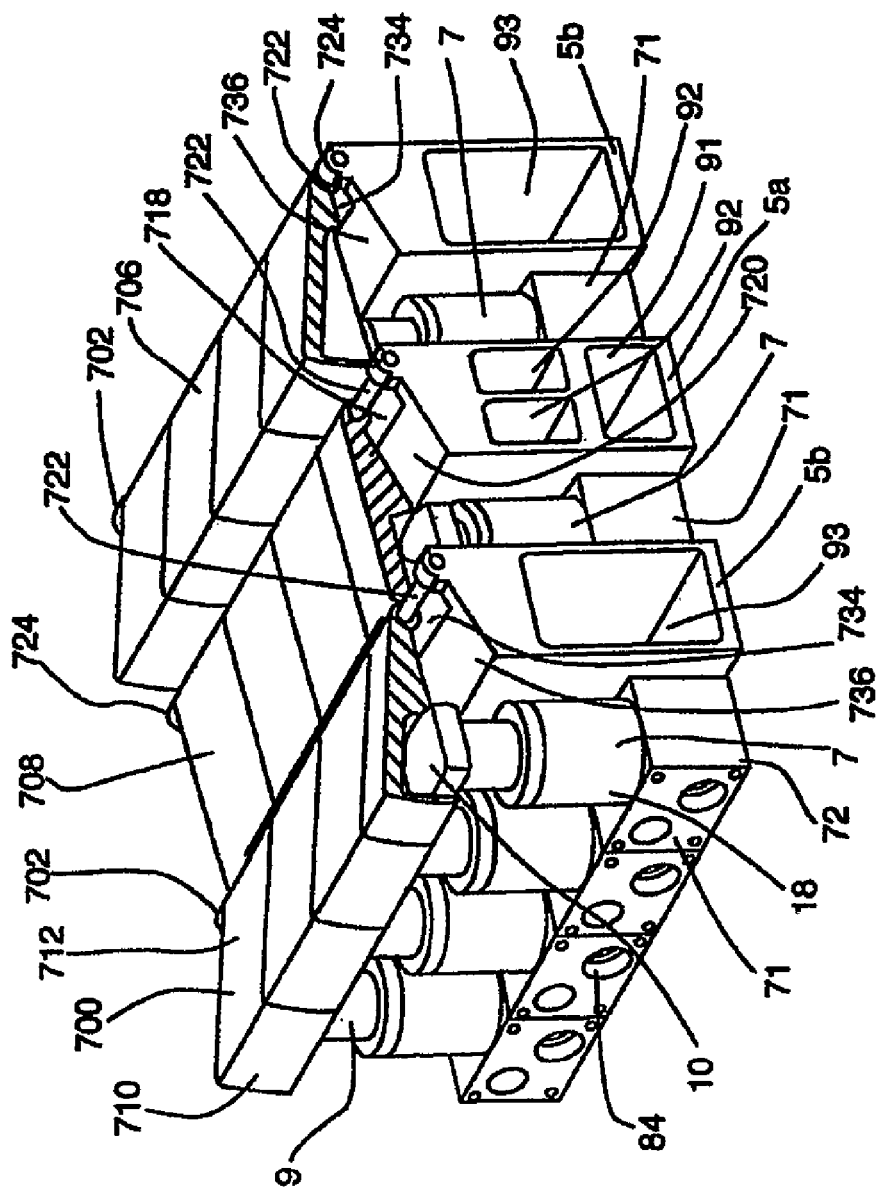
Figure 27:
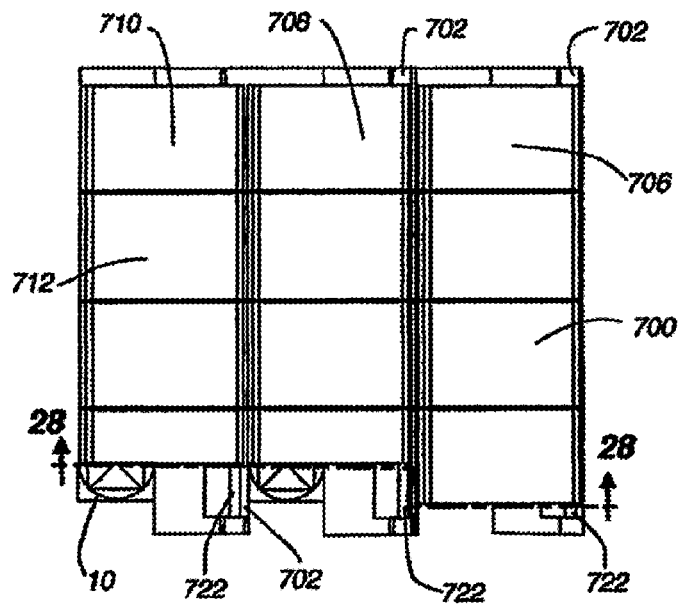
Figure 28:
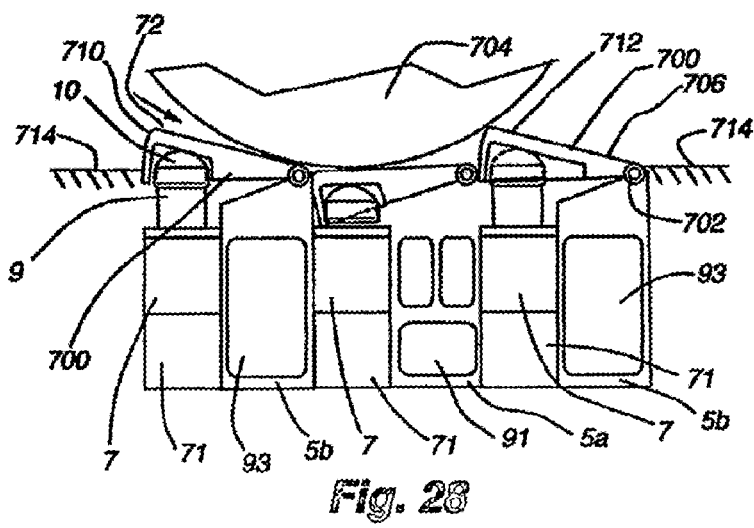
Figure 29:
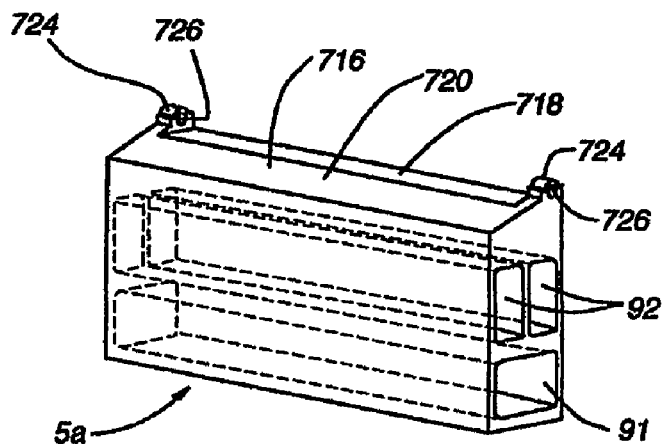
Figure 30:
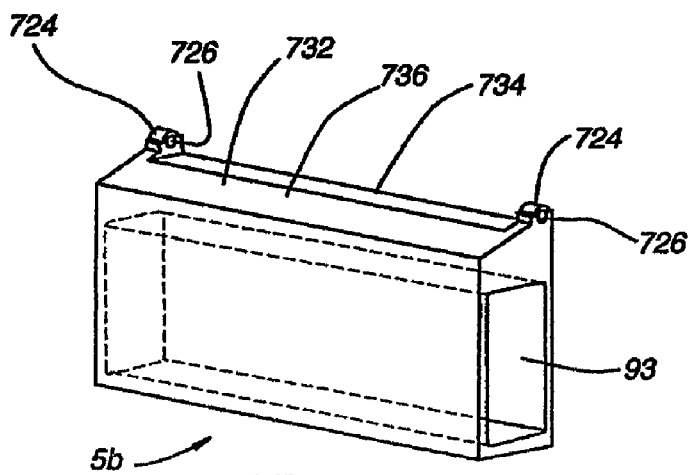
Figure 34:
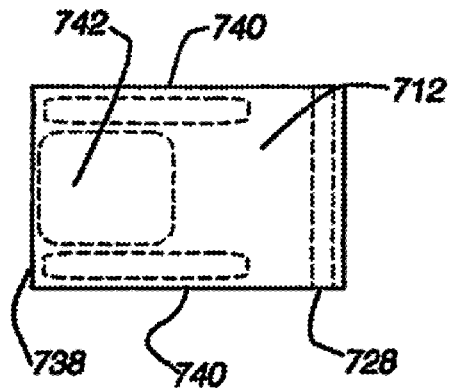
Figure 31:
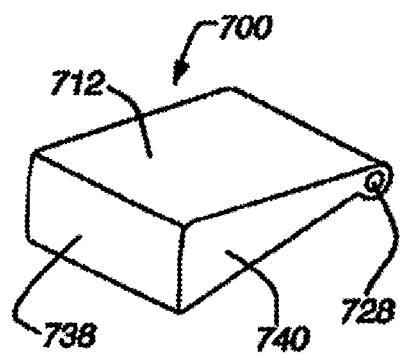
Figure 33:
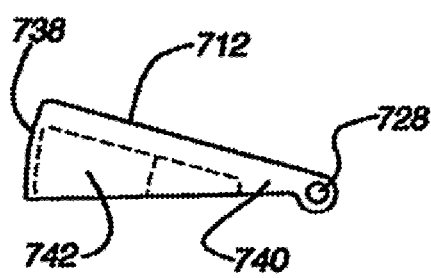
Figure 32:
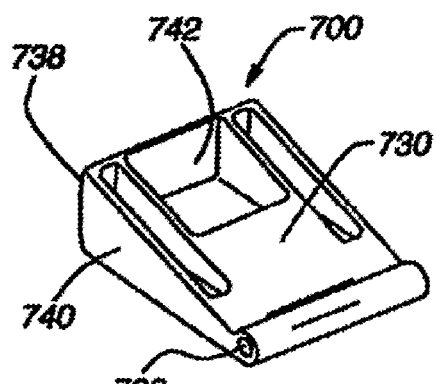
Figure 35:
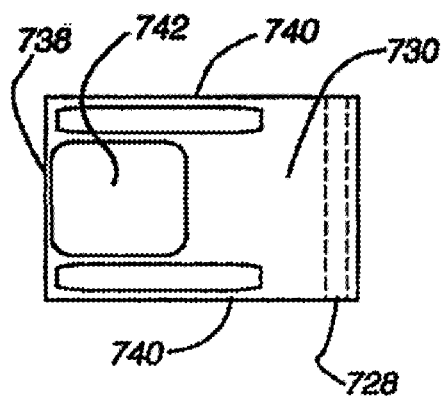
Figure 36:
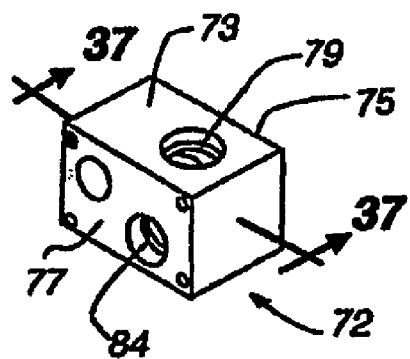
Figure 37:
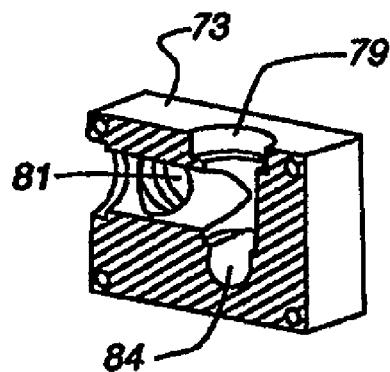
Figure 38:
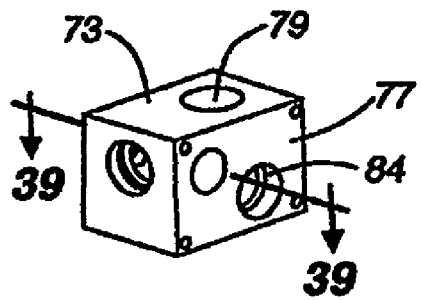
Figure 39:
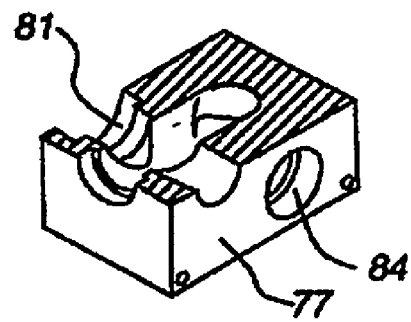
Figure 40:
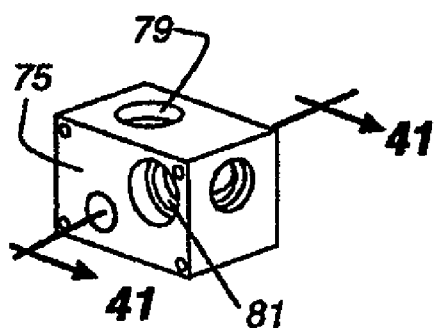
Figure 41:
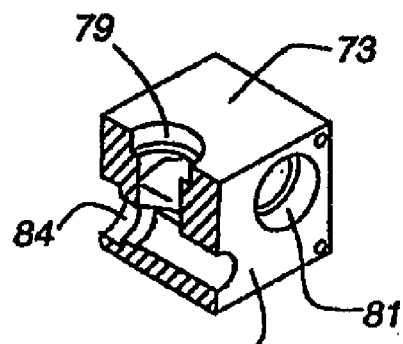

The illustrated activator assemblies 652 permit the contact wheels 660 to be either deployed to impact and depress the associated hydraulic power actuators 632 or retracted wherein the contact wheels are vertically spaced above the hydraulic power actuators. To extend the activator assemblies so that the contact wheels are in their lowered position for contacting the associated hydraulic power actuators, pressurized hydraulic fluid is pumped into the hydraulic cylinder 656 causing its shaft 658 to extend as shown in FIG. 21. Referring specifically to FIGS. 20 and 21, as the shaft 658 extends outwardly, the L-shaped arms 672 are pivoted about the bearing assembly 674 causing the associated contact wheel to be lowered. Once in the lowered position, a locking mechanism located internally within the hydraulic cylinder is activated to hold the assembly in the extended position. Once the locking mechanism has been activated, a valve in the cylinder can be opened to depressurize the hydraulic fluid. Alternatively, the hydraulic cylinder can remain pressurized with fluid acting to hold the assembly in the extended position without a locking mechanism.

Still referring to FIGS. 20 and 21, to retract the extended activator assembly, the locking mechanism is released (the locking mechanism can comprise a solenoid) and a biasing spring contained within or external to the cylinder encourages the shaft to retract back into the cylinder body in turn causing the L-brackets to pivot the contact wheel upwardly. Alternatively where no locking mechanism is used, a valve in the cylinder can be opened to depressurize the hydraulic fluid. In another variation of the hydraulic cylinder, a second chamber can be provided in place of a biasing spring, wherein pressurized fluid is pumped into the second chamber to retract the shaft and push the fluid from the chamber used to pressurized and extend the shaft. Further, a dual-acting cylinder could be utilized wherein there is a pressurize/discharge port on each end of the cylinder and a piston is contained within the cylinder between the ports, such that pressurized fluid can be pumped into chambers on either side of the piston to move it back and forth. Of course, pneumatic cylinders can be utilized in place of the hydraulic cylinders in other embodiments of the outboard activator assembly.

A typical train car has a total of 8 activator assemblies 652 mounted to it; two assemblies on each side of each of the two wheel carriages 670. The ability to retract and extend the contact wheels serves to provide additional clearance between the ground proximate the side of the rail 630 and the contact wheels. Additionally, the retractability of the assemblies allows correlation between the weight of the train car and the number of activator assemblies that are deployed.

Ideally, the power transfer system is designed to maximize the amount of energy transfer as a train car passes by and activates a bank of hydraulic power actuators 632. The greater the pressures required to depress the pistons in each of the hydraulic power actuators, the greater amount of energy that will typically be generated. Therefore, it is desirable to set the amount of force necessary to depress the actuators to a level at or slightly less than the maximum weight of the typical train car divided by the number of actuators that are depressed at a given time. So, if the typical train is 100,000 pounds loaded and the train car has a total of eight activators, the ideal pressure to activate each actuator to generate the maximum amount of energy would be around 12,500 pounds or slightly less. If a similarly configured empty car that weighs around 25,000 pounds passes by the bank of hydraulic actuators, for example, the load incident on each hydraulic actuator would only be about 6,250 pounds and the actuator's pistons would not be depressed and no power would be generated. However, by retracting six of the eight activator assemblies, the load applied to each of the associated hydraulic power actuators by the remaining two assemblies would be around 12,500 pounds, enough to depress the actuators and generate the maximum amount of power from the empty train car. It is appreciated that the number of deployed activator assemblies can be adjusted to any number between 1 and 8 depending on the weight of the train car. It is further appreciated that the train car weights and the actuation weights used in this example are merely illustrative and that the actual weights will vary.

The valves and pumping hardware necessary to extend and retract the hydraulic cylinders 656 of the activator assemblies 652 are not illustrated, but any system that is well known in the art may be utilized. For instance, pressurized accumulators could be utilized to provide the hydraulic fluid to the necessary cylinders. The accumulators could be coupled to a pump or could be recharged periodically. A pump alone could also be utilized. In one embodiment of the activator assembly, it is contemplated that only ½ gallon of fluid would be required to deploy and retract the contact wheel 660 for each cycle.

In at least one variation of the outboard activator assemblies, a stator is incorporated into the contact wheels 660 to generate electricity for powering the outboard activator assemblies 652. In one variation, the stator is coupled with batteries that in turn are used to power a hydraulic pump. In another variation, the hydraulic cylinders 656 are replaced with electromechanical linear actuators to move the assemblies from their deployed and retracted positions. One such type of mechanical actuator is a lead-screw assembly that can be motor driven or deployed via a hand crank. Additionally, a lead-screw assembly can include a receiver chuck that would allow a user to deploy the lead screw with a hand-held gear motor or the like.

Figure 24:
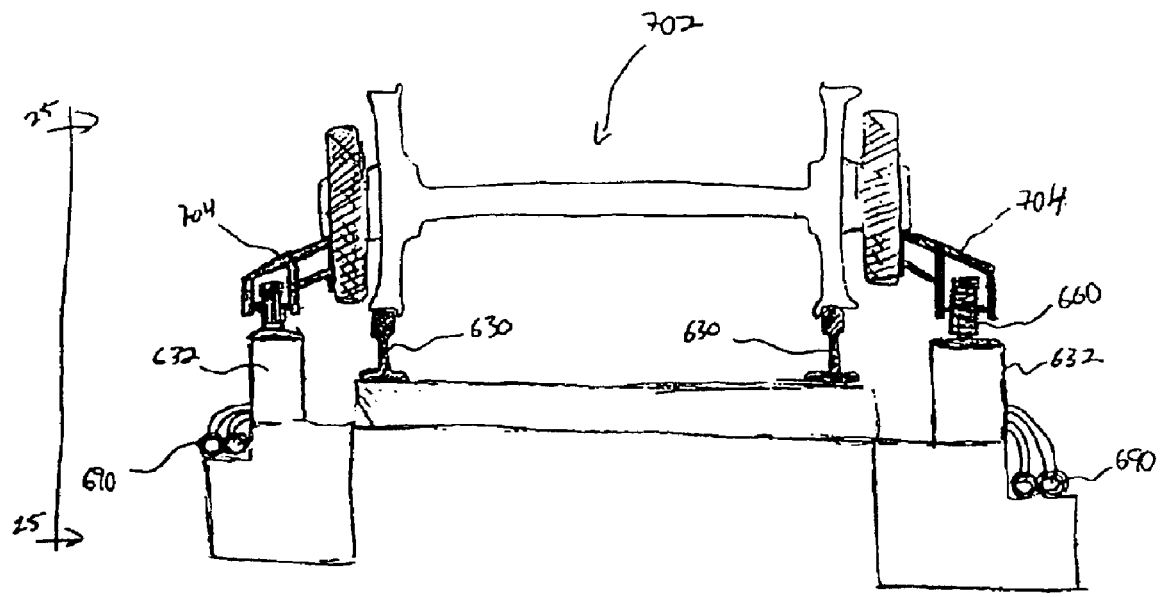
FIG. 24 is a front view of the wheel carriage of a train car having fixed outboard side activators mounted to the wheel carriage.
Figure 25:
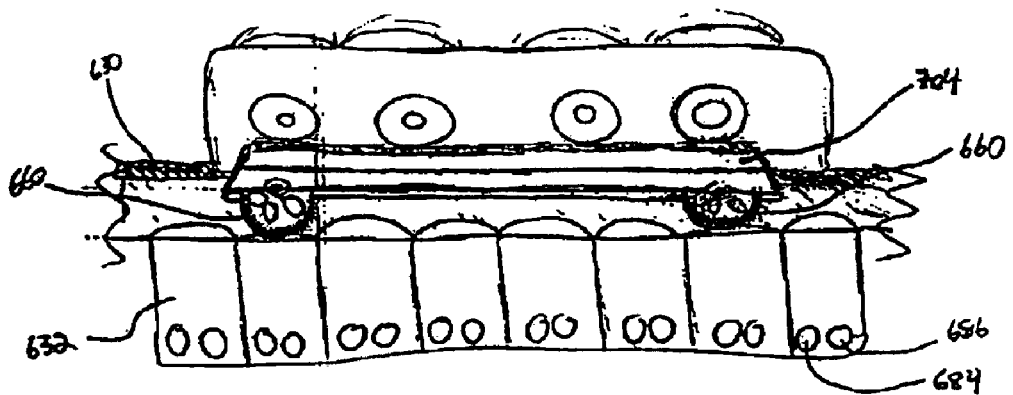
FIG. 25 is a side view taken along line 25—25 of FIG. 24 illustrating the fixed outboard side activators.

Alternatively, fixed outboard activator assemblies 702 (as shown in FIGS. 24 and 25) can be utilized in place of the retractable outboard activator assemblies described above. The illustrated assembly has contact wheels 660 that are always fixedly deployed by a boom 704 that is attached to the train car in a position that can contact and depress associated hydraulic actuators 632.

In general, the mechanical workings of the hydraulic power actuators 632 of the outboard train implementation are similar to the actuators described in reference to FIGS. 3–5 with differences primarily relating to the manner in which the actuators are supported and the manner in which they are plumbed. Additionally, the sizes of the actuators and their pressure activation settings will vary depending on the type of application in which they are utilized. For instance, rail car actuators will have a much higher activation weight requirement than actuators for automotive applications, because rail cars are much heavier than on-the-road vehicles.

Referring to FIGS. 22 and 23, the banks of actuators utilized with the outboard activator assemblies are typically linearly aligned on either side of the train tracks 630. A support structure 685 is provided to secure the actuators 632 in place and provide the necessary lateral support to the actuators. For ease of maintenance and simplicity of construction, the inlet and outlet ports 684 and 686 for moving hydraulic fluid to and from the actuator are placed along a front side of the actuators. The ports are in turn connected to one or more manifolds 690 that transport the hydraulic fluid from a fluid source and to a hydraulic turbine. This configuration differs from the roadway implementation in that fluid passages are not provided integrally within the support structure. However, the one or more manifolds operate in a substantially similar manner as the manifolds 5a, 5b, 131 and 135 of FIG. 5, providing a passage for the hydraulic fluid to and from one or more hydraulic actuators.

In the preferred configuration of the outboard rail implementation, the caps 688 of each actuator are preferably convexly shaped to better absorb and transfer the impact force of the contact wheels. In a manner somewhat similar to the actuators illustrated in FIG. 8, the caps include a groove around their circumference in which a seal 631 is received and secured. The seal abuts against an upwardly extending fin 619 of the support structure that encircles each cap of each actuator. The seal helps prevent dirt, debris and moisture from entering the moving components of the actuators that can shorten the working life span of the actuators.

Figure 26:
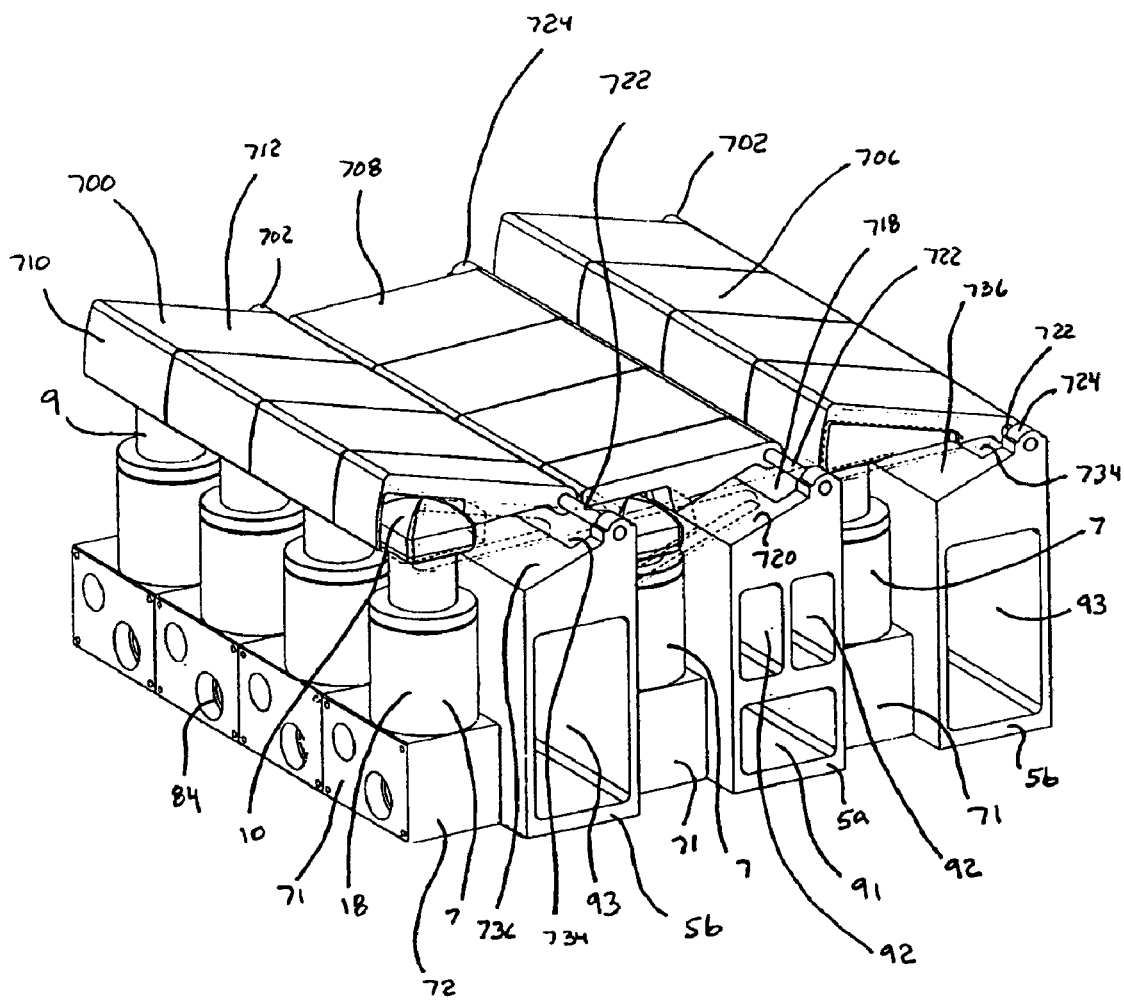
FIG. 26 is an isometric view of the power generating apparatus utilizing a louver-shaped pivotal platform above each cylinder.
Figure 27:
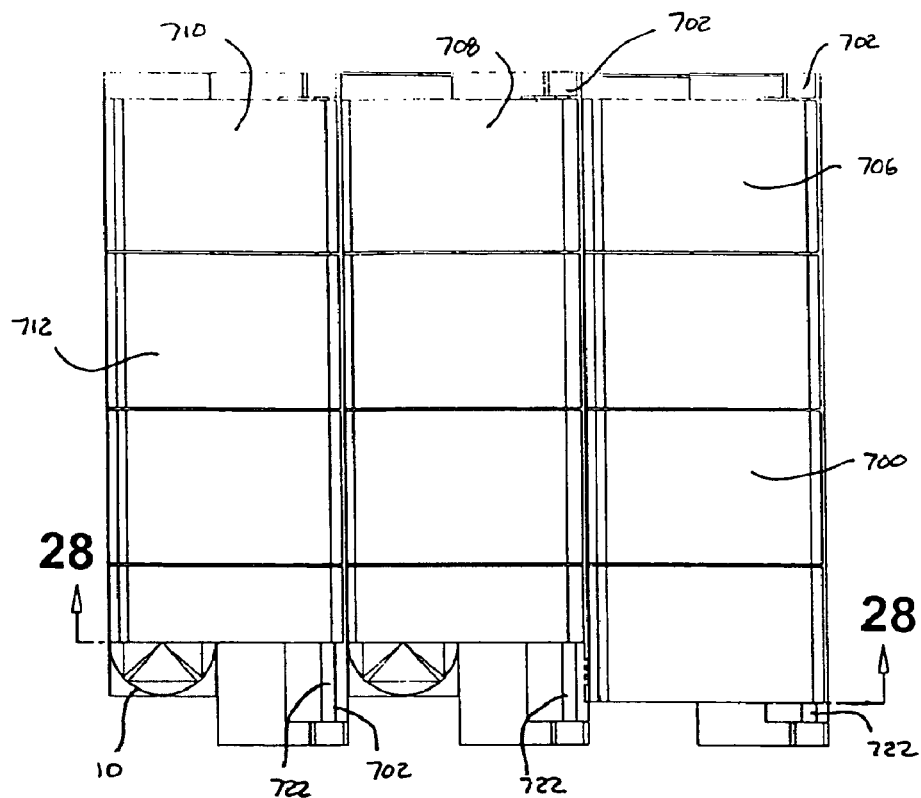
FIG. 27 is a top view of the power generating apparatus shown in FIG. 26.
Figure 28:
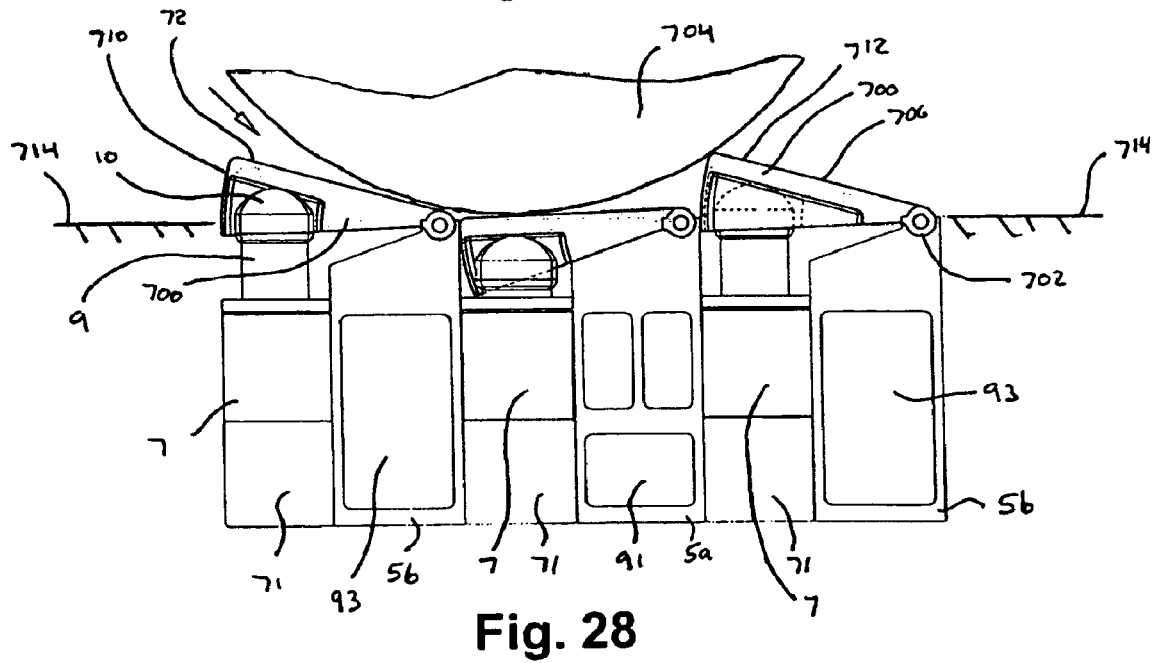
FIG. 28 is a cross-sectional side view of taken along line 28—28 of FIG. 27.

Alternative embodiments of the present invention may be configured to further reduce tire or wheel impact while at the same time providing for a longer piston stroke. For example, the embodiment shown in FIGS. 26–28 utilizes louver-shaped pivotal platforms 700 arranged to engage the hydraulic cylinders 7. The hydraulic cylinders 7 depicted in FIGS. 26–28 are generally similar to those specifically described above with reference to FIGS. 3 and 4. The pivotal platforms 700 can be pivotally connected with the pressure manifold 5a and the supply manifold 5b through platform hinge assemblies 702. It is to be appreciated that the pivotal platforms 700 can also be connected with objects other than the pressure manifold and the supply manifold. For example, in one embodiment of the present invention, the pivotal platforms are connected with an overlying mat such as described above with reference to FIG. 1. As shown in FIG. 28, a tire or wheel 704 of a passing vehicle engages the pivotal platform 700, which causes the pivotal platform to pivot about the platform hinge assembly 702. As the pivotal platform 700 pivots, it engages the plunger cap 10 of the hydraulic cylinder 7 and actuates the piston 9 extending from the cylinder body 18. It is to be appreciated that the embodiment shown in FIGS. 26–28 can be utilized with various types of passing vehicles, such as cars, trucks, and trains.

Three rows of pivotal platforms 700 and hydraulic cylinders 7 are shown in FIGS. 26–28 in various stages of operation. It is to be appreciated that although three rows of pivotal platforms and hydraulic cylinders are shown, the present invention can be configured with more or less rows with varying numbers of pivotal platforms and hydraulic cylinders in each row. A first row 706 of pivotal platforms is shown in an "at rest" position with the hydraulic pistons 7 in a full upward stroke. A second row 708 of pivotal platforms is shown in a "fully actuated" position with the hydraulic pistons in a full downward stroke. A third row 710 of pivotal platforms is shown in a "partially actuated" position wherein the piston is between the full upward stroke and the full downward stroke. FIG. 28 illustrates the tire 704 of a passing vehicle engaging the second row 708 and the third row 710 of the pivotal platforms 700. As shown in FIG. 28, when the pivotal platform 700 is in the "at rest" position (as shown with respect to the first row 706), a top surface 712 of the pivotal platform 700 extends from the platform hinge assembly 702 upward at an angle relative to the road surface 714. When the pivotal platform 700 is in the "fully actuated" position (as shown with respect to the second row 708), the top surface 712 of the pivotal platform 700 is positioned horizontally in the same plane as the road surface 714. In other embodiments of the present invention, when the pivotal platform is in the "fully actuated" position, the top surface of the pivotal platform can be positioned above or below the plane of the road surface.

As shown in FIG. 28, operation of the pivotal platform 700 reduces tire impact, because the tire 704 is not subject to a step change in elevation relative to the road surface 714 when the tire 704 engages the pivotal platform. Instead, when the pivotal platform 700 is in the "at rest" position, the tire 704 rolls onto the upward sloping top surface 712 of the pivotal platform 700 at the platform hinge assembly 702. Then, as the tire 704 rolls along the top surface 712 of the pivotal platform 700, the weight of the vehicle forces the piston 9 downward into the cylinder body 18, which in turn, causes the pivotal platform 700 to pivot to the "fully actuated" position. As the tire 704 rolls off the top surface 712 of the pivotal platform 700 when the pivotal platform is in the "fully actuated" position, the tire 704 engages the hinge assembly 702 of the next adjacent pivotal platform or the tire rolls back onto the road surface 704. Once the tire disengages a particular platform, the compression spring 41 as discussed above, for example, with reference to FIGS. 3 and 4 in the hydraulic cylinder returns the hydraulic piston to the full upward stroke, returning the platform to the "at rest" position. It is to be appreciated that depending upon the vehicle weight in conjunction with how a particular embodiment of the invention is configured, the pivotal platform may not move to the "fully actuated" position when engaged by the vehicle. It is also to be appreciated that utilization of the pivotal platform that provides for a smoother engagement with the vehicle allows the hydraulic cylinders to be configured with pistons having a longer stroke than might otherwise be possible.

Figure 29:
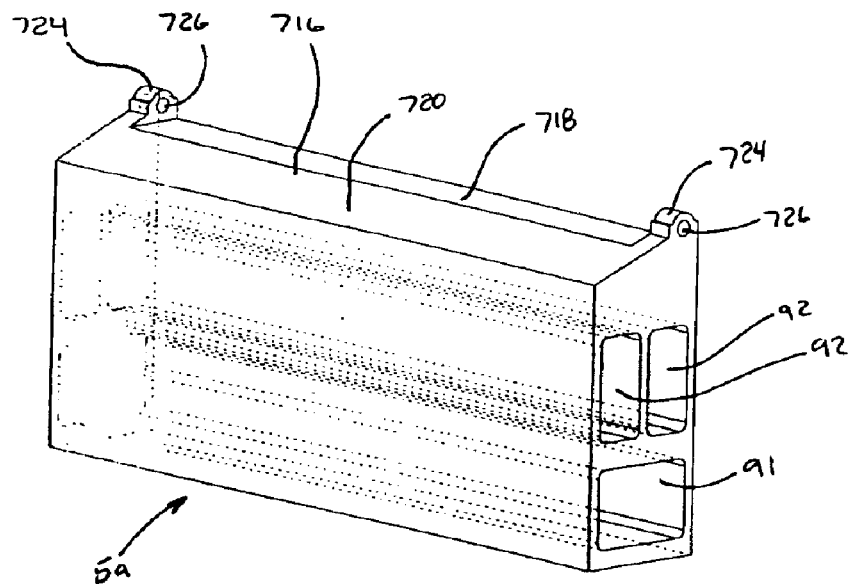
FIG. 29 is an isometric view of an alternative embodiment of the pressure manifold.

An embodiment of the pressure manifold 5a adapted to work with the pivotal platforms is shown in FIG. 29. As shown in FIG. 29, the pressure manifold 5a is similar to that which is described above in that the pressure manifold includes the pressure passage 91 in fluid communication with pressure ports 84 of the check valves 71. The pressure manifold 5a shown in FIG. 29 also includes two temperature control passages 92. A top surface 716 of the pressure manifold 5a includes a horizontal portion 718 and a sloped portion 720 and is adapted to support the platform hinge assembly 702. As shown in FIG. 26, the platform hinge assembly 702 includes a hinge axle 722 supported by two hinge mounts 724 extending upward from the horizontal portion 718 of the top surface 716 of the pressure manifold 5a. As shown in FIGS. 26 and 29, the hinge mounts 724 each have axle apertures 726 adapted to receive opposing ends of the hinge axle 722. The pivotal platforms 700 are pivotally connected with the hinge axle 722 through platform axle holes 728 adapted to receive the hinge axle 722. As shown in FIG. 28, the sloped portion 720 of the top surface 716 of the pressure manifold 5a acts as a mechanical stop for the pivotal platform 700. More particularly, when the pivotal platform is in the "fully actuated" position, a bottom surface 730 of the pivotal platform 700 engages the sloped portion 720 of the top surface 716 of the pressure manifold 5a to prevent further pivotal movement of the pivotal platform.

Figure 30:
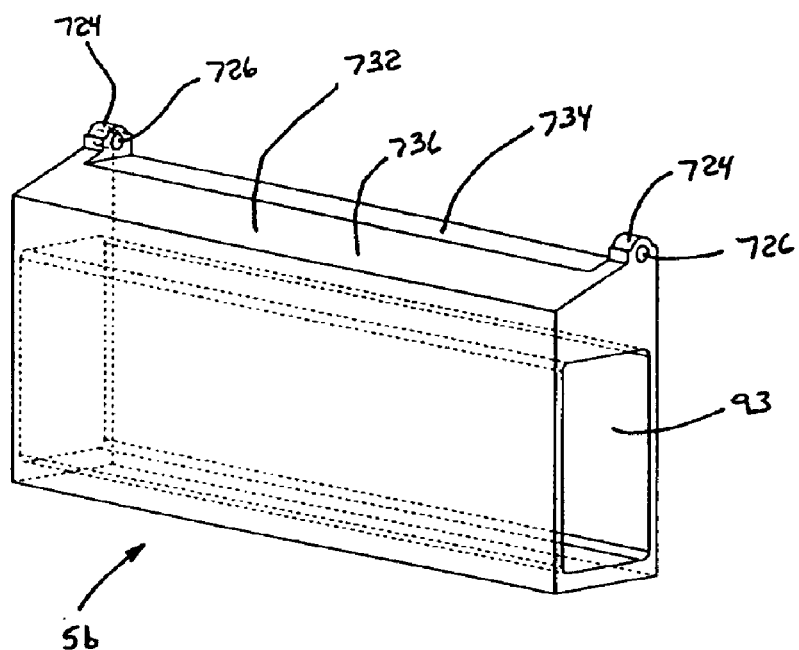
FIG. 30 is an isometric view of an alternative embodiment of the supply manifold.
Figure 34:
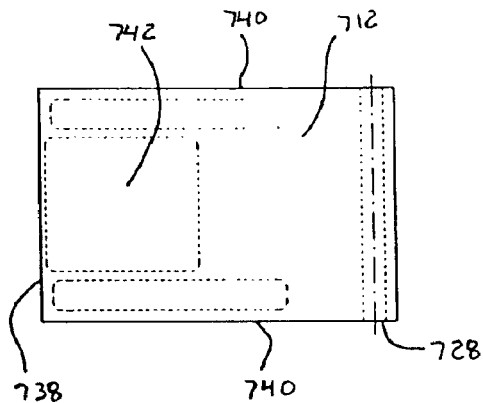
FIG. 34 is a top side view of the louver shaped platform shown in FIG. 31.
Figure 31:
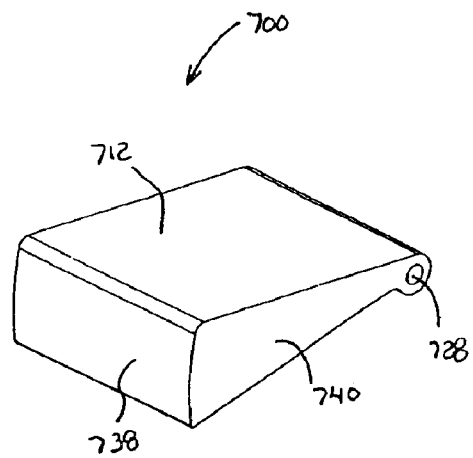

An embodiment of the supply manifold 5b adapted to work with the pivotal platforms is shown in FIG. 30. As shown in FIG. 30, the supply manifold 5b is similar to that which is described above in that the supply manifold includes the supply passage 93 that is in fluid communication with the supply ports 81 of the check valves 71. Similar to the pressure manifold 5a described above with reference to FIG. 29, the supply manifold 5b includes a top surface 732 having a horizontal portion 734 and a sloped portion 736 and is adapted to support the platform hinge assembly 702. Two hinge mounts 724 extending upward from the horizontal portion 734 of the top surface 732 of the supply manifold 5b also have axle apertures 726 adapted to receive opposing ends of the hinge axle 722. As described above with reference to the pressure manifold 5a, the pivotal platforms 700 are pivotally connected with the hinge axle 722 through platform axle holes 728 adapted to receive the hinge axle. As shown in FIG. 28, the sloped portion 736 of the top surface 732 of the supply manifold 5b also acts as a mechanical stop for the pivotal platform in the same manner as discussed above with reference to the pressure manifold.

Figure 31:
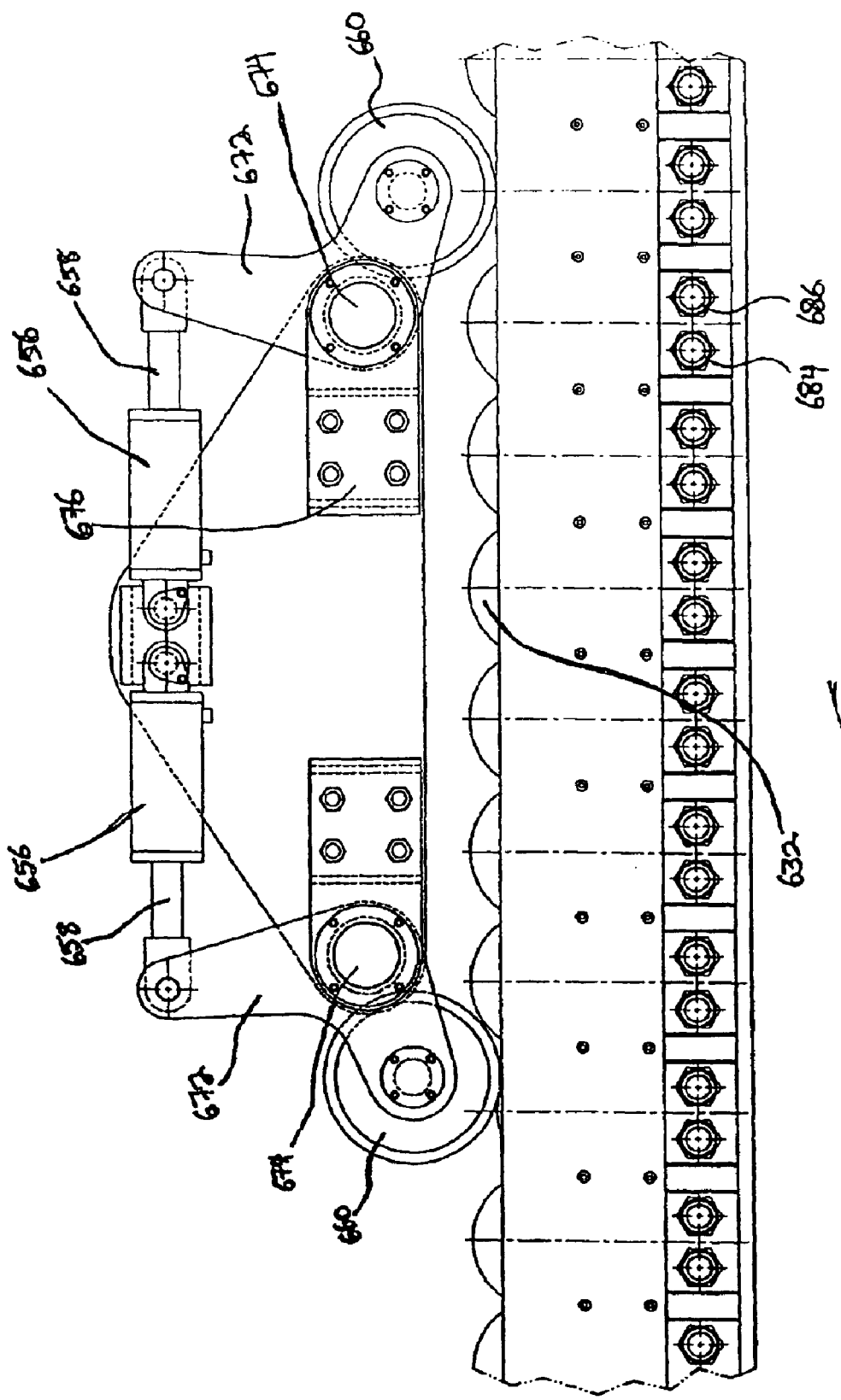
FIG. 31 is an isometric view of one embodiment of a louver shaped platform illustrated in FIG. 26.
Figure 33:
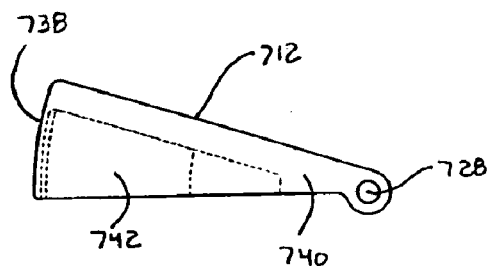
FIG. 33 is a right side view of the louver shaped platform shown in FIG. 31.
Figure 32:
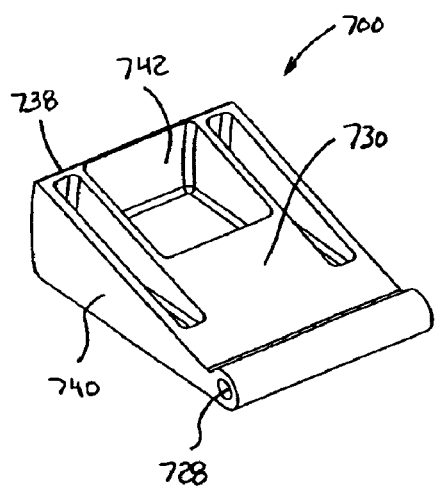
FIG. 32 is a bottom isometric view of the louver shaped platform shown in FIG. 31.
Figure 35:
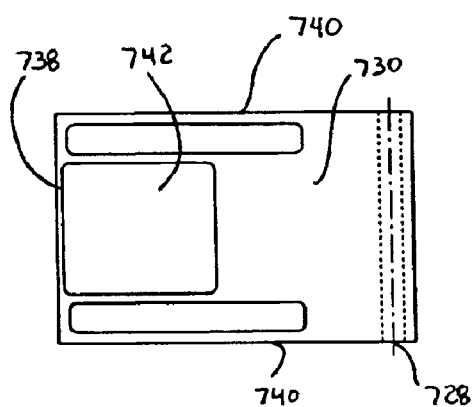
FIG. 35 is a bottom side view of the louver shaped platform shown in FIG. 31.
Figure 36:
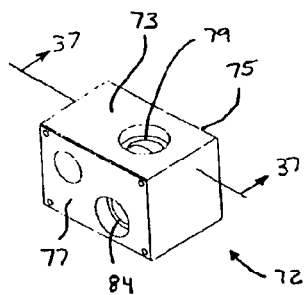
FIG. 36 is a right-front isometric view of an integral check valve shown in FIG. 26.
Figure 37:
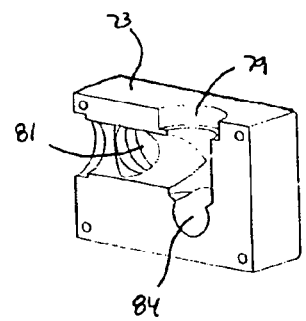
FIG. 37 is a cross sectional view of the integral check valve taken along line 37—37 of FIG. 36.
Figure 38:
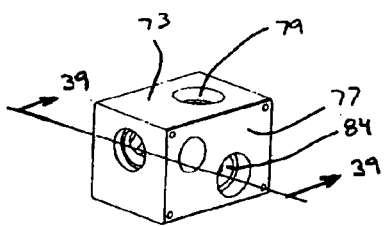
FIG. 38 a left-front isometric view of the integral check valve shown in FIG. 36.
Figure 39:
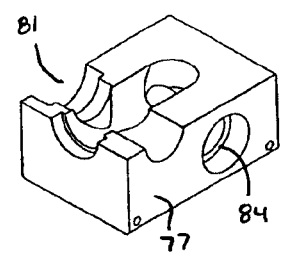
FIG. 39 is a cross sectional view of the integral check valve taken along line 39—39 of FIG. 38.
Figure 40:
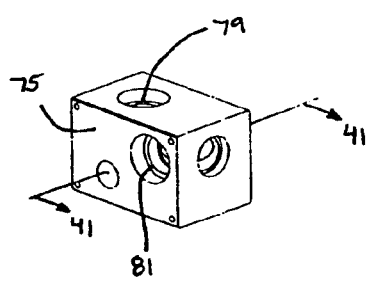
FIG. 40 a left-rear isometric view of the integral check valve shown in FIG. 36.
Figure 41:
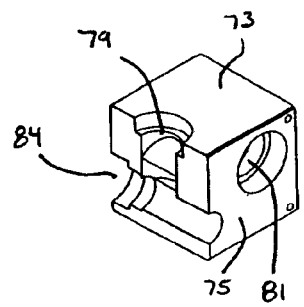
FIG. 41 is a cross sectional view of the integral check valve taken along line 41—41 of FIG. 40.
Figure 1:
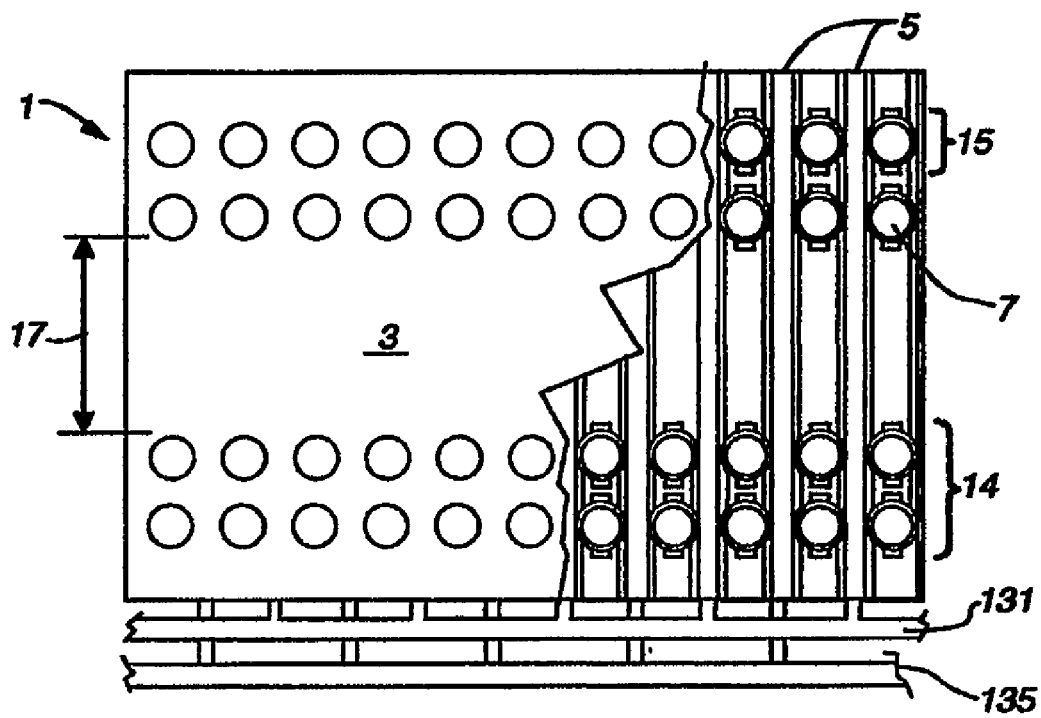
Figure 2:
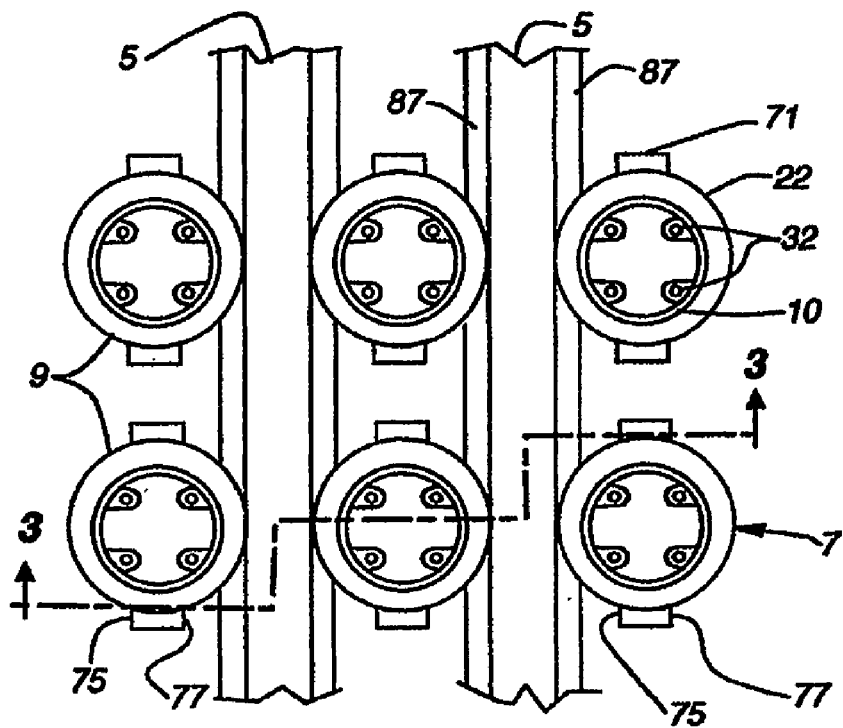

FIGS. 31–35 show an embodiment of the pivotal platform 700 adapted to work in accordance with the invention shown in FIGS. 26–28. The pivotal platform 700 includes a front side 738 and two generally triangularly-shaped sides 740 that extend downward from the top surface 712. As shown in FIGS. 31 and 33, the front side 738 is curved to allow the pivotal platform 700 to pivot about the hinge axle 722 without interfering with the next adjacent pivotal platform or road surface. The hinge axle hole 728, which is adapted to receive the hinge axle 722, extends between the two generally triangularly-shaped sides 740 and is located beneath the top surface 712. A plunger cap cavity 742 is located in the bottom surface 730 of the pivotal platform. The plunger cap cavity 742 is adapted to receive the plunger cap 10 of the hydraulic cylinder 7, as shown in FIGS. 26 and 28.

The embodiment of the present invention shown in FIGS. 26–28 utilize an alternative check valve embodiment, which are shown in detail in FIGS. 36–41. The integral check valves 71 shown in FIGS. 36–41 operate in the same manner as the check valves described above in that the check valve bodies 72 include the cylinder port 79 on the upper side face 73, the supply port 81 on the first side face 75, and the pressure port 84 on the second side face 77. As such, the cylinder port 79 is fluid communication with the hydraulic cylinder 7, the supply port 81 is in fluid communication with the supply manifold 5b, and the pressure port 84 is in fluid communication with the pressure manifold 5a. However, the check valve bodies 72 shown in FIGS. 36–41 provide for a "stack-type" connection with the supply and pressure manifolds. As such, the check valves can be connected with the supply and pressure manifolds through tie-rods and utilize O-ring seals between the manifolds.

It is to be understood that while certain forms of the present invention have been illustrated and described herein, it is not to be limited to the specific forms or arrangement of parts described and shown. For example, while the power generation apparatus are described herein as being hydraulically actuated, it is to be understood that pneumatics could be used instead. It is also to be understood that the turbine 12 and the electric generator 13 disclosed herein are only intended to be examples of how fluid flow created by the cylinders 7 can be converted into useful energy and that other power conversion means could be used. For example, the turbine 12 could be mechanically coupled to another mechanical device, such as an irrigation pump, instead of an electric generator. Furthermore, although the present invention is described in terms of use with automobiles, trucks and trains, it is suitable for application to any situation where moving vehicles pass over a land surface. Accordingly, the embodiments described herein are intended to be exemplary but not limiting. Rather, the scope and breadth of the invention is intended to be limited only by the appended claims.

What is claimed is:

1. A power generation apparatus for placement on a travel surface subject to vehicles passing thereover, said apparatus comprising:
   a least one cylinder adapted to receive a piston and a fluid cavity, wherein said piston engages said fluid cavity;
   a fluid supply manifold in fluid communication with said at least one cylinder and supplying fluid to said fluid cavity;
   a fluid return manifold in fluid communication with said at least one cylinder;
   at least one platform adapted to engage said piston;
   a power conversion means connected with said fluid return manifold; and
   wherein as a passing vehicle engages said at least one platform, said at least one platform and said piston are pushed downwardly, causing fluid to flow from said fluid cavity through said fluid return manifold and to said power conversion means.

2. The power generation apparatus of claim 1, wherein said at least one cylinder includes a fluid port connected with a check valve fluidly connected with said fluid supply manifold and with said fluid return manifold.

3. The power generation apparatus of claim 1, wherein said at least one cylinder is mounted between said fluid supply manifold and said fluid return manifold.

4. The power generation apparatus of claim 3, wherein said at least one cylinder includes only one fluid port connected with a check valve, said check valve connected with said fluid supply manifold and said fluid return manifold.

5. The power generation apparatus of claim 4, wherein said check valve includes a valve body that provides for a stack-type configuration.

6. The power generation apparatus of claim 1, wherein said piston is biased upwardly by a spring.

7. The power generation apparatus of claim 6, wherein said piston includes:
   an upper section and a lower section connected together by an intermediate rod;
   an annular ledge extending into said cylinder from a cylinder wall thereof between said upper and lower piston sections; and
   wherein said spring is a compression spring positioned between said upper section and said annular ledge.

8. The power generation apparatus of claim 1, wherein said at least one platform is pivotally connected with said fluid supply manifold.

9. The power generation apparatus of claim 8, wherein said fluid supply manifold is adapted to limit a degree of rotation of said at least one platform.

10. The power generation apparatus of claim 1, wherein said at least one platform is pivotally connected with said fluid return manifold.

11. The power generation apparatus of claim 10, wherein said fluid return manifold is adapted to limit a degree of rotation of said at least one platform.

12. A power capturing apparatus for placement on a travel surface subject to vehicles passing thereover, the apparatus comprising:
    a plurality of hydraulic actuators, each hydraulic actuator including a fluid cavity, a piston, an actuator cap and at least one fluid port, said piston being at least partially and slidably mounted in said fluid cavity and said at least one fluid port extending into said fluid cavity, and said actuator cap being disposed on top of said hydraulic actuator;
    a fluid source coupled with said at least one fluid port of each of said plurality of hydraulic actuators;
    a plurality of platforms adapted to engage each actuator cap of said plurality of hydraulic actuators; and
    wherein as a passing vehicle engages at least one of said plurality of platforms, at least one associated piston of at least one associated hydraulic actuator slides inwardly relative to at least one associated fluid cavity and causes fluid contained in said at least one associated fluid cavity to flow through at least one associated at least one fluid port.

13. The power capturing apparatus of claim 1, further comprising a fluid supply manifold in fluid communication with said fluid source and said at least one fluid port.

14. The power capturing apparatus of claim 13, wherein said plurality of platforms are pivotally connected with said fluid supply manifold.

15. The power generation apparatus of claim 14, wherein said fluid supply manifold is adapted to limit a degree of rotation of said plurality of platforms.

16. The power capturing apparatus of claim 1, further comprising a fluid return manifold in fluid communication with said at least one fluid port.

17. The power capturing apparatus of claim 16, wherein said plurality of platforms are pivotally connected with said fluid return manifold.

18. The power generation apparatus of claim 17, wherein said fluid return manifold is adapted to limit a degree of rotation of said plurality of platforms.

19. An apparatus for capturing energy from a moving train car, the apparatus comprising:
    at least one hydraulic actuator including a fluid cavity with at least one fluid port;
    at least one manifold in fluid communication with said at least one fluid port;
    at least one platform connected with said at least one manifold and adapted for contact with at least a portion the train car;
    wherein said at least one hydraulic actuator and said at least one manifold are adapted for placement proximate to a set of train tracks; and
    wherein the moving train car contacts said at least one platform causing hydraulic fluid to flow through said at least one fluid port.

20. The apparatus of claim 19, wherein said at least one manifold is a fluid supply manifold.

21. The apparatus of claim 20, wherein said at least one platform is pivotally connected with said fluid supply manifold.

22. The apparatus of claim 21, wherein said fluid supply manifold is adapted to limit a degree of rotation of said at least one platform.

23. The apparatus of claim 19, wherein said at least one manifold is a fluid return manifold.

24. The apparatus of claim 23, wherein said at least one platform is pivotally connected with said fluid return manifold.

25. The apparatus of claim 24, wherein said fluid return manifold is adapted to limit a degree of rotation of said at least one platform.

* * * * *

UNITED STATES PATENT AND TRADEMARK OFFICE
CERTIFICATE OF CORRECTION

| | | |
|---|---|---|
| PATENT NO. | : 6,949,840 B2 | Page 1 of 28 |
| APPLICATION NO. | : 10/843714 | |
| DATED | : September 27, 2005 | |
| INVENTOR(S) | : Tod A. Ricketts | |

It is certified that error appears in the above-identified patent and that said Letters Patent is hereby corrected as shown below:

In column 21, at line 2, delete "1. A power generation apparatus for placement on a travel surface subject to vehicles passing thereover, said apparatus comprising:
 a least one cylinder adapted to receive a piston and a fluid cavity, wherein said piston engages said fluid cavity;
 a fluid supply manifold in fluid communication with said at least one cylinder and supplying fluid to said fluid cavity;
 a fluid return manifold in fluid communication with said at least one cylinder;
 at least one platform adapted to engage said piston;
 a power conversion means connected with said fluid return manifold; and
 wherein as a passing vehicle engages said at least one platform, said at least one platform and said piston are pushed downwardly, causing fluid to flow from said fluid cavity through said fluid return manifold and to said power conversion means."

In column 21, at line 19, delete "2. The power generation apparatus of claim 1, wherein said at least one cylinder includes a fluid port connected with a check valve fluidly connected with said fluid supply manifold and with said fluid return manifold."

In column 21, at line 24, delete "3. The power generation apparatus of claim 1, wherein said at least one cylinder is mounted between said fluid supply manifold and said fluid return manifold."

In column 21, at line 26, delete "4. The power generation apparatus of claim 3, wherein said at least one cylinder includes only one fluid port connected with a check valve, said check valve connected with said fluid supply manifold and said fluid return manifold."

In column 21, at line 32, delete "5. The power generation apparatus of claim 4, wherein said check valve includes a valve body that provides for a stack-type configuration."

In column 21, at line 34, delete "6. The power generation apparatus of claim 1, wherein said piston is biased upwardly by a spring."

In column 21, at line 36, delete "7. The power generation apparatus of claim 6, wherein said piston includes:
 an upper section and a lower section connected together by an intermediate rod;
 an annular ledge extending into said cylinder from a cylinder wall thereof between said upper and lower piston sections; and
 wherein said spring is a compression spring positioned between said upper section and said annular ledge."

UNITED STATES PATENT AND TRADEMARK OFFICE
CERTIFICATE OF CORRECTION

| | | |
|---|---|---|
| PATENT NO. | : 6,949,840 B2 | |
| APPLICATION NO. | : 10/843714 | |
| DATED | : September 27, 2005 | |
| INVENTOR(S) | : Tod A. Ricketts | |

It is certified that error appears in the above-identified patent and that said Letters Patent is hereby corrected as shown below:

In column 21, at line 40, delete "8. The power generation apparatus of claim 1, wherein said at least one platform is pivotally connected with said fluid supply manifold."

In column 21, at line 49, delete "9. The power generation apparatus of claim 8, wherein said fluid supply manifold is adapted to limit a degree of rotation of said at least one platform."

In column 21, at line 52, delete "10. The power generation apparatus of claim 1, wherein said at least one platform is pivotally connected with said fluid return manifold."

In column 21, at line 55, delete "11. The power generation apparatus of claim 10, wherein said fluid return manifold is adapted to limit a degree of rotation of said at least one platform."

In column 21, at line 58, delete "12." and insert --1.--.

In column 22, at line 14, delete "13." and insert --2.--.

In column 22, at line 17, delete "14." and insert --3.--.

In column 22, at line 17, delete "claim 13" and insert --claim 2--.

In column 22, at line 20, delete "15." and insert --4.--.

In column 22, at line 20, delete "claim 14" and insert --claim 3--.

In column 22, at line 23, delete "16." and insert --5.--.

In column 22, at line 26, delete "17." and insert --6.--.

In column 22, at line 26, delete "claim 16" and insert --claim 5--.

In column 22, at line 29, delete "18." and insert --7.--.

In column 22, at line 29, delete "claim 17" and insert --claim 6--.

UNITED STATES PATENT AND TRADEMARK OFFICE
CERTIFICATE OF CORRECTION

| | | |
|---|---|---|
| PATENT NO. | : 6,949,840 B2 | |
| APPLICATION NO. | : 10/843714 | |
| DATED | : September 27, 2005 | |
| INVENTOR(S) | : Tod A. Ricketts | |

It is certified that error appears in the above-identified patent and that said Letters Patent is hereby corrected as shown below:

In column 22, at line 32, delete "19. An apparatus for capturing energy from a moving train car, the apparatus comprising:
    at least one hydraulic actuator including a fluid cavity with at least one fluid port;
    at least one manifold in fluid communication with said at least one fluid port;
    at least one platform connected with said at least one manifold and adapted for contact with at least a portion the train car;
    wherein said at least one hydraulic actuator and said at least one manifold are adapted for placement proximate to a set of train tracks; and
    wherein the moving train car contacts said at least one platform causing hydraulic fluid to flow through said at least one fluid port."

In column 22, at line 49, delete "20. The apparatus of claim 19, wherein said at least one manifold is a fluid supply manifold."

In column 22, at line 52, delete "21. The apparatus of claim 20, wherein said at least one platform is pivotally connected with said fluid supply manifold."

In column 22, at line 65, delete "22. The apparatus of claim 21, wherein said fluid supply manifold is adapted to limit a degree of rotation of said at least one platform."

In column 22, at line 58, delete "23. The apparatus of claim 19, wherein said at least one manifold is a fluid return manifold."

In column 22, at line 60, delete "24. The apparatus of claim 23, wherein said at least one platform is pivotally connected with said fluid return manifold."

In column 22, at line 63, delete "25. The apparatus of claim 24, wherein said fluid return manifold is adapted to limit a degree of rotation of said at least one platform."

UNITED STATES PATENT AND TRADEMARK OFFICE
CERTIFICATE OF CORRECTION

| | |
|---|---|
| PATENT NO. | : 6,949,840 B2 |
| APPLICATION NO. | : 10/843714 |
| DATED | : September 27, 2005 |
| INVENTOR(S) | : Tod A. Ricketts |

It is certified that error appears in the above-identified patent and that said Letters Patent is hereby corrected as shown below:

Please delete drawing sheets 1-24 and substitute drawings sheets 1-24 as per attached.

Signed and Sealed this

Twenty-seventh Day of February, 2007

JON W. DUDAS
*Director of the United States Patent and Trademark Office*

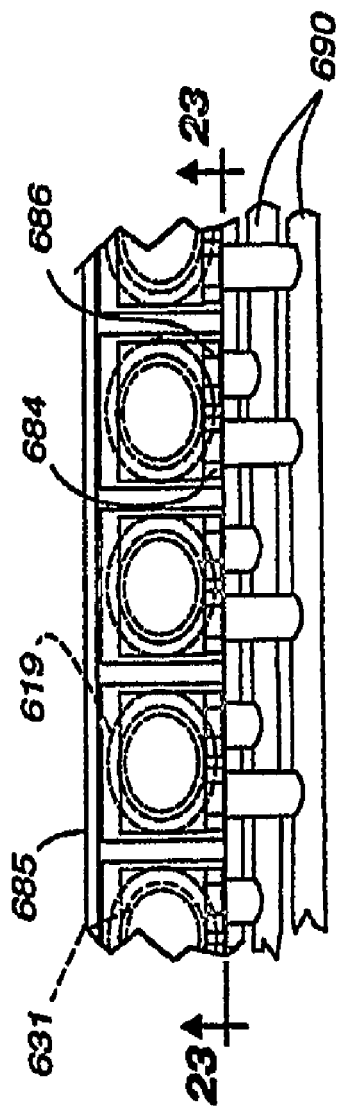
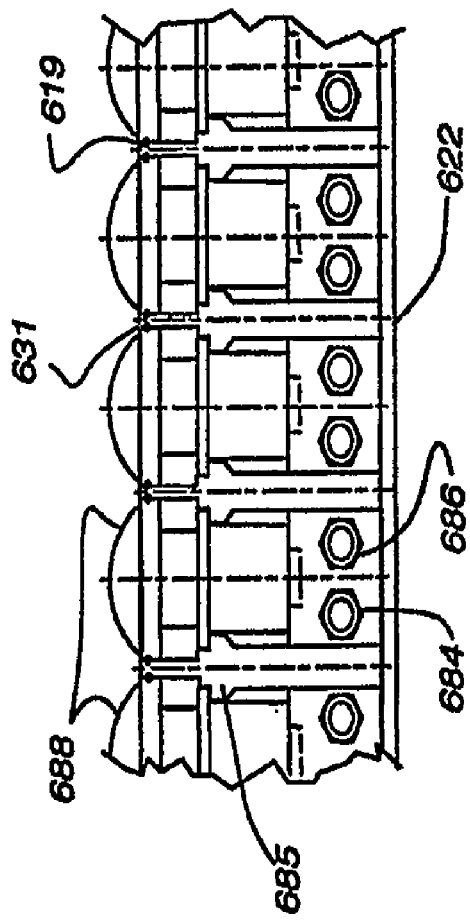
Fig. 22
Fig. 23